United States Patent
Karalis et al.

(10) Patent No.: US 11,685,270 B2
(45) Date of Patent: *Jun. 27, 2023

(54) WIRELESS ENERGY TRANSFER

(71) Applicant: Massachusetts Institute of Technology, Cambridge, MA (US)

(72) Inventors: Aristeidis Karalis, Boston, MA (US); Andre B. Kurs, Chestnut Hill, MA (US); Robert Moffatt, Reston, VA (US); John D. Joannopoulos, Belmont, MA (US); Peter H. Fisher, Cambridge, MA (US); Marin Soljacic, Belmont, MA (US)

(73) Assignee: MIT, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,041

(22) Filed: Sep. 1, 2020

(65) Prior Publication Data

US 2021/0078418 A1 Mar. 18, 2021

Related U.S. Application Data

(63) Continuation of application No. 16/137,795, filed on Sep. 21, 2018, now abandoned, which is a (Continued)

(51) Int. Cl.
*H02J 50/12* (2016.01)
*B60L 53/126* (2019.01)
(Continued)

(52) U.S. Cl.
CPC .............. *B60L 53/126* (2019.02); *H01Q 7/00* (2013.01); *H01Q 9/04* (2013.01); *H02J 50/12* (2016.02);
(Continued)

(58) Field of Classification Search
None
See application file for complete search history.

(56) References Cited

U.S. PATENT DOCUMENTS 645,576 A 3/1900 Tesla
649,621 A 5/1900 Tesla
(Continued)

FOREIGN PATENT DOCUMENTS

CA 142352 8/1912
CN 1309793 8/2001
(Continued)

OTHER PUBLICATIONS

V. Zavislyak and V. V. Zagorodnii, Quality Factor of Magnetostatic Oscillations in (111)-YIG FILMSI., 2004, vol. 47, No. 6, pp. 9-13.*
(Continued)

*Primary Examiner* — Daniel Kessie
(74) *Attorney, Agent, or Firm* — Fish & Richardson P.C.

(57) ABSTRACT

Disclosed is an apparatus for use in wireless energy transfer, which includes a first resonator structure configured to transfer energy non-radiatively with a second resonator structure over a distance greater than a characteristic size of the second resonator structure. The non-radiative energy transfer is mediated by a coupling of a resonant field evanescent tail of the first resonator structure and a resonant field evanescent tail of the second resonator structure.

27 Claims, 14 Drawing Sheets

Related U.S. Application Data continuation of application No. 15/186,969, filed on Jun. 20, 2016, now Pat. No. 10,097,044, which is a continuation of application No. 13/789,860, filed on Mar. 8, 2013, now Pat. No. 9,509,147, which is a continuation of application No. 13/477,459, filed on May 22, 2012, now Pat. No. 9,444,265, which is a continuation of application No. 13/036,177, filed on Feb. 28, 2011, now abandoned, which is a continuation of application No. 12/437,641, filed on May 8, 2009, now Pat. No. 8,097,983, which is a continuation of application No. 12/055,963, filed on Mar. 26, 2008, now Pat. No. 7,825,543, which is a continuation-in-part of application No. PCT/US2007/070892, filed on Jun. 11, 2007, and a continuation-in-part of application No. 11/481,077, filed on Jul. 5, 2006, now Pat. No. 7,741,734.

(60) Provisional application No. 60/908,666, filed on Mar. 28, 2007, provisional application No. 60/908,383, filed on Mar. 27, 2007, provisional application No. 60/698,442, filed on Jul. 12, 2005.

(51) Int. Cl.
*H02J 50/80* (2016.01)
*H01Q 7/00* (2006.01)
*H01Q 9/04* (2006.01)
*H04B 5/00* (2006.01)
*H02J 50/90* (2016.01)

(52) U.S. Cl.
CPC .............. *H02J 50/80* (2016.02); *H02J 50/90* (2016.02); *H04B 5/0037* (2013.01); *B60L 2210/20* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y10T 29/4902* (2015.01)

(56) References Cited

U.S. PATENT DOCUMENTS

| | | | |
|---|---|---|---|
| 787,412 A | 4/1905 | Tesla | |
| 1,119,732 A | 12/1914 | Tesla | |
| 2,133,494 A | 10/1938 | Waters | |
| 2,266,262 A | 12/1941 | Polydoroff | |
| 3,517,350 A | 6/1970 | Beaver | |
| 3,535,543 A | 10/1970 | Dailey | |
| 3,780,425 A | 12/1973 | Penn et al. | |
| 3,871,176 A | 3/1975 | Schukei | |
| 4,088,999 A | 5/1978 | Fletcher et al. | |
| 4,095,998 A | 6/1978 | Hanson | |
| 4,180,795 A | 12/1979 | Matsuda et al. | |
| 4,280,129 A | 7/1981 | Wells | |
| 4,441,210 A | 4/1984 | Hochmair et al. | |
| 4,450,431 A | 5/1984 | Hochstein | |
| 4,588,978 A | 5/1986 | Allen | |
| 4,621,243 A | 11/1986 | Harada | |
| 4,665,896 A * | 5/1987 | LaForge | A61M 60/178 623/3.1 |
| 4,679,560 A | 7/1987 | Galbraith | |
| 5,027,709 A | 7/1991 | Slagle | |
| 5,033,295 A | 7/1991 | Schmid et al. | |
| 5,034,658 A | 7/1991 | Hiering et al. | |
| 5,053,774 A | 10/1991 | Schuermann et al. | |
| 5,070,293 A | 12/1991 | Ishii et al. | |
| 5,118,997 A | 6/1992 | El-Hamamsy | |
| 5,216,402 A | 6/1993 | Carosa | |
| 5,229,652 A | 7/1993 | Hough | |
| 5,287,112 A | 2/1994 | Schuermann | |
| 5,293,308 A | 3/1994 | Boys et al. | |
| 5,341,083 A | 8/1994 | Klontz et al. | |
| 5,367,242 A * | 11/1994 | Hulman | H02J 50/12 320/108 |
| 5,374,930 A | 12/1994 | Schuermann | |
| 5,408,209 A | 4/1995 | Tanzer et al. | |
| 5,437,057 A | 7/1995 | Richley et al. | |
| 5,455,467 A | 10/1995 | Young et al. | |
| 5,493,691 A | 2/1996 | Barrett | |
| 5,522,856 A | 6/1996 | Reineman | |
| 5,528,113 A | 6/1996 | Boys et al. | |
| 5,541,604 A | 7/1996 | Meier | |
| 5,550,452 A | 8/1996 | Shirai et al. | |
| 5,565,763 A | 10/1996 | Arrendal et al. | |
| 5,630,835 A | 5/1997 | Brownlee | |
| 5,631,660 A | 5/1997 | Higashiguchi et al. | |
| 5,654,621 A * | 8/1997 | Seelig | B60L 53/11 320/108 |
| 5,697,956 A | 12/1997 | Bornzin | |
| 5,703,461 A | 12/1997 | Minoshima et al. | |
| 5,703,573 A | 12/1997 | Fujimoto et al. | |
| 5,710,413 A | 1/1998 | King et al. | |
| 5,742,471 A | 4/1998 | Barbee, Jr. et al. | |
| 5,821,728 A | 10/1998 | Schwind | |
| 5,821,731 A | 10/1998 | Kuki et al. | |
| 5,864,323 A | 1/1999 | Berthon | |
| 5,891,183 A | 4/1999 | Zierhofer | |
| 5,898,579 A | 4/1999 | Boys et al. | |
| 5,903,134 A | 5/1999 | Takeuchi | |
| 5,923,544 A | 7/1999 | Urano | |
| 5,940,509 A | 8/1999 | Jovanovich et al. | |
| 5,957,956 A | 9/1999 | Kroll et al. | |
| 5,959,245 A | 9/1999 | Moe et al. | |
| 5,986,895 A | 11/1999 | Stewart et al. | |
| 5,993,996 A | 11/1999 | Firsich | |
| 5,994,985 A | 11/1999 | Pehlke et al. | |
| 5,999,308 A | 12/1999 | Nelson et al. | |
| 6,012,659 A | 1/2000 | Nakazawa et al. | |
| 6,028,429 A | 2/2000 | Green et al. | |
| 6,047,214 A | 4/2000 | Mueller et al. | |
| 6,066,163 A | 5/2000 | John | |
| 6,067,473 A | 5/2000 | Greeninger et al. | |
| 6,101,300 A | 8/2000 | Fan et al. | |
| 6,108,579 A | 8/2000 | Snell et al. | |
| 6,127,799 A | 10/2000 | Krishnan | |
| 6,130,591 A | 10/2000 | Tsuzuki | |
| 6,176,433 B1 | 1/2001 | Uesaka et al. | |
| 6,184,651 B1 | 2/2001 | Fernandez et al. | |
| 6,207,887 B1 | 3/2001 | Bass et al. | |
| 6,225,800 B1 | 5/2001 | Zhang et al. | |
| 6,232,841 B1 | 5/2001 | Bartlett et al. | |
| 6,238,387 B1 | 5/2001 | Miller, III | |
| 6,240,318 B1 | 5/2001 | Phillips | |
| 6,252,762 B1 | 6/2001 | Amatucci | |
| 6,262,639 B1 | 7/2001 | Shu et al. | |
| 6,300,760 B1 | 10/2001 | Schubert et al. | |
| 6,321,067 B1 | 11/2001 | Suga et al. | |
| 6,407,470 B1 | 6/2002 | Seelig | |
| 6,436,299 B1 | 8/2002 | Baarman et al. | |
| 6,450,946 B1 | 9/2002 | Forsell | |
| 6,452,465 B1 | 9/2002 | Brown et al. | |
| 6,459,218 B2 | 10/2002 | Boys et al. | |
| 6,473,028 B1 | 10/2002 | Luc | |
| 6,483,202 B1 | 11/2002 | Boys | |
| 6,515,878 B1 | 2/2003 | Meins et al. | |
| 6,533,178 B1 | 3/2003 | Gaul et al. | |
| 6,535,133 B2 | 3/2003 | Gohara | |
| 6,561,975 B1 | 5/2003 | Pool et al. | |
| 6,563,425 B2 | 5/2003 | Nicholson et al. | |
| 6,597,076 B2 | 7/2003 | Scheible et al. | |
| 6,609,023 B1 | 8/2003 | Fischell et al. | |
| 6,631,072 B1 | 10/2003 | Paul et al. | |
| 6,650,227 B1 | 11/2003 | Bradin | |
| 6,664,770 B1 | 12/2003 | Bartels | |
| 6,673,250 B2 | 1/2004 | Kuennen et al. | |
| 6,683,256 B2 | 1/2004 | Kao | |
| 6,696,647 B2 | 2/2004 | Ono et al. | |
| 6,703,921 B1 | 3/2004 | Wuidart et al. | |
| 6,731,071 B2 | 5/2004 | Baarman | |
| 6,749,119 B2 | 6/2004 | Scheible et al. | |

(56) References Cited

U.S. PATENT DOCUMENTS

| | | | |
|---|---|---|---|
| 6,772,011 B2* | 8/2004 | Dolgin | A61N 1/37223 607/60 |
| 6,798,716 B1 | 9/2004 | Charych | |
| 6,803,744 B1 | 10/2004 | Sabo | |
| 6,806,649 B2 | 10/2004 | Mollema et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,839,035 B1 | 1/2005 | Addonisio et al. | |
| 6,844,702 B2 | 1/2005 | Giannopoulos et al. | |
| 6,856,291 B2 | 2/2005 | Mickle et al. | |
| 6,858,970 B2 | 2/2005 | Malkin et al. | |
| 6,906,495 B2 | 6/2005 | Cheng et al. | |
| 6,917,163 B2 | 7/2005 | Baarman | |
| 6,917,431 B2 | 7/2005 | Soljacic et al. | |
| 6,937,130 B2 | 8/2005 | Scheible et al. | |
| 6,960,968 B2 | 11/2005 | Odendaal et al. | |
| 6,961,619 B2 | 11/2005 | Casey | |
| 6,967,462 B1 | 11/2005 | Landis | |
| 6,975,198 B2 | 12/2005 | Baarman | |
| 6,988,026 B2 | 1/2006 | Breed et al. | |
| 7,027,311 B2 | 4/2006 | Vanderelli et al. | |
| 7,035,076 B1 | 4/2006 | Stevenson | |
| 7,042,196 B2 | 5/2006 | Ka-Lai et al. | |
| 7,058,357 B1 | 6/2006 | Wuidart et al. | |
| 7,069,064 B2 | 6/2006 | Govorgian et al. | |
| 7,084,605 B2 | 8/2006 | Mickle et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,127,293 B2 | 10/2006 | MacDonald | |
| 7,132,918 B2 | 11/2006 | Baarman et al. | |
| 7,147,604 B1 | 12/2006 | Allen et al. | |
| 7,180,248 B2 | 2/2007 | Kuennen et al. | |
| 7,191,007 B2 | 3/2007 | Desai et al. | |
| 7,193,418 B2 | 3/2007 | Freytag | |
| 7,212,414 B2 | 5/2007 | Baarman | |
| 7,233,137 B2 | 6/2007 | Nakamura et al. | |
| 7,236,092 B1 | 6/2007 | Joy | |
| 7,239,110 B2 | 7/2007 | Cheng et al. | |
| 7,248,017 B2 | 7/2007 | Cheng et al. | |
| 7,251,527 B2 | 7/2007 | Lyden | |
| 7,288,918 B2 | 10/2007 | DiStefano | |
| 7,375,492 B2 | 5/2008 | Calhoon et al. | |
| 7,375,493 B2 | 5/2008 | Calhoon et al. | |
| 7,378,817 B2 | 5/2008 | Calhoon et al. | |
| 7,382,636 B2 | 6/2008 | Baarman et al. | |
| 7,385,357 B2 | 6/2008 | Kuennen et al. | |
| 7,443,135 B2 | 10/2008 | Cho | |
| 7,462,951 B1 | 12/2008 | Baarman | |
| 7,466,213 B2 | 12/2008 | Lobl et al. | |
| 7,474,058 B2 | 1/2009 | Baarman | |
| 7,492,247 B2 | 2/2009 | Schmidt et al. | |
| 7,514,818 B2 | 4/2009 | Abe et al. | |
| 7,518,267 B2 | 4/2009 | Baarman | |
| 7,525,283 B2 | 4/2009 | Cheng et al. | |
| 7,545,337 B2 | 6/2009 | Guenther | |
| 7,599,743 B2 | 10/2009 | Hassler, Jr. et al. | |
| 7,615,936 B2 | 11/2009 | Baarman et al. | |
| 7,639,514 B2 | 12/2009 | Baarman | |
| 7,741,734 B2 | 6/2010 | Joannopoulos et al. | |
| 7,795,708 B2 | 9/2010 | Katti | |
| 7,825,543 B2 | 11/2010 | Karalis et al. | |
| 7,843,288 B2 | 11/2010 | Lee et al. | |
| 7,863,859 B2 | 1/2011 | Soar | |
| 8,022,576 B2 | 9/2011 | Joannopoulos et al. | |
| 8,076,800 B2 | 12/2011 | Joannopoulos et al. | |
| 8,076,801 B2 | 12/2011 | Karalis et al. | |
| 8,077,485 B2 | 12/2011 | Lee | |
| 8,084,889 B2 | 12/2011 | Joannopoulos et al. | |
| 8,097,983 B2 | 1/2012 | Karalis et al. | |
| 8,131,378 B2 | 3/2012 | Greenberg et al. | |
| 8,178,995 B2 | 5/2012 | Amano et al. | |
| 8,362,651 B2 | 1/2013 | Hamam et al. | |
| 8,395,282 B2 | 3/2013 | Joannopoulos et al. | |
| 8,395,283 B2 | 3/2013 | Joannopoulos et al. | |
| 8,400,018 B2 | 3/2013 | Joannopoulos et al. | |
| 8,400,019 B2 | 3/2013 | Joannopoulos et al. | |
| 8,400,020 B2 | 3/2013 | Joannopoulos et al. | |
| 8,400,021 B2 | 3/2013 | Joannopoulos et al. | |
| 8,400,022 B2 | 3/2013 | Joannopoulos et al. | |
| 8,400,023 B2 | 3/2013 | Joannopoulos et al. | |
| 8,400,024 B2 | 3/2013 | Joannopoulos et al. | |
| 8,760,007 B2 | 6/2014 | Joannopoulos et al. | |
| 8,760,008 B2 | 6/2014 | Joannopoulos et al. | |
| 8,766,485 B2 | 7/2014 | Joannopoulos et al. | |
| 8,772,971 B2 | 7/2014 | Joannopoulos et al. | |
| 8,772,972 B2 | 7/2014 | Joannopoulos et al. | |
| 8,791,599 B2 | 7/2014 | Joannopoulos et al. | |
| 8,836,172 B2 | 9/2014 | Hamam et al. | |
| 9,065,286 B2 | 6/2015 | Joannopoulos et al. | |
| 9,444,265 B2 | 9/2016 | Karalis et al. | |
| 9,450,421 B2 | 9/2016 | Joannopoulos et al. | |
| 9,450,422 B2 | 9/2016 | Karalis et al. | |
| 9,509,147 B2 | 11/2016 | Karalis et al. | |
| 9,831,722 B2 | 11/2017 | Joannopoulos et al. | |
| 10,097,044 B2 | 10/2018 | Karalis et al. | |
| 10,141,790 B2 | 11/2018 | Joannopoulos et al. | |
| 2001/0012208 A1 | 8/2001 | Boys | |
| 2002/0012257 A1 | 1/2002 | Takahama et al. | |
| 2002/0032471 A1 | 3/2002 | Loftin et al. | |
| 2002/0105343 A1 | 8/2002 | Scheible et al. | |
| 2002/0118004 A1 | 8/2002 | Scheible et al. | |
| 2002/0130642 A1 | 9/2002 | Ettes et al. | |
| 2002/0167294 A1 | 11/2002 | Odaohhara | |
| 2003/0038641 A1 | 2/2003 | Scheible | |
| 2003/0062794 A1 | 4/2003 | Scheible et al. | |
| 2003/0062980 A1 | 4/2003 | Scheible et al. | |
| 2003/0071034 A1 | 4/2003 | Thompson et al. | |
| 2003/0124050 A1 | 7/2003 | Yadav et al. | |
| 2003/0126948 A1 | 7/2003 | Yadav et al. | |
| 2003/0160590 A1 | 8/2003 | Schaefer et al. | |
| 2003/0199778 A1 | 10/2003 | Mickle et al. | |
| 2003/0214255 A1 | 11/2003 | Baarman et al. | |
| 2004/0000974 A1 | 1/2004 | Odenaal et al. | |
| 2004/0026998 A1 | 2/2004 | Henriott et al. | |
| 2004/0100338 A1 | 5/2004 | Clark | |
| 2004/0113847 A1 | 6/2004 | Qi et al. | |
| 2004/0130425 A1 | 7/2004 | Dayan et al. | |
| 2004/0130915 A1 | 7/2004 | Baarman | |
| 2004/0130916 A1 | 7/2004 | Baarman | |
| 2004/0142733 A1 | 7/2004 | Parise | |
| 2004/0150934 A1 | 8/2004 | Baarman | |
| 2004/0189246 A1 | 9/2004 | Bulai et al. | |
| 2004/0201361 A1 | 10/2004 | Koh et al. | |
| 2004/0218406 A1* | 11/2004 | Jang | H02J 50/70 363/37 |
| 2004/0222751 A1 | 11/2004 | Mollema et al. | |
| 2004/0227057 A1 | 11/2004 | Tuominen et al. | |
| 2004/0232845 A1 | 11/2004 | Baarman | |
| 2004/0233043 A1 | 11/2004 | Yazawa et al. | |
| 2004/0267501 A1 | 12/2004 | Freed et al. | |
| 2005/0007067 A1 | 1/2005 | Baarman et al. | |
| 2005/0020224 A1 | 1/2005 | Locatelli et al. | |
| 2005/0021134 A1 | 1/2005 | Opie | |
| 2005/0027192 A1 | 2/2005 | Govari et al. | |
| 2005/0030251 A1 | 2/2005 | Okamura et al. | |
| 2005/0033382 A1 | 2/2005 | Single | |
| 2005/0085873 A1* | 4/2005 | Gord | H04L 27/366 607/61 |
| 2005/0093475 A1 | 5/2005 | Kuennen et al. | |
| 2005/0104064 A1 | 5/2005 | Hegarty et al. | |
| 2005/0104453 A1 | 5/2005 | Vanderelli et al. | |
| 2005/0116650 A1 | 6/2005 | Baarman | |
| 2005/0116683 A1 | 6/2005 | Cheng et al. | |
| 2005/0122058 A1 | 6/2005 | Baarman et al. | |
| 2005/0122059 A1 | 6/2005 | Baarman et al. | |
| 2005/0125093 A1 | 6/2005 | Kikuchi et al. | |
| 2005/0127849 A1 | 6/2005 | Baarman et al. | |
| 2005/0127850 A1 | 6/2005 | Baarman et al. | |
| 2005/0127866 A1 | 6/2005 | Hamilton et al. | |
| 2005/0135122 A1 | 6/2005 | Cheng et al. | |
| 2005/0140482 A1 | 6/2005 | Cheng et al. | |
| 2005/0151511 A1 | 7/2005 | Chary | |

(56) References Cited

U.S. PATENT DOCUMENTS

| | | |
|---|---|---|
| 2005/0156560 A1 | 7/2005 | Shimaoka et al. |
| 2005/0189945 A1 | 9/2005 | Reiderman |
| 2005/0194926 A1 | 9/2005 | Di Stefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0022636 A1 | 2/2006 | Xian et al. |
| 2006/0044188 A1 | 3/2006 | Tsai et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0159392 A1 | 7/2006 | Popovic |
| 2006/0164866 A1 | 7/2006 | Vanderelli et al. |
| 2006/0164868 A1 | 7/2006 | Weber |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2006/0284708 A1 | 12/2006 | Reeves |
| 2007/0008140 A1 | 1/2007 | Saarisalo et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0171681 A1 | 7/2007 | Baarman |
| 2007/0171992 A1 * | 7/2007 | Shameli ............ H04B 5/02 375/257 |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0067874 A1 | 3/2008 | Tseng |
| 2008/0191638 A1 | 8/2008 | Kuennen et al. |
| 2008/0197710 A1 | 8/2008 | Kreitz et al. |
| 2008/0211320 A1 | 9/2008 | Cook et al. |
| 2008/0265684 A1 | 10/2008 | Farkas |
| 2008/0266748 A1 | 10/2008 | Lee |
| 2008/0278264 A1 | 11/2008 | Karalis et al. |
| 2008/0294208 A1 | 11/2008 | Willis et al. |
| 2009/0010028 A1 | 1/2009 | Baarmen et al. |
| 2009/0015075 A1 | 1/2009 | Cook et al. |
| 2009/0033564 A1 | 2/2009 | Cook et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0127937 A1 * | 5/2009 | Widmer ............ H02J 50/12 307/149 |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0065352 A1 | 3/2010 | Ichikawa |
| 2010/0066349 A1 | 3/2010 | Lin et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |

(56) References Cited

U.S. PATENT DOCUMENTS

| | | |
|---|---|---|
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156570 A1 | 6/2010 | Hong et al. |
| 2010/0164295 A1 | 7/2010 | Ichikawa et al. |
| 2010/0171370 A1 | 7/2010 | Karalis et al. |
| 2010/0181844 A1 | 7/2010 | Karalis et al. |
| 2010/0181961 A1 | 7/2010 | Novak et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256831 A1 | 10/2010 | Abramo et al. |
| 2010/0259109 A1 | 10/2010 | Sato |
| 2010/0264745 A1 | 10/2010 | Karalis et al. |
| 2010/0264746 A1 | 10/2010 | Kazama et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0327660 A1 | 12/2010 | Karalis et al. |
| 2010/0327661 A1 | 12/2010 | Karalis et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0043046 A1 | 2/2011 | Joannopoulos et al. |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074347 A1 | 3/2011 | Karalis et al. |
| 2011/0089895 A1 | 4/2011 | Karalis et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193419 A1 | 8/2011 | Karalis et al. |
| 2011/0198939 A1 | 8/2011 | Karalis et al. |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2012/0068549 A1 | 3/2012 | Karalis et al. |
| 2012/0228960 A1 | 9/2012 | Karalis et al. |
| 2013/0181541 A1 | 7/2013 | Karalis et al. |
| 2014/0354071 A1 | 12/2014 | Hamam et al. |
| 2015/0188321 A1 | 7/2015 | Joannopoulos et al. |
| 2016/0301265 A1 | 10/2016 | Karalis et al. |
| 2019/0123586 A1 | 4/2019 | Karalis et al. |
| 2019/0173318 A1 | 6/2019 | Joannopoulos et al. |
| 2020/0343771 A1 | 10/2020 | Joannopoulos et al. |

FOREIGN PATENT DOCUMENTS

| | | | |
|---|---|---|---|
| CN | 1370341 | 9/2002 | |
| CN | 1703823 | 11/2005 | |
| CN | 1993863 | 7/2007 | |
| DE | 30 43 441 | 6/1982 | |
| DE | 38 24 972 | 1/1989 | |
| DE | 100 29147 | 12/2001 | |
| DE | 200 16 655 | 3/2002 | |
| DE | 102 21 484 | 11/2003 | |
| DE | 103 04584 | 8/2004 | |
| DE | 10 2005 03629 | 2/2007 | |
| DE | 102006044057 | 4/2008 | |
| EP | 1 296 407 | 3/2003 | |
| EP | 1 335 477 | 8/2003 | |
| EP | 1 521 206 | 4/2005 | |
| EP | 1 524 010 | 4/2005 | |
| EP | 2306615 | 4/2011 | ............. H02J 17/00 |
| EP | 1902505 | 9/2021 | ............. H02J 50/12 |
| GB | 2 307 379 | 5/1997 | |
| JP | 61-159804 | 7/1986 | |
| JP | 02-097005 | 4/1990 | |
| JP | 4-265875 | 9/1992 | |
| JP | 6-341410 | 12/1994 | |
| JP | 7-50508 | 2/1995 | |
| JP | 9-147070 | 6/1997 | |
| JP | 9-182323 | 7/1997 | |
| JP | 9-298847 | 11/1997 | |
| JP | 10-84304 | 3/1998 | |
| JP | 10-164837 | 6/1998 | |
| JP | 11-25238 | 1/1999 | |
| JP | 11-75329 | 3/1999 | |
| JP | 11-155245 | 6/1999 | |
| JP | 11-188113 | 7/1999 | |
| JP | 2000-148932 | 5/2000 | |
| JP | 2000-174676 | 6/2000 | |
| JP | 2001-309580 | 11/2001 | |
| JP | 2001-359279 | 12/2001 | |
| JP | 2002-10535 | 1/2002 | |
| JP | 2002-508916 | 3/2002 | |
| JP | 2003-179526 | 6/2003 | |
| JP | 2004-166459 | 6/2004 | |
| JP | 2004-201458 | 7/2004 | |
| JP | 2005-57444 | 3/2005 | |
| JP | 2005-149238 | 6/2005 | |
| JP | 2006-074848 | 3/2006 | |
| JP | 2007-505480 | 3/2007 | |
| JP | 2007-537637 | 12/2007 | |

(56) References Cited

FOREIGN PATENT DOCUMENTS

| | | |
|---|---|---|
| JP | 2009-501510 | 1/2009 |
| JP | 2012-105537 | 5/2012 |
| KR | 2000-0046258 | 7/2000 |
| KR | 10-2004-0072581 | 8/2004 |
| KR | 10-2007-0017804 | 2/2007 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/036761 | 1/2003 |
| WO | WO 03/081324 | 10/2003 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2005/124962 | 12/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/075058 | 7/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/039967 | 4/2010 |
| WO | WO 2010/090538 | 8/2010 |
| WO | WO 2010/090539 | 9/2010 |
| WO | WO 2011/062827 | 5/2011 |

OTHER PUBLICATIONS

"Intel CTO Says Gap between Humans, Machines Will Close by 2050", *Intel News Release*, (See intel.com/ .../20080821comp.htm?iid=S . . . ) (Printed Nov. 6, 2009).
"Intel Moves to Free Gadgets of Their Recharging Cords", By John Markoff, The New York Times—nytimes.com, Aug. 21, 2008.
"Physics Update, Unwired Energy", *Physics Today*, pp. 26, (Jan. 2007) (See http://arxiv.org/abs/physics/0611063.).
"Unwired energy questions asked, answered", *Physics Today*, pp. 16-17 (Sep. 2007).
"Wireless Energy Transfer Can Potentially Recharge Laptops, Cell Phones Without Cords", by Marin Soljacic of Massachusetts Institute of Technology and Davide Castelvecchi of American Institute of Physics (Nov. 14, 2006).
"'Evanescent coupling' could power gadgets wirelessly" by Celeste Biever, NewScientistsTech.com, (see http://www.newscientisttech.com/article.ns?id=dn10575&print=true) (Nov. 15, 2006).

"Air Power—Wireless data connections are common—now scientists are working on wireless power", by Stephen Cass, *Sponsored by Spectrum*, (See http://spectrum.ieee.org/computing/hardware/airpower) (Nov. 2006).
"Automatic Recharging, From a Distance" by Anne Eisenberg, The New York Times, (see www.nytimes.com/2012/03/11/business/built-in-wireless-chargeing-for-electronic-devices.html?_r=0) (published on Mar. 10, 2012).
"Electro-nirvana? Not so fast", by Alan Boyle, *MSNBC*, (Jun. 8, 2007).
"How Wireless Charging Will Make Life Simpler (and Greener)" by David Ferris, Forbes (See forbes.com/sites/davidferris/2012/07/24/how-wireless-charging-will-make-life-simpler-and-greener/print/) (dated Jul. 24, 2012).
"In pictures: A year in technology", *BBC News*, (Dec. 28, 2007).
"Lab report: Pull the plug for a positive charge", by James Morgan, *The Herald*, Web Issue 2680 (Nov. 16, 2006).
"Look, Ma—no wires!—Electricity broadcast through the air may someday run your home", by Gregory M. Lamb, Staff writer, *The Christian Science Monitor*, (See http://www.csmonitor.com/2006/1116/p14s01-stct.html) (Nov. 15, 2006).
"Man tries wirelessly boosting batteries", by Seth Borenstein, *AP Science Writer*, Boston.com, (See http://www.boston.com/business/technology/articles/2006/11/15/man_tries_wirelessly_b . . . ) (Nov. 15, 2006).
"Man tries wirelessly boosting batteries", by Seth Borenstein, The Associated Press, *USA Today*, (Nov. 16, 2006).
"*MIT discovery could unplug your iPod forever*", by Chris Reidy, Globe staff, Boston.com, (See http://www.boston.com.business/ticker/2007/06/mit_discovery_c.html) (Jun. 7, 2007).
"MIT Scientists Pave the Way for Wireless Battery Charging", by William M. Bulkeley, *The Wall Street Journal*, (See http://online.wsj.com/article/SB118123955540228045.html?mod=googlenews_wsj) (Jun. 8, 2007).
"MIT's wireless electricity for mobile phones", by Miebi Senge, *Vanguard*, (See http://www.vanguardngr.com/articles/2002/features/gsm/gsm211062007.htm) (Jun. 11, 2007).
"Next Little Thing 2010 Electricity without wires", Cnn Money (See money.cnn.com/galleries/2009/smallbusiness/0911/gallery.next_little_thing_2010.smb/) (dated Nov. 30, 2009).
"Outlets are Out", by Phil Berardelli, *ScienceNOW Daily News, Science Now*, (See http://sciencenow.sciencemag.org/cgi/content/full/2006/1114/2) (Nov. 14, 2006).
"Physics Promises Wireless Power" by Jonathan Fildes, Science and Technology Reporter, *BBC News*, (Nov. 15, 2006).
"Recharging gadgets without cables", *Infotech Online*, Printed from infotech.indiatimes.com (Nov. 17, 2006).
"Recharging, The Wireless Way—Even physicists forget to recharge their cell phones sometimes." by Angela Chang—PC Magazine, *ABC News Internet Ventures*, (2006).
"*Scientists light bulb with 'wireless electricity'*", www.Chinaview.cn, (See http://news.xinhuanet.com/english/2007-06/08/content_6215681.htm) (Jun. 2007).
"The Big Story for CES 2007: The public debut of eCoupled Intelligent Wireless Power" Press Release, Fulton Innovation LLC, Las Vegas, NV, Dec. 27, 2006.
"The end of the plug? Scientists invent wireless device that beams electricity through your home", by David Derbyshire, *Daily Mail*, (See http://www.dailymail.co.uk/pages/live/articles/technology.html?in_article_id=4 . . . ) (Jun. 7, 2007).
"The Power of Induction—Cutting the last cord could resonate with our increasingly gadget-dependent lives", by Davide Castelvecchi, *Science News Online*, vol. 172, No. 3, (Week of Jul. 21, 2007).
"The technology with impact 2007", by Jonathan Fildes, *BBC News*, (Dec. 27, 2007).
"The vision of an MIT physicist: Getting rid of pesky rechargers" by Gareth Cooks, Globe Staff, Boston.com, (Dec. 11, 2006).
"The world's first sheet-type wireless power transmission system: Will a socket be replaced by e-wall?" Press Release, Tokyo, Japan, Dec. 12, 2006.
"Wireless charging—the future for electric cars?" by Katia Moskvitch, *BBC News Technology* (See www.bbc.co.uk/news/technology-14183409) (dated Jul. 21, 2011).

(56) References Cited

OTHER PUBLICATIONS

"*Wireless Energy Lights Bulb from Seven Feet Away—Physicists vow to cut the cord between your laptop battery and the wall socket—with just a simple loop of wire*", by JR Minkel ScientificAmerican.com, (See http://www.sciam.com/article.cfm?articleid=07511C52-E7F2-99DF-3FA6ED2D7DC9AA2 . . . ) (Jun. 7, 2007).
"Wireless energy promise powers up" by Jonathan Fildes, *Science and Technology Report, BBC News*, (See http://news.bbc.co.uk/2/hi/technology/6725955.stm) (Jun. 7, 2007).
"Wireless Energy Transfer May Power Devices at a Distance", ScientificAmerican.com, (Nov. 14, 2006).
"Wireless Energy", by Clay Risen, *The New York Times*, (Dec. 9, 2007).
"Wireless power transfer possible", *PressTV*, (See http://www.presstv.ir/detail.aspx?id=12754&sectionid=3510208) (Jun. 11, 2007).
"*Wireless revolution could spell end of plugs*", by Roger Highfield, Science Editor, Telegraph.co.uk, (See http://www.telegraph.co.uk/news/main.jhtml?xml=/news/2007/06/07/nwireless107.xml) (Jun. 7, 2007).
A. Mediano et al. "Design of class E amplifier with nonlinear and linear shunt capacitances for any duty cycle", IEEE Trans. Microwave Theor. Tech., vol. 55, No. 3, pp. 484-492, (2007).
Abe et al. "A Noncontact Charger Using a Resonant Converter with Parallel Capacitor of the Secondary Coil". IEEE, 36(2):444-451, Mar./Apr. 2000.
Ahmadian et al., "Miniature Transmitter for Implantable Micro Systems", *Proceedings of the 25th Annual International Conference of the IEEE EMBS* Cancun, Mexico, pp. 3028-3031, Sep. 17-21, 2003.
Aiguo Patrick Hu, "Selected Resonant Converters for IPT Power Supplies", *Thesis submitted to the Department of Electrical and Electronic Engineering for the University of Auckland*, New Zealand (Oct. 2001).
Altchev et al. "Efficient Resonant Inductive Coupling Energy Transfer Using New Magnetic and Design Criteria". IEEE, pp. 1293-1298, 2005.
Amnon Yariv et al., "Coupled-resonator optical waveguide: a proposal and analysis", *Optics Letters*, vol. 24, No. 11, pp. 711-713 (Jun. 1, 1999).
Andre Kurs et al., "Wireless Power Transfer via Strongly Coupled Magnetic Resonances", *Science* vol. 317, pp. 83-86 (Jul. 6, 2007).
Andre Kurs et al., "Simultaneous mid-range power transfer to multiple devices", *Applied Physics Letters*, vol. 96, No. 044102 (2010).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Arthur W. Kelley et al., "Connectorless Power Supply for an Aircraft-Passenger Entertainment System", *IEEE Transactions on Power Electronics*, vol. 4, No. 3, pp. 348-354 (Jul. 1989).
Australian Office Action, Application No. 2006269374; dated Sep. 18, 2008; Applicant: Massachusetts Institute of Technology; 3 pages.
Australian Office Action, Application No. 2007349874; dated Apr. 27, 2011; Applicant: Massachusetts Institute of Technology; 3 pages.
Australian Office Action, Application No. 2009246310; dated Jun. 13, 2013; Applicant: Massachusetts Institute of Technology; 2 pages.
Australian Office Action, Application No. 2010200044; dated May 16, 2011; Applicant: Massachusetts Institute of Technology; 2 pages.
Australian Office Action, Application No. 2011203137; dated Apr. 18, 2013; Applicant: Massachusetts Institute of Technology; 3 pages.
Australian Office Action, Application No. 2011232776; dated Dec. 2, 2011; Applicant: Massachusetts Institute of Technology; 2 pages.
Australian Office Action, Application No. 2011232776; dated Feb. 15, 2013; Applicant: Massachusetts Institute of Technology; 3 pages.
B. E. Little, et al., "Microring Resonator Channel Dropping Filters", *Journal of Lightwave Technology*, vol. 15, No. 6, pp. 998-1005 (Jun. 1997).
Baker et al., "Feedback Analysis and Design of RF Power Links for Low-Power Bionic Systems," IEEE Transactions on Biomedical Circuits and Systems, 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Benjamin L. Cannon, et al., "Magnetic Resonant Coupling as a Potential Means for Wireless Power Transfer to Multiple Small Receivers", *IEEE Transactions on Power Electronics*, vol. 24, No. 7, pp. 1819-1825 (Jul. 2009).
Bladel, "Wealdy Coupled Dielectric Resonators", *IEEE Transactions on Microwave Theory and Techniques*, vol. 30, No. 11, pp. 1907-1914 (Nov. 1982).
Burri et al. "Invention Description" Feb. 5, 2008.
C. Fernandez et al., "A simple dc-dc converter for the power supply of a cochlear implant", *IEEE*, pp. 1965-1970 (2003).
Canadian Office Action, Application No. 2,615,123; dated Nov. 15, 2012; Applicant: Massachusetts Institute of Technology; 4 pages.
Canadian Office Action, Application No. 2,682,284; dated Feb. 25, 2015 Applicant: Massachusetts Institute of Technology; 4 pages.
Canadian Office Action, Application No. 2,682,284; dated Nov. 25, 2013; Applicant: Massachusetts Institute of Technology; 3 pages.
Chinese Office Action, Application No. 200680032299.2; dated Jan. 22, 2010; Applicant: Massachusetts Institute of Technology; 5 pages.
Chinese Office Action, Application No. 200680032299.2; dated Jun. 4, 2012; Applicant: Massachusetts Institute of Technology; 5 pages.
Chinese Office Action, Application No. 200680032299.2; dated Oct. 17, 2011; Applicant: Massachusetts Institute of Technology; 9 pages.
Chinese Office Action, Application No. 200780053126.3; dated Aug. 6, 2012; Applicant: Massachusetts Institute of Technology; 11 pages.
Chinese Office Action, Application No. 200780053126.3; dated Dec. 19, 2012; Applicant: Massachusetts Institute of Technology; 8 pages.
Chinese Office Action, Application No. 200780053126.3; dated Oct. 27, 2011; Applicant: Massachusetts Institute of Technology; 6 pages.
Chinese Office Action, Application No. 200980127634.0; dated Apr. 2, 2013; Applicant: Massachusetts Institute of Technology; 11 pages.
Chinese Office Action, Application No. 201010214681.3; dated Feb. 13, 2012; Applicant: Massachusetts Institute of Technology; 4 pages.
Chinese Office Action, Application No. 201010214681.3; dated Jan. 26, 2011; Applicant: Massachusetts Institute of Technology; 7 pages.
Chinese Office Action, Application No. 201010214681.3; dated May 29, 2012; Applicant: Massachusetts Institute of Technology; 4 pages.
Chinese Office Action, Application No. 201010214681.3; dated Nov. 2, 2011; Applicant: Massachusetts Institute of Technology; 7 pages.
Chinese Office Action, Application No. 201010214681.3; dated Oct. 10, 2012; Applicant: Massachusetts Institute of Technology; 3 pages.
Chinese Office Action, Application No. 201110185992.6; dated Apr. 11, 2012; Applicant: Massachusetts Institute of Technology; 5 pages.
Chinese Office Action, Application No. 201110185992.6; dated Jan. 4, 2013; Applicant: Massachusetts Institute of Technology; 10 pages.
Chinese Office Action, Application No. 201110311000.X; dated Dec. 6, 2013; Applicant: Massachusetts Institute of Technology; 20 pages.

(56) References Cited

OTHER PUBLICATIONS

Chinese Office Action, Application No. 201110311000.X; dated Jun. 18, 2013; Applicant: Massachusetts Institute of Technology; 20 pages.
Chinese Office Action, Application No. 201310280724.1; dated Jun. 16, 2015; Applicant: Massachusetts Institute of Technology (7 pages).
Clemens M. Zierhofer et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
3$^{rd}$ Chinese Office Action for Chinese Application No. 201310280724.1 dated Dec. 15, 2015 (6 pages).
Australia Patent Examination Report No. 2 for Australian Patent Application No. 2009246310 dated Aug. 21, 2014 (3 Pages).
Australian Patent Examination Report No. 1 for Australian Patent Application No. 2013203919 dated Apr. 14, 2014.
Chinese Office Action for Chinese Application No. 201210472059.1 dated Jan. 29, 2015 (13 pages).
Chinese Office Action for Chinese Application No. 201210472059.1 dated Jun. 5, 2014 (54 pages).
Chinese Office Action for Chinese Application No. 201310098809.8 dated Mar. 2, 2015 (10 pages).
Chinese Office Action for Chinese Application No. 201310585104.9 dated Mar. 2, 2015 (10 Pages).
Chinese Office Action for Chinese Patent Application No. 201110311000.X dated Jan. 19, 2015 (6 pages).
Chinese Office Action for Chinese Patent Application No. 201310280724.1 dated Oct. 8, 2014 (20 pages).
Communication from the European Patent Office for Patent Application No. 06 786 588.1 dated Oct. 20, 2014 (6 pages).
Communication from the European Patent Office for Patent Application No. 11 184 066.6 dated Oct. 20, 2014 (7 pages).
Decision to Refuse a European Patent Application for European Application No. EP 06 786 588.1 by Chairman Alan Davis dated Sep. 30, 2016 (71 pages).
Decision to Refuse a European Patent Application for European Application No. EP 11 184 066.6 by Chairman Alan Davis dated Sep. 30, 2016 (38 pags).
European Communication for Application No. 06786588.1 dated Aug. 20, 2014 (23 pages).
European Patent Office Communication for European Patent Application No. 06786588.1. dated Jun. 17, 2016 (3 pages).
European Search Report for European Application No. 11150603 dated May 23, 2017 (9 pages).
European Search Report with regard to Application Serial No. 11184066.6 dated Mar. 20, 2013.
Examination Report for Australia Application No. 2006269374, dated Sep. 18, 2008.
Examination Report from the Indian Patent Office for Indian Application No. 8449/DELNP/2011 dated Sep. 28, 2017.
Extended Search Report for European Application No. 11 15 0602 dated May 31, 2017.
Final Office Action for U.S. Appl. No. 13/477,459 dated Sep. 22, 2015 (18 pages).
Final Office Action for U.S. Appl. No. 13/789,860 dated Nov. 20, 2015 (23 pages).
Final Office Action with regard to U.S. Appl. No. 12/639,958 dated Jun. 6, 2013 (18 pages).
Final Office Action with regard to U.S. Appl. No. 12/639,963 dated Jun. 18, 2013 (16 pages).
Final Office Action with regard to U.S. Appl. No. 12/649,635 dated Jun. 20, 2013 (20 pages).
Final Office Action with regard to U.S. Appl. No. 12/649,777 dated Jun. 26, 2013 (17 pages).
Final Office Action with regard to U.S. Appl. No. 12/649,813 dated Jun. 24, 2013 (17 pages).
Final Office Action with regard to U.S. Appl. No. 12/649,852 dated Jun. 27, 2013 (19 pages).
Final Office Action with regard to U.S. Appl. No. 12/649,904 dated Sep. 26, 2013 (23 pages).
Final Office Action with regard to U.S. Appl. No. 12/639,966 dated Oct. 9, 2012 (20 pages).
Final Office Action with regard to U.S. Appl. No. 12/639,967 dated Oct. 5, 2012 (21 pages).
First Examination Report from the Indian Patent Office for Indian Patent Application No. 6195/DELNP/2009 dated Feb. 9, 2017.
International Preliminary Report on Patentability for International Application No. PCT/US2006/026480, dated Jan. 29, 2008.
International Preliminary Report on Patentability with regard to International Application No. PCT/US2007/070892 dated Sep. 29, 2009.
International Search Report and Written Opinion for International Application No. PCT/US09/43970, dated Jul. 14, 2009.
International Search Report and Written Opinion for International Application No. PCT/US2006/026480, dated Dec. 21, 2007.
International Search Report and Written Opinion for International Application No. PCT/US2007/070892, dated Mar. 3, 2008.
International Search Report and Written Opinion of the International Searching Authority for International Application No. PCT/US2011/027868 dated Jul. 5, 2011.
International Search Report for International Application No. PCT/US09/58499 dated Dec. 10, 2009.
Japanese Office Action for Japanese Application No. 2011-509705 dated Jul. 1, 2014 (28 pages).
Japanese Office Action for Japanese Office Action No. 2013-223597 dated Nov. 17, 2015 (8 pages).
Japanese Office Action for Japanese Patent Application No. 2014-084540 dated Feb. 10, 2015 (18 pages).
Japanese Office Action for Japanese Patent Application No. 2016-093460 dated May 23, 2017.
Japanese Office Action for Patent Application No. 2013-223597 dated Nov. 11, 2014 (16 pages).
Korean Office Action for Korean Application No. 10-2009-7022442 by the Examination Bureau of the Korean Intellectual Property Office dated Oct. 18, 2012.
Korean Office Action for Korean Application No. 10-2011-7023643 by the Examination Bureau of the Korean Intellectual Property Office dated Oct. 23, 2012.
Korean Office Action for Patent Application No. 10-2011-7023643 from the Examination Bureau of the Korean Intellectual Property Office dated Sep. 26, 2014 (7 pages).
Non-Final Office Action for U.S. Appl. No. 12/639,963 dated Feb. 27, 2014 (19 pages).
Non-Final Office Action for U.S. Appl. No. 12/648,604 dated Dec. 5, 2011.
Non-Final Office Action for U.S. Appl. No. 12/649,635 dated Feb. 27, 2014 (18 pages).
Non-Final Office Action for U.S. Appl. No. 12/649,777 dated Feb. 26, 2014 (16 pages).
Non-Final Office Action for U.S. Appl. No. 12/649,813 dated Feb. 27, 2014 (16 pages).
Non-Final Office Action for U.S. Appl. No. 12/649,852 dated Feb. 27, 2014 (17 pages).
Non-Final Office Action for U.S. Appl. No. 12/726,742 dated May 11, 2012.
Non-Final Office Action for U.S. Appl. No. 13/030,395 dated May 17, 2012.
Non-Final Office Action for U.S. Appl. No. 13/036,177 dated May 15, 2012.
Non-Final Office Action for U.S. Appl. No. 13/040,810 dated May 17, 2012.
Non-Final Office Action for U.S. Appl. No. 13/078,511 dated May 15, 2012.
Non-Final Office Action for U.S. Appl. No. 13/477,459 dated Mar. 12, 2015 (62 pages).
Non-Final Office Action for U.S. Appl. No. 13/789,860 dated Mar. 13, 2015 (51 pages).
Non-Final Office Action for U.S. Appl. No. 14/302,662 dated Mar. 12, 2015 (42 pages).
Non-Final Office Action for U.S. Appl. No. 14/629,709 dated Aug. 14, 2015 (40 pages).

(56) References Cited

OTHER PUBLICATIONS

Non-Final Office Action with regard to U.S. Appl. No. 12/949,580 dated Jun. 17, 2013 (55 pages).
Non-Final Office Action with regard to U.S. Appl. No. 12/415,667 dated Oct. 5, 2012 (20 pages).
Non-Final Office Action with regard to U.S. Appl. No. 12/639,958 dated Aug. 16, 2012 (21 pages).
Non-Final Office Action with regard to U.S. Appl. No. 12/639,963 dated Aug. 31, 2012 (20 pages).
Non-Final Office Action with regard to U.S. Appl. No. 12/646,524 dated Oct. 1, 2012 (11 pages).
Non-Final Office Action with regard to U.S. Appl. No. 12/649,635 dated Dec. 21, 2012 (41 pages).
Non-Final Office Action with regard to U.S. Appl. No. 12/649,777 dated Dec. 24, 2012 (43 pages).
Non-Final Office Action with regard to U.S. Appl. No. 12/649,813 dated Dec. 21, 2012 (40 pages).
Non-Final Office Action with regard to U.S. Appl. No. 12/649,852 dated Dec. 21, 2012 (41 pages).
Non-Final Office Action with regard to U.S. Appl. No. 12/649,904 dated Dec. 28, 2012 (43 pages).
Non-Final Office Action with regard to U.S. Appl. No. 12/868,852 dated Oct. 10, 2012 (26 pages).
Non-Final Office Action with regard to U.S. Appl. No. 12/949,544 dated Sep. 5, 2012 (41 pages).
Notice of Allowance from the U.S. Appl. No. 13/477,459 dated Mar. 31, 2016 (13 pages).
PCT International Search Report and Written Opinion for PCT/US09/59244, dated Dec. 7, 2009, 12 pages.
U.S. Appl. No. 60/908,383, filed Mar. 27, 2007.
Submission of Publication to the Japanese Patent Office for Japanese Application No. 2011-256,729, translation.
Submission of Publication to the Japanese Patent Office for Japanese Application No. 2011-509,705, translation.
Summons to Attend Oral Proceedings for Application No. 06 786 588.1 dated Feb. 4, 2016 (31 pages).
Summons to Attend Oral Proceedings for Application No. 11 184 066.6 dated Feb. 8, 2016 (17 pages).
Translation of Information Statement by Third Party submitted to the Japanese Patent Office for Japanese Application No. 2011-83009, translation.
U.S. Patent and Trademark Office Notice of Allowance for U.S. Appl. No. 15/083,726 dated Aug. 3, 2017 (10 pages).
Covic et al., "Inductive Power Transfer", *Proceedings of the IEEE*, vol. 101, No. 6, pp. 1276-1289.
Covic et al., "Modern Trends in Inductive Power Transfer for Transportation Applications", *IEEE Journal of Emerging and Selected Topics in Power Electronics*, vol. 1, No. 1, pp. 28-41 (Mar. 2013).
D.H.Freedman. "Power on a Chip". MIT Technology Review, Nov. 2004.
David H. Staelin et al., *Electromagnetic Waves*, Chapters 2, 3, 4, and 8, pp. 46-176 and 336-405 (Prentice Hall Upper Saddle River, New Jersey 1998).
David Schneider, "A Critical Look at Wireless Power", *IEEE Spectrum*, (May 2010).
David Schneider, "Wireless Power at a distance is still far away", *A Critical Look at Wireless Power—IEEE Spectrum*, http://spectrum.ieee.org/transportation/mass-transit/a-critical-look-at-wireless-power, (Apr. 30, 2010) (7 pages).
David Vilkomerson et al., "Implantable Doppler System for Self-Monitoring Vascular Grafts", *IEEE Ultrasonics Symposium*, pp. 461-465 (2004).
De Beoij et a., "Contactless Energy Transfer to a Moving Load Part I: Topology Synthesis and FEM simulation", *IEEE ISLE*, Montreal, Quebec Canada, pp. 739-744 (Jul. 9-12, 2006).
De Beoij et a., "Contactless Energy Transfer to a Moving Load Part II: Simulation of Electrical and Mechanical Transient", *IEEE ISLE*, Montreal, Quebec Canada, pp. 745-750 (Jul. 9-12, 2006).
Electricity Unplugged, Feature: Wireless Energy, *Physics World*, pp. 23-25 (Feb. 2009).

EPO Office Action for EP Application No. 07 784 396.9 dated Nov. 7, 2016 (5 pages).
Esser et al. "A New Approach to Power Supplies for Robots". IEEE, 27(5):872-875, Sep./Oct. 1991.
European Examination Report dated Jan. 15, 2009 in connection with Application No. 06 786. 588.1-1242.
European Office Action, Application No. 06 786 588.1; dated Apr. 24, 2013; Applicant: Massachusetts Institute of Technology; 4 pages.
European Office Action, Application No. 06 786 588.1; dated Dec. 3, 2013; Applicant: Massachusetts Institute of Technology; 6 pages.
European Office Action, Application No. 06 786 588.1; dated Jan. 15, 2009; Applicant: Massachusetts Institute of Technology; 5 pages.
European Office Action, Application No. 11 184 066.6; dated Dec. 3, 2013; Applicant: Massachusetts Institute of Technology; 5 pages.
F. Turki, "A wireless battery charger concept with lightweight and low cost vehicle equipment: eCPS," in Proc. Conference on Electric Roads & Vehicles, Feb. 2013, pp. 1-21.
Faria, J. A. Brandao, "Poynting Vector Flow Analysis for Contactless Energy Transfer in Magnetic Systems", *IEEE Transactions on Power Electronics*, vol. 27, No. 10, pp. 4292-4300 (Oct. 2012).
Fenn et al., "Linear Array Characteristics with One-Dimensional Reactive-Region Near-Field Scanning: Simulations and Measurements", *IEEE Transactions on Antennas and Propagation*, vol. 39, No. 9, pp. 1305-1311 (Sep. 1991).
Fenske et al. "Dielectric Materials at Microwave Frequencies". Applied Microwave & Wireless, pp. 92-100, 2000.
Fildes, Jonathan, "Wireless Energy Promise Powers Up", BBC News, Jun. 7, 2007 (See http://news.bbc.co.uk/2/hi/6725955.stm).
Finkenzeller, Klaus, RFID Handbook—Fundamentals and Applications in Contactless Smart Cards—, Nikkan Kohgyo-sya, Kanno Taihei, first version, pp. 32-37, 253 (Aug. 21, 2001).
Fumiaki Nakao et al., "Ferrite Core Couplers for Inductive Chargers", *IEEE, PCC-Osaka 2002*, pp. 850-854 (2002).
G. Scheible et al., "Novel Wireless Power Supply System for Wireless Communication Devices in Industrial Automation Systems", *IEEE*, (2002).
Gary Peterson, "MIT WiTricity Not So Original After All", *Feed Line No. 9*, (See http://www.tfcbooks.com/articles/witricity.htm) printed Nov. 12, 2009.
Geyi, Wen. A Method for the Evaluation of Small Antenna Q. IEEE Transactions on Antennas and Propagation, vol. 51, No. 8, Aug. 2003.
GuoMin Zhang, et al., "Wireless Power Transfer Using High Temperature Superconducting Pancake Coils", *IEEE Transactions on Applied Superconductivity*, vol. 24, No. 3 (Jun. 2014) (5 pages).
Guoxing Wang et al., "Power Supply Topologies for Biphasic Stimulation in Inductively Powered Implants", *IEEE*, pp. 2743-2746 (2005).
Gurhan Alper Kendir et al., "An Efficient Inductive Power Link Design for Retinal Prosthesis", *IEEE*, ISCAS 2004, pp. IV-41-IV-44 (2004).
H. Sekiya et al. "FM/PWM control scheme in class DE inverter", IEEE Trans. Circuits Syst. I, vol. 51, No. 7 (Jul. 2004).
Haus et al., "Coupled-Mode Theory", *Proceedings of the IEEE*, vol. 79, No. 10, pp. 1505-1518 (Oct. 1991).
Haus, H.A., "Waves and Fields in Optoelectronics," Chapter 7 "Coupling of Modes—Resonators and Couplers" (Prentice-Hall, New Jersey, 1984).
Heikkinen et al. "Performance and Efficiency of Planar Rectennas for Short-Range Wireless Power Transfer at 2.45 GHz". Microwave and Optical Technology Letters, 31(2):86-91, Oct. 20, 2001.
Hirai et al. "Integral Motor with Driver and Wireless Transmission of Power and Information for Autonomous Subspindle Drive". IEEE, 15(1):13-20, Jan. 2000.
Hirai et al. "Practical Study on Wireless Transmission of Power and Information for Autonomous Decentralized Manufacturing System". IEEE, 46(2):349-359, Apr. 1999.
Hirai et al. "Study on Intelligent Battery Charging Using Inductive Transmission of Power and Information". IEEE, 15(2):335-345, Mar. 2000.

(56) References Cited

OTHER PUBLICATIONS

Hirai et al. "Wireless Transmission of Power and Information and Information for Cableless Linear Motor Drive". IEEE 15(1):21-27, Jan. 2000.
Ho et al., "A Comparative Study Between Novel Witricity and Traditional Inductive Magnetic Coupling in Wireless Charging", IEEE Transactions on Magnetics, vol. 47, No. 5, pp. 1522-1525 (May 2011).
Hui et al., "A Critical Review of Recent Progress in Mid-Range Wireless Power Transfer", *IEEE Transactions on Power Electronics*, vol. 29, No. 9, pp. 4500-4511 (Sep. 2014).
J. B. Pendry. "A Chiral Route to Negative Refraction". Science 306:1353-1355 (2004).
J. C. Schuder et al., "Energy Transport Into the Closed Chest From a Set of Very-Large Mutually Orthogonal Coils", Communication Electronics, vol. 64, pp. 527-534 (Jan. 1963).
J. Meins, "Inductive Power Transfer Basics, Design Optimizations, Applications", *Conference on Electric Roads & Vehicles*, Institute for Electrical Machines, Traction and Drives, Technical University of Braunschweig, Park City, Utah (Feb. 4-5, 2013) (42 pages).
J. Schutz et al., "Load Adaptive Medium Frequency Resonant Power Supply", *IEEE*, (2002).
J.T. Boys et al., "Stability and control of inductively coupled power transfer systems", *IEE Proc. Electr. Power Appl.*, vol. 147, No. 1, pp. 37-43 (Jan. 2000).
Jackson, J. D. ,"Classical Electrodynamics",3rd Edition, Wiley, New York,1999,pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Japanese Office Action, Application No. 2008-521453; dated Jan. 4, 2011; Applicant: Massachusetts Institute of Technology; 3 pages.
Japanese Office Action, Application No. 2010-500897; dated May 29, 2012; Applicant: Massachusetts Institute of Technology; 7 pages.
Japanese Office Action, Application No. 2011-083009; dated Jul. 2, 2013; Applicant: Massachusetts Institute of Technology; 5 pages.
Japanese Office Action, Application No. 2011-256729; dated May 28, 2013; Applicant: Massachusetts Institute of Technology; 7 pages.
Japanese Office Action, Application No. 2011-509705; dated Jul. 16, 2013; Applicant: Massachusetts Institute of Technology; 10 pages.
John C. Schuder "Powering an Artificial Heart: Birth of the Inductively Coupled-Radio Frequency System in 1960", Artificial Organs, vol. 26, No. 11, pp. 909-915 (2002).
John C. Schuder et al., "An Inductively Coupled RF System for the Transmission of 1 kW of Power Through the Skin", IEEE Transactions on Bio-Medical Engineering, vol. BME-18, No. 4 (Jul. 1971).
John M. Miller et al., "Elements of Wireless Power Transfer Essential to High Power Charging of Heavy Duty Vehicles", *IEEE Transactions on Transportation Electrification*, vol. 1, No. 1, pp. 26-39 (Jun. 2015).
John T. Boys et al., "The Inductive Power Transfer Story at the University of Auckland", *IEEE Circuits and Systems Magazine*, Second Quarter 2015, pp. 6-27 (May 21, 2015).
Joseph C. Stark III, "Wireless Power Transmission Utilizing a Phased Array of Tesla Coils", Master Thesis, Massachusetts Institute of Technology (2004).
Joyce K. S. Poon, et al., "Designing coupled-resonator optical waveguide delay lines", *J. Opt. Soc. Am. B*, vol. 21, No. 9, pp. 1665-1673 (Sep. 2004).
Juan C. Olivares-Galvan et al., "Wireless Power Transfer: Literature Survey", *Power, Electronics and Computing (ROPEC), 2013 IEEE International Autumn Meeting* on Nov. 13-15, 2013, Mexico City, (2013) (7 pages).
K. Kanelis et al., "Maximum Efficiency in Non-Radiative Wireless Power Transfer", companion paper for *Wireless Power Congress*, Munich, Germany (Jul. 12-13, 2017) (8 pages).
K. Kanelis et al., "Maximum Efficiency in Non-Radiative Wireless Power Transfer", *Wireless Power Congress*, Munich, Germany (Jul. 12-13, 2017) (28 pages).
Kawamura et al. "Wireless Transmission of Power and Information Through One High-Frequency Resonant AC Link Inverter for Robot Manipulator Applications". IEEE, 32(3):503-508, May/Jun. 1996.
Klaus Finkenzeller, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Korean Office Action, Application No. 10-2008-7003376; dated Mar. 7, 2011; Applicant: Massachusetts Institute of Technology; 3 pages.
Korean Office Action, Application No. 10-2009-7022442; dated Jan. 31, 2013; Applicant: Massachusetts Institute of Technology; 6 pages.
Korean Office Action, Application No. 10-2009-7022442; dated Oct. 18, 2012; Applicant: Massachusetts Institute of Technology; 5 pages.
Korean Office Action, Application No. 10-2011-7013029; dated Aug. 9, 2011; Applicant: Massachusetts Institute of Technology; 4 pages.
Korean Office Action, Application No. 10-2011-7023643; dated Jan. 31, 2013; Applicant: Massachusetts Institute of Technology; 3 pages.
Korean Office Action, Application No. 10-2011-7023643; dated Oct. 23, 2012; Applicant: Massachusetts Institute of Technology; 5 pages.
Korean Office Action, Application No. 10-2013-7013521; dated Aug. 8, 2013; Applicant: Massachusetts Institute of Technology; 2 pages.
Korean Office Action, Application No. 10-2015-7005681; dated May 1, 2015; Applicant: Massachusetts Institute of Technology; 6 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Liu, et al., "Determining the power distribution between two coupled coils based on Poynting vector analysis", *IEEE*, 6 pages, (Jun. 2017).
M. Chaoui et al, "Electrical Modeling of Inductive Links for High-Efficiency Energy Transmission", *Electronics, Circuits and Systems, 2005. ICECS 2005. 12$^{th}$ IEEE International Conference*, (Dec. 2005).
M. V. Jacob et al. "Lithium Tantalate—A High Permittivity Dielectric Material for Microwave Communication Systems". Proceedings of IEEE TENCON—Poster Papers, pp. 1362-1366, 2003.
Marin Soljacic et al., "Photonic-crystal slow-light enhancement of nonlinear phase sensitivity", *J. Opt. Soc. Am B*, vol. 19, No. 9, pp. 2052-2059 (Sep. 2002).
Marin Soljacic, "Wireless Non-Radiative Energy Transfer— PowerPoint Presentation", *Amazing Light: Visions for Discovery*, An International Symposium, Oct. 6-8, 2005, University of California, Berkeley (2005).
Marin Soljacic, "Wireless nonradiative energy transfer", *Visions of Discovery New Light on Physics, Cosmology, and Consciousness*, Cambridge University Press, New York, NY pp. 530-542 (2011).
Mickel Budhia et al., "Design and Optimization of Circular Magnetic Structures for Lumped Inductive Power Transfer Systems", *IEEE Transactions on Power Electronics*, vol. 26, No. 11, pp. 3096-3108 (Nov. 2011).
Mickel Budhia et al., "Development and evaluation of single sided flux couplers for contactless electric vehicle charging", *IEEE*, pp. 614-621 (2011).
Microchip Technology Inc., "microID 13.56 MHz Design Guide— MCRF355/360 Reader Reference Design," 24 pages (2001).
MIT Team Experimentally Demonstrates Wireless Power Transfer, Potentially Useful for Power Laptops, Cell-Phones Without Cords—

(56) References Cited

OTHER PUBLICATIONS

Goodbye Wires . . . , by Franklin Hadley, Institute for Soldier Nanotechnologies, Massachusetts Institute of Technology (Jun. 7, 2007).
Nikola Tesla, "High Frequency Oscillators for Electro-Therapeutic and Other Purposes", *Proceedings of the IEEE*, vol. 87, No. 7, pp. 1282-1292 (Jul. 1999).
Nikola Tesla, "High Frequency Oscillators for Electro-Therapeutic and Other Purposes", *The Electrical Engineer*, vol. XXVI, No. 50 (Nov. 17, 1898).
O'Brien et al. "Analysis of Wireless Power Supplies for Industrial Automation Systems". IEEE, pp. 367-372, 2003.
O'Brien et al. "Design of Large Air-Gap Transformers for Wireless Power Supplies". IEEE, pp. 1557-1562, 2003.
Phil Schewe et al., "Berkeley Symposium Celebrates Laser Pioneer", *Physics News Update*, No. 749 #1, Oct. 13, 2005 (3 pages).
Powercast LLC. "White Paper" Powercast simply wire free, 2003.
R. Mecke et al., "High frequency resonant inverter for contactless energy transmission over large air gap", *2004 35th Annual IEEE Power Electronics Specialists Conference*, Aachen, Germany, pp. 1737-1743 (2004).
Rudolf Mecke et al., "Analysis of inductive energy transmission systems with large air gap at high frequencies", *European Conference on Power Electronics and Applications, Toulouse 2003*, (Jan. 2003).
S. Sensiper. Electromagnetic wave propogation on helical conductors. PhD Thesis, Massachusetts Institute of Technology, 1951.
Sakamoto et al. "A Novel Circuit for Non-Contact Charging Through Electro-Magnetic Coupling". IEEE, pp. 168-174, 1992.
Sekitani et al. "A large-area flexible wireless power transmission sheet using printed plastic MEMS switches and organic field-effect transistors". [Publication Unknown].
Sekitani et al. "A large-area wireless power-transmission sheet using printed organic transistors and plastic MEMS switches" www.nature.com/naturematerials. Published online Apr. 29, 2007.
Seung-Hwan Lee et al., "Development and Validation of Model for 95%-Efficiency 220-W Wireless Power Transfer Over a 30-cm Air Gap", *IEEE Transactions on Industry Applications*, vol. 47, No. 6, pp. 2495-2504 (Nov./Dec. 2011).
Shamonina et al., "Magneto-inductive waveguide", *Electronics Letters*, vol. 38, No. 8, pp. 371-373 (Apr. 11, 2002).
Shanhui Fan et al., "Rate-Equation Analysis of Output Efficiency and Modulation Rate of Photomic-Crystal Light-Emitting Diodes", IEEE Journal of Quantum Electronics, vol. 36, No. 10, pp. 1123-1130 (Oct. 2000).
Soljacic. "Wireless Non-Radiative Energy Transfer—PowerPoint presentation". Massachusetts Institute of Technology, Oct. 6, 2005.
Someya, Takao. "The world's first sheet-type wireless power transmission system". University of Tokyo, Dec. 12, 2006.
Splashpower, "Splashpower—World Leaders in Wireless Power," PowerPoint presentation, 30 pages (Sep. 3, 2007).
Stewart, Will, "The Power to Set you Free", Science, vol. 317, pp. 55-56 (Jul. 6, 2007).
Syms et al., "Magneto-inductive waveguide devices", *IEEE Proc.-Microw. Antennas Propag.*, vol. 153, No. 2., pp. 111-121 (Apr. 2006).
T. Aoki et al. Observation of strong coupling between one atom and a monolithic microresonator. Nature 443:671-674 (2006).
Takahashi Ohira, "What in the World is Q?", *IEEE Microwave Magazine*, pp. 42-49 (Jun. 2016).
Takanashi et al., "A Large Air Gap 3 kW Wireless Power Transfer System for Electric Vehicles", *IEEE*, pp. 269-274 (2012).
Takehiro Imura, et al., "Maximizing Air Gap and Efficiency of Magnetic Resonant Coupling for Wireless Power Transfer Using Equivalent Circuit and Neumann Formula", *IEEE Transactions on Industrial Electronics*, vol. 58, No. 10, pp. 4746-4752 (Oct. 2011).
Tang, S.C et al.,"Evaluation of the Shielding Effects on Printed-Circuit-Board Transformers Using Ferrite Plates and Copper Sheets",IEEE Transactions on Power Electronics,vol. 17, No. 6,Nov. 2002.,pp. 1080-1088.
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Vandevoorde et al. "Wireless energy transfer for stand-alone systems: a comparison between low and high power applicability". Sensors and Actuators, A 92:305-311, 2001.
Villeneuve, Pierre R. et al.,"Microcavities in photonic crystals: Mode symmetry, tunability, and coupling efficiency",Physical Review B, vol. 54, No. 11 , Sep. 15, 1996,pp. 7837-7842.
Wang et al., "Load models and their application in the design of loosely coupled inductive power transfer systems", *IEEE*, pp. 1053-1058 (2000).
Xun Liu, "Qi Standard Wireless Power Transfer Technology Development Toward Spatial Freedom", *IEEE Circuits and Systems Magazine*, Second Quarter 2015, pp. 32-39 (May 21, 2015).
Yates David C. et al.,"Optimal Transmission Frequency for Ultralow-Power Short-Range Radio Links", *IEEE Transactions on Circuits and Systems—1*, Regular Papers, vol. 51, No. 7, pp. 1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224; Oct. 30-Nov. 2, 1997 (4 pages).
U.S. Appl. No. 11/481,077, filed Jul. 5, 2006, Issued.
U.S. Appl. No. 12/055,963, filed Mar. 26, 2008, Issued.
U.S. Appl. No. 12/415,650, filed Mar. 31, 2009, Issued.
U.S. Appl. No. 12/415,616, filed Mar. 31, 2009, Issued.
U.S. Appl. No. 12/415,655, filed Mar. 31, 2009, Issued.
U.S. Appl. No. 12/415,667, filed Mar. 31, 2009, Issued.
U.S. Appl. No. 12/437,641, filed May 9, 2009, Issued.
U.S. Appl. No. 12/466,065, filed May 14, 2009, Issued.
U.S. Appl. No. 12/553,957, filed Sep. 3, 2009, Abandoned.
U.S. Appl. No. 12/571,949, filed Oct. 1, 2009, Issued.
U.S. Appl. No. 12/639,958, filed Dec. 16, 2009, Abandoned.
U.S. Appl. No. 12/639,961, filed Dec. 16, 2009, Issued.
U.S. Appl. No. 12/639,962, filed Dec. 16, 2009, Issued.
U.S. Appl. No. 12/639,963, filed Dec. 16, 2009, Issued.
U.S. Appl. No. 12/639,966, filed Dec. 16, 2009, Issued.
U.S. Appl. No. 12/639,967, filed Dec. 16, 2009, Issued.
U.S. Appl. No. 12/639,972, filed Dec. 16, 2009, Issued.
U.S. Appl. No. 12/646,442, filed Dec. 23, 2009, Issued.
U.S. Appl. No. 12/646,524, filed Dec. 23, 2009, Issued.
U.S. Appl. No. 12/649,635, filed Dec. 30, 2009, Issued.
U.S. Appl. No. 12/649,777, filed Dec. 30, 2009, Issued.
U.S. Appl. No. 12/649,813, filed Dec. 30, 2009, Issued.
U.S. Appl. No. 12/649,852, filed Dec. 30, 2009, Issued.
U.S. Appl. No. 12/649,904, filed Dec. 30, 2009, Issued.
U.S. Appl. No. 12/649,973, filed Dec. 30, 2009, Issued.
U.S. Appl. No. 12/688,305, filed Jan. 15, 2010, Abandoned.
U.S. Appl. No. 12/688,339, filed Jan. 15, 2010, Abandoned.
U.S. Appl. No. 12/708,850, filed Feb. 19, 2010, Abandoned.
U.S. Appl. No. 12/713,556, filed Feb. 26, 2010, Abandoned.
U.S. Appl. No. 12/717,559, filed Mar. 4, 2010, Abandoned.
U.S. Appl. No. 12/726,742, filed Mar. 18, 2010, Abandoned.
U.S. Appl. No. 12/726,913, filed Mar. 18, 2010, Abandoned.
U.S. Appl. No. 12/726,953, filed Mar. 18, 2010, Abandoned.
U.S. Appl. No. 12/732,399, filed Mar. 26, 2010, Abandoned.
U.S. Appl. No. 12/949,504, filed Nov. 18, 2010, Abandoned.
U.S. Appl. No. 12/949,544, filed Nov. 18, 2010, Abandoned.
U.S. Appl. No. 12/949,580, filed Nov. 18, 2010, Abandoned.
U.S. Appl. No. 13/036,177, filed Feb. 28, 2011, Abandoned.
U.S. Appl. No. 13/288,308, filed Nov. 3, 2011, Abandoned.
U.S. Appl. No. 13/477,459, filed May 22, 2012, Issued.
U.S. Appl. No. 13/677,407, filed Nov. 15, 2012, Issued.
U.S. Appl. No. 13/789,860, filed Mar. 8, 2013, Issued.
U.S. Appl. No. 14/302,662, filed Jun. 12, 2014, Issued.
U.S. Appl. No. 14/629,709, filed Feb. 24, 2015, Issued.

(56) References Cited

OTHER PUBLICATIONS

U.S. Appl. No. 14/666,683, filed Mar. 24, 2015, Issued.
U.S. Appl. No. 15/083,726, filed Mar. 29, 2016, Issued.
U.S. Appl. No. 15/186,969, filed Jun. 20, 2016, Issued.
U.S. Appl. No. 15/793,198, filed Oct. 25, 2017, Issued.
U.S. Appl. No. 16/137,795, filed Sep. 21, 2018, Pending.
U.S. Appl. No. 16/184,354, filed Nov. 8, 2018, Issued.
U.S. Appl. No. 16/851,598, filed Apr. 17, 2020, Pending.
Analog Devices, Inc. Ultrahigh Speed Phase/Frequency Discriminator, AD9901 Datasheet (1999).
The Petition for Inter Partes Review of U.S. Pat. No. 7,741,734 filed with the U.S. Patent and Trademark Office on Jun. 21, 2021.
The Complaint of *WiTricity Corporation, Massachusetts Institute of Technology, and Auckland Uniservices Limited v. Momentum Dynamics Corporation* filed in the United States District Court for the District of Delaware on Dec. 9, 2020.
The Patent Owner's Preliminary Response, *Momentum Dynamics Corporation*, Petition, v. *WiTricity Corporation*, Patent Owner, filed with the United States Patent and Trademark Office Before the Patent Trial and Appeal Board, Case No. IPR2021-01165, U.S. Pat. No. 7,741,734, filed on Oct. 20, 2021.
The Decision Denying Institution of the Inter Partes Review, *Momentum Dynamics Corporation*, Petition, v. *WiTricity Corporation*, Patent Owner, received from the United States Patent and Trademark Office Before the Patent Trial and Appeal Board, Case No. IPR2021-01 165, U.S. Pat. No. 7,741,734, dated Dec. 10, 2021.
The Minutes of the Oral Proceeding from the European Patent Office for Application No. EP 06786588.1, dated Jan. 19, 2021.
The Board of Appeals Decision from the European Patent Office for Application No. EP 06786588.1, dated Mar. 22, 2021.
The Communication of a Notice of Opposition from the European Patent Office for Application No. EP 11150603.6, dated Jun. 11, 2021.
The Opposition Brief Opposing EP 2306615, dated Feb. 26, 2021.
Curriculum Vitae of Darrin J. Young submitted with the Inter Partes Review of U.S. Pat. No. 7,741,734, filed on Jun. 21, 2021.
Declaration of Dr. Darrin J. Young in Support of Petition for Inter Partes Review of U.S. Pat. No. 7,741,734, dated Jun. 18, 2021.
Declaration of Sylvia D. Hall-Ellis, Ph.D. dated Jun. 17, 2021.
Green, E., "The Story of Q", *American Scientist*, vol. 43, No. 4, pp. 584-594 (Oct. 1955).
Ko, W., et al., "Design of radio-frequency powered coils for implant instruments", *Medical & Biological Engineering & Computing*, vol. 15, pp. 634-640 (1977).
O'Brien, K., "Inductively Coupled Radio Frequency Power Transmission System for Wireless Systems and Devices", *IEEE 2006 37th Annual Power Electronics Specialists Conference*, (Jul. 2006).
Rackles, "Report Wireless Power Transfer", *Comparison of State of the Art in 2005* with Patent Applications EP 2306615 and EP 2306616 (Oct. 27, 2020).
Terman, F., et al. *Electronic and Radio Engineering*, (4th Edition), pp. 1-168 (1947).
The Petitioner's Request for Rehearing of Decision Denying Institution, *Momentum Dynamics Corporation*, Petition, v. *WiTricity Corporation*, Patent Owner, filed with the United States Patent and Trademark Office Before the Patent Trial and Appeal Board, Case No. IPR2021-01165, U.S. Pat. No. 7,741,734, filed on Jan. 10, 2022.
The Judgment, Final Written Decision Determining All Challenged Claims Unpatentable 35 U.S.C. § 318(a), *Inductive Inc.*, Petitioner, v. *WiTricity Corporation*, Patent Owner, issued by the United States Patent and Trademark Office Before the Patent Trial and Appeal Board, Case No. IPR2021-01165, U.S. Pat. No. 7,741,734 B2, Dated Mar. 6, 2023.
The Extended European Search Report for Application No. EP 21 19 2075, dated Feb. 17, 2022.
The Decision Granting Petitioner's Request on Rehearing 37 C.F.R. § 42.71(d) and Granting Institution of Inter Partes Review 35 U.S.C. § 314, *Momentum Dynamics Corporation*, Petition, v. *WiTricity Corporation*, Patent Owner, filed with the United States Patent and Trademark Office Before the Patent Trial and Appeal Board, Case No. IPR2021-01165, U.S. Pat. No. 7,741,734, Entered: Mar. 16, 2022.
Terman, "Circuit Elements", Radio Engineers Handbook, McGraw-Hill Book Company, Inc., pp. 73-90 (1943), https://electrooptical.net/static/oldsite/OldBooks/Terman-RadioEngineersHandbook_1943.pdf.

\* cited by examiner

| Two disks with "human" and "wall" | $D/r$ | $Q^{abs}_{c-h}$ | $Q^{abs}_{c-w}$ | $Q^{rad}_{c[hw]}$ | $Q_{c[hw]} = \omega/2\Gamma_{c[hw]}$ | $\omega/2\kappa_{[hw]}$ | $\kappa_{[hw]}/\Gamma_{c[hw]}$ |
|---|---|---|---|---|---|---|---|
| Re{ε}=147.7, m=2 $\lambda/r \approx 20$ $Q^{abs}_c \approx 10100$ | 3 | 3300 | 12774 | 536 | 426 | 48 | 8.8 |
| | 5 | 5719 | 26333 | 1600 | 1068 | 322 | 3.3 |
| | 7 | 13248 | 50161 | 3542 | 2097 | 973 | 2.2 |
| | 10 | 18447 | 68460 | 3624 | 2254 | 1768 | 1.3 |
| Re{ε}=65.6, m=3 $\lambda/r \approx 10$ $Q^{abs}_c \approx 10100$ | 3 | 2088 | 36661 | 6764 | 1328 | 141 | 9.4 |
| | 5 | 72137 | 90289 | 11945 | 4815 | 2114 | 2.3 |
| | 7 | 237822 | 129094 | 12261 | 5194 | 8307 | 0.6 |

WIRELESS ENERGY TRANSFER

This application is a continuation and claims the benefit of priority under 35 USC § 120 to U.S. application Ser. No. 16/137,795, filed on Sep. 21, 2018, which is a continuation of U.S. application Ser. No. 15/186,969, filed Jun. 20, 2016, now U.S. Pat. No. 10,097,044, which is a continuation of U.S. application Ser. No. 13/789,860, filed Mar. 8, 2013, now U.S. Pat. No. 9,509,147, which is a continuation of U.S. application Ser. No. 13/477,459, filed May 22, 2012, now U.S. Pat. No. 9,444,265, which is a continuation of U.S. application Ser. No. 13/036,177, filed Feb. 28, 2011, which is a continuation of U.S. application Ser. No. 12/437,641, filed May 8, 2009, now U.S. Pat. No. 8,097,983, which is a continuation of U.S. application Ser. No. 12/055,963 filed Mar. 26, 2008, now U.S. Pat. No. 7,825,543, which: 1) is a continuation-in-part of U.S. Utility patent application Ser. No. 11/481,077, filed Jul. 5, 2006, now U.S. Pat. No. 7,741,734, which claims priority to U.S. Provisional Application Ser. No. 60/698,442, filed Jul. 12, 2005; (2) pursuant to U.S.C. § 119(e), U.S. application Ser. No. 12/055,963 claims priority to U.S. Provisional Application Ser. No. 60/908,383, filed Mar. 27, 2007, and U.S. Provisional Application Ser. No. 60/908,666, filed Mar. 28, 2007; and (3) pursuant to U.S.C. § 120, and U.S.C. § 363, U.S. application Ser. No. 12/055,963 is also a continuation-in-part of International Application No. PCT/US2007/070892, filed Jun. 11, 2007. The contents of the prior applications are incorporated herein by reference in their entirety.

STATEMENT AS TO FEDERALLY FUNDED RESEARCH

This invention was made with government support awarded by the National Science Foundation under Grant No. DMR 02-13282. The government has certain rights in this invention.

BACKGROUND

The disclosure relates to wireless energy transfer. Wireless energy transfer may for example, be useful in such applications as providing power to autonomous electrical or electronic devices.

Radiative modes of omni-directional antennas (which work very well for information transfer) are not suitable for such energy transfer, because a vast majority of energy is wasted into free space. Directed radiation modes, using lasers or highly directional antennas, can be efficiently used for energy transfer, even for long distances (transfer distance $L_{TRANS} \gg L_{DEV}$, where $L_{DEV}$ is the characteristic size of the device and/or the source), but require existence of an uninterruptible line-of-sight and a complicated tracking system in the case of mobile objects. Some transfer schemes rely on induction, but are typically restricted to very close-range ($L_{TRANS} \ll L_{DEV}$) or low power (~mW) energy transfers.

The rapid development of autonomous electronics of recent years (e.g. laptops, cell-phones, house-hold robots, that all typically rely on chemical energy storage) has led to an increased need for wireless energy transfer.

SUMMARY

The inventors have realized that resonant objects with coupled resonant modes having localized evanescent field patterns may be used for non-radiative wireless energy transfer. Resonant objects tend to couple, while interacting weakly with other off-resonant environmental objects. Typically, using the techniques described below, as the coupling increases, so does the transfer efficiency. In some embodiments, using the below techniques, the energy-transfer rate can be larger than the energy-loss rate. Accordingly, efficient wireless energy-exchange can be achieved between the resonant objects, while suffering only modest transfer and dissipation of energy into other off-resonant objects. The nearly-omnidirectional but stationary (non-lossy) nature of the near field makes this mechanism suitable for mobile wireless receivers. Various embodiments therefore have a variety of possible applications including for example, placing a source (e.g. one connected to the wired electricity network) on the ceiling of a factory room, while devices (robots, vehicles, computers, or similar) are roaming freely within the room. Other applications include power supplies for electric-engine buses and/or hybrid cars and medical implantable devices.

In some embodiments, resonant modes are so-called magnetic resonances, for which most of the energy surrounding the resonant objects is stored in the magnetic field; i.e. there is very little electric field outside of the resonant objects. Since most everyday materials (including animals, plants and humans) are non-magnetic, their interaction with magnetic fields is minimal. This is important both for safety and also to reduce interaction with the extraneous environmental objects.

In one aspect, an apparatus is disclosed for use in wireless energy transfer, which includes a first resonator structure configured to transfer energy with a second resonator structure over a distance D greater than a characteristic size $L_2$ of the second resonator structure. In some embodiments, D is also greater than one or more of: a characteristic size $L_1$ of the first resonator structure, a characteristic thickness $T_1$ of the first resonator structure, and a characteristic width $W_1$ of the first resonator structure. The energy transfer is mediated by evanescent-tail coupling of a resonant field of the first resonator structure and a resonant field of the second resonator structure. The apparatus may include any of the following features alone or in combination.

In some embodiments, the first resonator structure is configured to transfer energy to the second resonator structure. In some embodiments, the first resonator structure is configured to receive energy from the second resonator structure. In some embodiments, the apparatus includes the second resonator structure.

In some embodiments, the first resonator structure has a resonant angular frequency $\omega_1$, a Q-factor $Q_1$, and a resonance width $\Gamma_1$, the second resonator structure has a resonant angular frequency $\omega_2$, a Q-factor $Q_2$, and a resonance width $\Gamma_2$ and the energy transfer has a rate $\kappa$. In some embodiments, the absolute value of the difference of the angular frequencies $\omega_1$ and $\omega_2$ is smaller than the broader of the resonant widths $\Gamma_1$ and $\Gamma_2$.

In some embodiments $Q_1 > 100$ and $Q_2 > 100$, $Q_1 > 300$ and $Q_2 > 300$, $Q_1 > 500$ and $Q_2 > 500$, or $Q_1 > 1000$ and $Q_2 > 1000$. In some embodiments, $Q_1 > 100$ or $Q_2 > 100$, $Q_1 > 300$ or $Q_2 > 300$, $Q_1 > 500$ or $Q_2 > 500$, or $Q_1 > 1000$ or $Q_2 > 1000$.

In some embodiments, the coupling to loss ratio $$\frac{\kappa}{\sqrt{\Gamma_1 \Gamma_2}} > 0.5,$$

$$\frac{\kappa}{\sqrt{\Gamma_1 \Gamma_2}} > 1,$$

$$\frac{\kappa}{\sqrt{\Gamma_1 \Gamma_2}} > 2, \text{ or}$$

$$\frac{\kappa}{\sqrt{\Gamma_1 \Gamma_2}} > 5.$$

In some such embodiments, $D/L_2$ may be as large as 2, as large as 3, as large as 5, as large as 7, or as large as 10.

In some embodiments, $Q_1 > 1000$ and $Q_2 > 1000$, and the coupling to loss ratio $$\frac{\kappa}{\sqrt{\Gamma_1 \Gamma_2}} > 10,$$

$$\frac{\kappa}{\sqrt{\Gamma_1 \Gamma_2}} > 25, \text{ or}$$

$$\frac{\kappa}{\sqrt{\Gamma_1 \Gamma_2}} > 40.$$

In some such embodiments, $D/L_2$ may be as large as 2, as large as 3, as large as 5, as large as 7, or as large as 10.

In some embodiments, $Q_\kappa = \omega/2\kappa$ is less than about 50, less than about 200, less than about 500, or less than about 1000. In some such embodiments, $D/L_2$ is as large as 2, as large as 3, as large as 5, as large as 7, or as large as 10.

In some embodiments, the quantity $\kappa/\sqrt{\Gamma_1\Gamma_2}$ is maximized at an angular frequency $\tilde{\omega}$ with a frequency width $\tilde{\Gamma}$ around the maximum, and the absolute value of the difference of the angular frequencies $\omega_1$ and $\tilde{\omega}$ is smaller than the width $\tilde{\Gamma}$, and the absolute value of the difference of the angular frequencies $\omega_2$ and $\tilde{\omega}$ is smaller than the width $\tilde{\Gamma}$.

In some embodiments, the energy transfer operates with an efficiency $\eta_{work}$ greater than about 1%, greater than about 10%, greater than about 30%, greater than about 50%, or greater than about 80%.

In some embodiments, the energy transfer operates with a radiation loss $\eta_{rad}$ less that about 10%. In some such embodiments the coupling to loss ratio $$\frac{\kappa}{\sqrt{\Gamma_1 \Gamma_2}} \geq 0.1.$$

In some embodiments, the energy transfer operates with a radiation loss $\eta_{rad}$ less that about 1%. In some such embodiments, the coupling to loss ratio $$\frac{\kappa}{\sqrt{\Gamma_1 \Gamma_2}} \geq 1.$$

In some embodiments, in the presence of a human at distance of more than 3 cm from the surface of either resonant object, the energy transfer operates with a loss to the human $\eta_h$ of less than about 1%. In some such embodiments the coupling to loss ratio $$\frac{\kappa}{\sqrt{\Gamma_1 \Gamma_2}} \geq 1.$$

In some embodiments, in the presence of a human at distance of more than 10 cm from the surface of either resonant object, the energy transfer operates with a loss to the human $\eta_h$ of less than about 0.2%. In some such embodiments the coupling to loss ratio $$\frac{\kappa}{\sqrt{\Gamma_1 \Gamma_2}} \geq 1.$$

In some embodiments, during operation, a device coupled to the first or second resonator structure with a coupling rate $\Gamma_{work}$ receives a usable power $P_{work}$ from the resonator structure.

In some embodiments, $P_{work}$ is greater than about 0.01 Watt, greater than about 0.1 Watt, greater than about 1 Watt, or greater than about 10 Watt.

In some embodiments, if the device is coupled to the first resonator, then $\frac{1}{2} \leq [(\Gamma_{work}/\Gamma_1)^2 - 1]/(\kappa/\sqrt{\Gamma_1\Gamma_2})^2 \leq 2$, or $\frac{1}{4} \leq [(\Gamma_{work}/\Gamma_1)^2 - 1]/(\kappa/\sqrt{\Gamma_1\Gamma_2})^2 \leq 4$, or $\frac{1}{8} \leq [(\Gamma_{work}/\Gamma_1)^2 - 1]/(\kappa/\sqrt{\Gamma_1\Gamma_2})^2 \leq 8$, and, if the device is coupled to the second resonator, then $\frac{1}{2} \leq [(\Gamma_{work}/\Gamma_2)^2 - 1]/(\kappa/\sqrt{\Gamma_1\Gamma_2})^2 \leq 2$, or) $\frac{1}{4} \leq [(\Gamma_{work}/\Gamma_2)^2 - 1]/(\kappa/\sqrt{\Gamma_1\Gamma_2})^2 \leq 4$, or $\frac{1}{8} \leq [(\Gamma_{work}/\Gamma_2)^2 - 1]/(\kappa/\sqrt{\Gamma_1\Gamma_2})^2 \leq 8$.

In some embodiments, the device includes an electrical or electronic device. In some embodiments, the device includes a robot (e.g. a conventional robot or a nano-robot). In some embodiments, the device includes a mobile electronic device (e.g. a telephone, or a cell-phone, or a computer, or a laptop computer, or a personal digital assistant (PDA)). In some embodiments, the device includes an electronic device that receives information wirelessly (e.g. a wireless keyboard, or a wireless mouse, or a wireless computer screen, or a wireless television screen). In some embodiments, the device includes a medical device configured to be implanted in a patient (e.g. an artificial organ, or implant configured to deliver medicine). In some embodiments, the device includes a sensor. In some embodiments, the device includes a vehicle (e.g. a transportation vehicle, or an autonomous vehicle).

In some embodiments, the apparatus further includes the device.

In some embodiments, during operation, a power supply coupled to the first or second resonator structure with a coupling rate $\Gamma_{supply}$ drives the resonator structure at a frequency f and supplies power $P_{total}$. In some embodiments, the absolute value of the difference of the angular frequencies $\omega = 2\pi f$ and $\omega_1$ is smaller than the resonant width $\Gamma_1$, and the absolute value of the difference of the angular frequencies $\omega = 2\pi f$ and $\omega_2$ is smaller than the resonant width $\Gamma_2$. In some embodiments, f is about the optimum efficiency frequency.

In some embodiments, if the power supply is coupled to the first resonator, then $\frac{1}{2} \leq [(\Gamma_{supply}/\Gamma_1)^2 - 1]/(\kappa/\sqrt{\Gamma_1\Gamma_2})^2 \leq 2$, or $\frac{1}{4} \leq [(\Gamma_{supply}/\Gamma_1)^2 - 1]/(\kappa/\sqrt{\Gamma_1\Gamma_2})^2 \leq 4$, or $\frac{1}{8} \leq [(\Gamma_{supply}/\Gamma_1)^2 - 1]/(\kappa/\sqrt{\Gamma_1\Gamma_2})^2 \leq 8$, and, if the power supply is coupled to the second resonator, then $\frac{1}{2} \leq [(\Gamma_{supply}/\Gamma_2)^2 - 1]/(\kappa/\sqrt{\Gamma_1\Gamma_2})^2 \leq 2$, or $\frac{1}{4} \leq [(\Gamma_{supply}/\Gamma_2)^2 - 1]/(\kappa/\sqrt{\Gamma_1\Gamma_2})^2 \leq 4$, or $\frac{1}{8} \leq [(\Gamma_{supply}/\Gamma_2)^2 - 1]/(\kappa/\sqrt{\Gamma_1\Gamma_2})^2 \leq 8$.

In some embodiments, the apparatus further includes the power source.

In some embodiments, the resonant fields are electromagnetic. In some embodiments, f is about 50 GHz or less, about 1 GHz or less, about 100 MHz or less, about 10 MHz or less, about 1 MHz or less, about 100 KHz or less, or about 10 kHz or less. In some embodiments, f is about 50 GHz or greater, about 1 GHz or greater, about 100 MHz or greater, about 10

MHz or greater, about 1 MHz or greater, about 100 kHz or greater, or about 10 kHz or greater. In some embodiments, f is within one of the frequency bands specially assigned for industrial, scientific and medical (ISM) equipment.

In some embodiments, the resonant fields are primarily magnetic in the area outside of the resonant objects. In some such embodiments, the ratio of the average electric field energy to average magnetic filed energy at a distance $D_p$ from the closest resonant object is less than 0.01, or less than 0.1. In some embodiments, $L_R$ is the characteristic size of the closest resonant object and $D_p/L_R$ is less than 1.5, 3, 5, 7, or 10.

In some embodiments, the resonant fields are acoustic. In some embodiments, one or more of the resonant fields include a whispering gallery mode of one of the resonant structures.

In some embodiments, one of the first and second resonator structures includes a self resonant coil of conducting wire, conducting Litz wire, or conducting ribbon. In some embodiments, both of the first and second resonator structures include self resonant coils of conducting wire, conducting Litz wire, or conducting ribbon. In some embodiments, both of the first and second resonator structures include self resonant coils of conducting wire or conducting Litz wire or conducting ribbon, and $Q_1 > 300$ and $Q_2 > 300$.

In some embodiments, one or more of the self resonant conductive wire coils include a wire of length $l$ and cross section radius a wound into a helical coil of radius r, height h and number of turns N. In some embodiments, $N = \sqrt{l^2 - h^2}/2\pi r$.

In some embodiments, for each resonant structure r is about 30 cm, h is about 20 cm, a is about 3 mm and N is about 5.25, and, during operation, a power source coupled to the first or second resonator structure drives the resonator structure at a frequency f. In some embodiments, f is about 10.6 MHz. In some such embodiments, the coupling to loss ratio $$\frac{\kappa}{\sqrt{\Gamma_1 \Gamma_2}} \geq 40,$$

$$\frac{\kappa}{\sqrt{\Gamma_1 \Gamma_2}} \geq 15, \text{ or}$$

$$\frac{\kappa}{\sqrt{\Gamma_1 \Gamma_2}} \geq 5, \text{ or}$$

$$\frac{\kappa}{\sqrt{\Gamma_1 \Gamma_2}} \geq 1.$$

In some such embodiments $D/L_R$ is as large as about 2, 3, 5, or 8.

In some embodiments, for each resonant structure r is about 30 cm, h is about 20 cm, a is about 1 cm and N is about 4, and, during operation, a power source coupled to the first or second resonator structure drives the resonator structure at a frequency f. In some embodiments, f is about 13.4 MHz. In some such embodiments, the coupling to loss ratio $$\frac{\kappa}{\sqrt{\Gamma_1 \Gamma_2}} \geq 70,$$

$$\frac{\kappa}{\sqrt{\Gamma_1 \Gamma_2}} \geq 19, \text{ or}$$

$$\frac{\kappa}{\sqrt{\Gamma_1 \Gamma_2}} \geq 8, \text{ or}$$

$$\frac{\kappa}{\sqrt{\Gamma_1 \Gamma_2}} \geq 3.$$

In some such embodiments $D/L_R$ is as large as about 3, 5, 7, or 10.

In some embodiments, for each resonant structure r is about 10 cm, h is about 3 cm, a is about 2 mm and N is about 6, and, during operation, a power source coupled to the first or second resonator structure drives the resonator structure at a frequency f. In some embodiments, f is about 21.4 MHz. In some such embodiments, the coupling to loss ratio $$\frac{\kappa}{\sqrt{\Gamma_1 \Gamma_2}} \geq 59,$$

$$\frac{\kappa}{\sqrt{\Gamma_1 \Gamma_2}} \geq 15, \text{ or}$$

$$\frac{\kappa}{\sqrt{\Gamma_1 \Gamma_2}} \geq 6, \text{ or}$$

$$\frac{\kappa}{\sqrt{\Gamma_1 \Gamma_2}} \geq 2.$$

In some such embodiments $D/L_R$ is as large as about 3, 5, 7, or 10.

In some embodiments, one of the first and second resonator structures includes a capacitively loaded loop or coil of conducting wire, conducting Litz wire, or conducting ribbon. In some embodiments, both of the first and second resonator structures include capacitively loaded loops or coils of conducting wire, conducting Litz wire, or conducting ribbon. In some embodiments, both of the first and second resonator structures include capacitively loaded loops or coils of conducting wire or conducting Litz wire or conducting ribbon, and $Q_1 > 300$ and $Q_2 > 300$.

In some embodiments, the characteristic size $L_R$ of the resonator structure receiving energy from the other resonator structure is less than about 1 cm and the width of the conducting wire or Litz wire or ribbon of said object is less than about 1 mm, and, during operation, a power source coupled to the first or second resonator structure drives the resonator structure at a frequency f. In some embodiments, f is about 380 MHz. In some such embodiments, the coupling to loss ratio $$\frac{\kappa}{\sqrt{\Gamma_1 \Gamma_2}} \geq 14.9,$$

$$\frac{\kappa}{\sqrt{\Gamma_1 \Gamma_2}} \geq 3.2,$$

$$\frac{\kappa}{\sqrt{\Gamma_1 \Gamma_2}} \geq 1.2, \text{ or}$$

$$\frac{\kappa}{\sqrt{\Gamma_1 \Gamma_2}} \geq 0.4.$$

In some such embodiments, $D/L_R$ is as large as about 3, about 5, about 7, or about 10.

In some embodiments, the characteristic size of the resonator structure receiving energy from the other resonator structure $L_R$ is less than about 10 cm and the width of the conducting wire or Litz wire or ribbon of said object is less than about 1 cm, and, during operation, a power source coupled to the first or second resonator structure drives the resonator structure at a frequency f. In some embodiments, f is about 43 MHz. In some such embodiments, the coupling to loss ratio $$1\frac{\kappa}{\sqrt{\Gamma_1\Gamma_2}} \geq 15.9,$$

$$\frac{\kappa}{\sqrt{\Gamma_1\Gamma_2}} \geq 4.3,$$

$$\frac{\kappa}{\sqrt{\Gamma_1\Gamma_2}} \geq 1.8, \text{ or}$$

$$\frac{\kappa}{\sqrt{\Gamma_1\Gamma_2}} \geq 0.7.$$

In some such embodiments, $D/L_R$ is as large as about 3, about 5, about 7, or about 10.

In some embodiments, the characteristic size $L_R$ of the resonator structure receiving energy from the other resonator structure is less than about 30 cm and the width of the conducting wire or Litz wire or ribbon of said object is less than about 5 cm, and, during operation, a power source coupled to the first or second resonator structure drives the resonator structure at a frequency f. In some such embodiments, f is about 9 MHz. In some such embodiments, the coupling to loss ratio $$1\frac{\kappa}{\sqrt{\Gamma_1\Gamma_2}} \geq 67.4,$$

$$\frac{\kappa}{\sqrt{\Gamma_1\Gamma_2}} \geq 17.8,$$

$$\frac{\kappa}{\sqrt{\Gamma_1\Gamma_2}} \geq 7.1, \text{ or}$$

$$\frac{\kappa}{\sqrt{\Gamma_1\Gamma_2}} \geq 2.7.$$

In some such embodiments, $D/L_R$ is as large as about 3, about 5, about 7, or about 10.

In some embodiments, the characteristic size of the resonator structure receiving energy from the other resonator structure $L_R$ is less than about 30 cm and the width of the conducting wire or Litz wire or ribbon of said object is less than about 5 mm, and, during operation, a power source coupled to the first or second resonator structure drives the resonator structure at a frequency f. In some embodiments f is about 17 MHz. In some such embodiments, the coupling to loss ratio $$\frac{\kappa}{\sqrt{\Gamma_1\Gamma_2}} \geq 6.3,$$

$$\frac{\kappa}{\sqrt{\Gamma_1\Gamma_2}} \geq 1.3,$$

$$\frac{\kappa}{\sqrt{\Gamma_1\Gamma_2}} \geq 0.5.,$$

$$\frac{\kappa}{\sqrt{\Gamma_1\Gamma_2}} \geq 0.2.$$

In some such embodiments, $D/L_R$ is as large as about 3, about 5, about 7, or about 10.

In some embodiments, the characteristic size $L_R$ of the resonator structure receiving energy from the other resonator structure is less than about 1 m, and the width of the conducting wire or Litz wire or ribbon of said object is less than about 1 cm, and, during operation, a power source coupled to the first or second resonator structure drives the resonator structure at a frequency f. In some embodiments, f is about 5 MHz. In some such embodiments, the coupling to loss ratio $$\frac{\kappa}{\sqrt{\Gamma_1\Gamma_2}} \geq 6.8,$$

$$\frac{\kappa}{\sqrt{\Gamma_1\Gamma_2}} \geq 1.4,$$

$$\frac{\kappa}{\sqrt{\Gamma_1\Gamma_2}} \geq 0.5,$$

$$\frac{\kappa}{\sqrt{\Gamma_1\Gamma_2}} \geq 0.2.$$

In some such embodiments, $D/L_R$ is as large as about 3, about 5, about 7, or about 10.

In some embodiments, during operation, one of the resonator structures receives a usable power $P_w$ from the other resonator structure, an electrical current $I_s$ flows in the resonator structure which is transferring energy to the other resonant structure, and the ratio $$\frac{I_s}{\sqrt{P_w}}$$

is less than about 5 Amps/$\sqrt{\text{Watts}}$ or less than about 2 Amps/$\sqrt{\text{Watts}}$. In some embodiments, during operation, one of the resonator structures receives a usable power $P_w$ from the other resonator structure, a voltage difference $V_s$ appears across the capacitive element of the first resonator structure, and the ratio $$\frac{V_s}{\sqrt{P_w}}$$

is less than about 2000 Volts/$\sqrt{\text{Watts}}$ or less than about 4000 Volts/$\sqrt{\text{Watts}}$.

In some embodiments, one of the first and second resonator structures includes a inductively loaded rod of conducting wire or conducting Litz wire or conducting ribbon. In some embodiments, both of the first and second resonator structures include inductively loaded rods of conducting wire or conducting Litz wire or conducting ribbon. In some embodiments, both of the first and second resonator structures include inductively loaded rods of conducting wire or conducting Litz wire or conducting ribbon, and $Q_1 > 300$ and $Q_2 > 300$.

In some embodiments, the characteristic size of the resonator structure receiving energy from the other resonator structure $L_R$ is less than about 10 cm and the width of the conducting wire or Litz wire or ribbon of said object is less than about 1 cm, and, during operation, a power source coupled to the first or second resonator structure drives the resonator structure at a frequency f. In some embodiments, f is about 14 MHz. In some such embodiments, the coupling to loss ratio $$\frac{\kappa}{\sqrt{\Gamma_1\Gamma_2}} \geq 32,$$

-continued $$\frac{\kappa}{\sqrt{\Gamma_1 \Gamma_2}} \geq 5.8,$$

$$\frac{\kappa}{\sqrt{\Gamma_1 \Gamma_2}} \geq 2, \text{ or}$$

$$\frac{\kappa}{\sqrt{\Gamma_1 \Gamma_2}} \geq 0.6.$$

In some such embodiments, $D/L_R$ is as large as about 3, about 5, about 7, or about 10.

In some embodiments, the characteristic size $L_R$ of the resonator structure receiving energy from the other resonator structure is less than about 30 cm and the width of the conducting wire or Litz wire or ribbon of said object is less than about 5 cm, and, during operation, a power source coupled to the first or second resonator structure drives the resonator structure at a frequency f. In some such embodiments, f is about 2.5 MHz. In some such embodiments, the coupling to loss ratio $$\frac{\kappa}{\sqrt{\Gamma_1 \Gamma_2}} \geq 105,$$

$$\frac{\kappa}{\sqrt{\Gamma_1 \Gamma_2}} \geq 19,$$

$$\frac{\kappa}{\sqrt{\Gamma_1 \Gamma_2}} \geq 6.6, \text{ or}$$

$$\frac{\kappa}{\sqrt{\Gamma_1 \Gamma_2}} \geq 2.2.$$

In some such embodiments, $D/L_R$ is as large as about 3, about 5, about 7, or about 10.

In some embodiments, one of the first and second resonator structures includes a dielectric disk. In some embodiments, both of the first and second resonator structures include dielectric disks. In some embodiments, both of the first and second resonator structures include dielectric disks, and $Q_1 > 300$ and $Q_2 > 300$.

In some embodiments, the characteristic size of the resonator structure receiving energy from the other resonator structure is $L_R$ and the real part of the permittivity of said resonator structure $\varepsilon$ is less than about 150. In some such embodiments, the coupling to loss ratio $$\frac{\kappa}{\sqrt{\Gamma_1 \Gamma_2}} \geq 42.4,$$

$$\frac{\kappa}{\sqrt{\Gamma_1 \Gamma_2}} \geq 6.5,$$

$$\frac{\kappa}{\sqrt{\Gamma_1 \Gamma_2}} \geq 2.3,$$

$$\frac{\kappa}{\sqrt{\Gamma_1 \Gamma_2}} \geq 0.5.$$

In some such embodiments, $D/L_R$ is as large as about 3, about 5, about 7, or about 10.

In some embodiments, the characteristic size of the resonator structure receiving energy from the other resonator structure is $L_R$ and the real part of the permittivity of said resonator structure $\varepsilon$ is less than about 65. In some such embodiments, the coupling to loss ratio $$\frac{\kappa}{\sqrt{\Gamma_1 \Gamma_2}} \geq 30.9,$$

$$\frac{\kappa}{\sqrt{\Gamma_1 \Gamma_2}} \geq 2.3, \text{ or}$$

$$\frac{\kappa}{\sqrt{\Gamma_1 \Gamma_2}} \geq 0.5.$$

In some such embodiments, $D/L_R$ is as large as about 3, about 5, about 7.

In some embodiments, at least one of the first and second resonator structures includes one of: a dielectric material, a metallic material, a metallodielectric object, a plasmonic material, a plasmonodielectric object, a superconducting material.

In some embodiments, at least one of the resonators has a quality factor greater than about 5000, or greater than about 10000.

In some embodiments, the apparatus also includes a third resonator structure configured to transfer energy with one or more of the first and second resonator structures, where the energy transfer between the third resonator structure and the one or more of the first and second resonator structures is mediated by evanescent-tail coupling of the resonant field of the one or more of the first and second resonator structures and a resonant field of the third resonator structure.

In some embodiments, the third resonator structure is configured to transfer energy to one or more of the first and second resonator structures.

In some embodiments, the third resonator structure is configured to receive energy from one or more of the first and second resonator structures.

In some embodiments, the third resonator structure is configured to receive energy from one of the first and second resonator structures and transfer energy to the other one of the first and second resonator structures.

Some embodiments include a mechanism for, during operation, maintaining the resonant frequency of one or more of the resonant objects. In some embodiments, the feedback mechanism comprises an oscillator with a fixed frequency and is configured to adjust the resonant frequency of the one or more resonant objects to be about equal to the fixed frequency. In some embodiments, the feedback mechanism is configured to monitor an efficiency of the energy transfer, and adjust the resonant frequency of the one or more resonant objects to maximize the efficiency.

In another aspect, a method of wireless energy transfer is disclosed, which method includes providing a first resonator structure and transferring energy with a second resonator structure over a distance D greater than a characteristic size $L_2$ of the second resonator structure. In some embodiments, D is also greater than one or more of: a characteristic size $L_1$ of the first resonator structure, a characteristic thickness $T_1$ of the first resonator structure, and a characteristic width $W_1$ of the first resonator structure. The energy transfer is mediated by evanescent-tail coupling of a resonant field of the first resonator structure and a resonant field of the second resonator structure.

In some embodiments, the first resonator structure is configured to transfer energy to the second resonator structure. In some embodiments, the first resonator structure is configured to receive energy from the second resonator structure.

In some embodiments, the first resonator structure has a resonant angular frequency $\omega_1$, a Q-factor $Q_1$, and a resonance width $\Gamma_1$, the second resonator structure has a resonant angular frequency $\omega_2$, a Q-factor $Q_2$, and a resonance width $\Gamma_2$ and the energy transfer has a rate $\kappa$. In some embodiments, the absolute value of the difference of the angular frequencies $\omega_1$ and $\omega_2$ is smaller than the broader of the resonant widths $\Gamma_1$ and $\Gamma_2$.

In some embodiments, the coupling to loss ratio $$\frac{\kappa}{\sqrt{\Gamma_1 \Gamma_2}} > 0.5,$$

$$\frac{\kappa}{\sqrt{\Gamma_1 \Gamma_2}} > 1,$$

$$\frac{\kappa}{\sqrt{\Gamma_1 \Gamma_2}} > 2, \text{ or}$$

$$\frac{\kappa}{\sqrt{\Gamma_1 \Gamma_2}} > 5.$$

In some such embodiments, $D/L_2$ may be as large as 2, as large as 3, as large as 5, as large as 7, or as large as 10.

In another aspect, an apparatus is disclosed for use in wireless information transfer which includes a first resonator structure configured to transfer information by transferring energy with a second resonator structure over a distance D greater than a characteristic size $L_2$ of the second resonator structure. In some embodiments, D is also greater than one or more of: a characteristic size $L_1$ of the first resonator structure, a characteristic thickness $T_1$ of the first resonator structure, and a characteristic width $W_1$ of the first resonator structure. The energy transfer is mediated by evanescent-tail coupling of a resonant field of the first resonator structure and a resonant field of the second resonator structure.

In some embodiments, the first resonator structure is configured to transfer energy to the second resonator structure. In some embodiments, the first resonator structure is configured to receive energy from the second resonator structure. In some embodiments the apparatus includes, the second resonator structure.

In some embodiments, the first resonator structure has a resonant angular frequency $\omega_1$, a Q-factor $Q_1$, and a resonance width $\Gamma_1$, the second resonator structure has a resonant angular frequency $\omega_2$, a Q-factor $Q_2$, and a resonance width $\Gamma_2$ and the energy transfer has a rate $\kappa$. In some embodiments, the absolute value of the difference of the angular frequencies $\omega_1$ and $\omega_2$ is smaller than the broader of the resonant widths $\Gamma_1$ and $\Gamma_2$.

In some embodiments, the coupling to loss ratio $$\frac{\kappa}{\sqrt{\Gamma_1 \Gamma_2}} > 0.5,$$

$$\frac{\kappa}{\sqrt{\Gamma_1 \Gamma_2}} > 1,$$

$$\frac{\kappa}{\sqrt{\Gamma_1 \Gamma_2}} > 2, \text{ or}$$

$$\frac{\kappa}{\sqrt{\Gamma_1 \Gamma_2}} > 5.$$

In some such embodiments, $D/L_2$ may be as large as 2, as large as 3, as large as 5, as large as 7, or as large as 10.

In another aspect, a method of wireless information transfer is disclosed, which method includes providing a first resonator structure and transferring information by transferring energy with a second resonator structure over a distance D greater than a characteristic size $L_2$ of the second resonator structure. In some embodiments, D is also greater than one or more of: a characteristic size $L_1$ of the first resonator structure, a characteristic thickness $T_1$ of the first resonator structure, and a characteristic width $W_1$ of the first resonator structure. The energy transfer is mediated by evanescent-tail coupling of a resonant field of the first resonator structure and a resonant field of the second resonator structure.

In some embodiments, the first resonator structure is configured to transfer energy to the second resonator structure. In some embodiments, the first resonator structure is configured to receive energy from the second resonator structure.

In some embodiments, the first resonator structure has a resonant angular frequency $\omega_1$, a Q-factor $Q_1$, and a resonance width $\Gamma_1$, the second resonator structure has a resonant angular frequency $\omega_2$, a Q-factor $Q_2$, and a resonance width $\Gamma_2$, and the energy transfer has a rate $\kappa$. In some embodiments, the absolute value of the difference of the angular frequencies $\omega_1$ and $\omega_2$ is smaller than the broader of the resonant widths $\Gamma_1$ and $\Gamma_2$.

In some embodiments, the coupling to loss ratio $$\frac{\kappa}{\sqrt{\Gamma_1 \Gamma_2}} > 0.5,$$

$$\frac{\kappa}{\sqrt{\Gamma_1 \Gamma_2}} > 1,$$

$$\frac{\kappa}{\sqrt{\Gamma_1 \Gamma_2}} > 2, \text{ or}$$

$$\frac{\kappa}{\sqrt{\Gamma_1 \Gamma_2}} > 5.$$

In some such embodiments, $D/L_2$ may be as large as 2, as large as 3, as large as 5, as large as 7, or as large as 10.

It is to be understood that the characteristic size of an object is equal to the radius of the smallest sphere which can fit around the entire object. The characteristic thickness of an object is, when placed on a flat surface in any arbitrary configuration, the smallest possible height of the highest point of the object above a flat surface. The characteristic width of an object is the radius of the smallest possible circle that the object can pass through while traveling in a straight line. For example, the characteristic width of a cylindrical object is the radius of the cylinder.

The distance D over which the energy transfer between two resonant objects occurs is the distance between the respective centers of the smallest spheres which can fit around the entirety of each object. However, when considering the distance between a human and a resonant object, the distance is to be measured from the outer surface of the human to the outer surface of the sphere.

As described in detail below, non-radiative energy transfer refers to energy transfer effected primarily through the localized near field, and, at most, secondarily through the radiative portion of the field.

It is to be understood that an evanescent tail of a resonant object is the decaying non-radiative portion of a resonant field localized at the object. The decay may take any functional form including, for example, an exponential decay or power law decay.

The optimum efficiency frequency of a wireless energy transfer system is the frequency at which the figure of merit $$\frac{\kappa}{\sqrt{\Gamma_1 \Gamma_2}}$$

is maximized, all other factors held constant.

The resonant width ($\Gamma$) refers to the width of an object's resonance due to object's intrinsic losses (e.g. loss to absorption, radiation, etc.).

It is to be understood that a Q-factor (Q) is a factor that compares the time constant for decay of an oscillating system's amplitude to its oscillation period. For a given resonator mode with angular frequency $\omega$ and resonant width $\Gamma$, the Q-factor $Q=\omega/2\Gamma$.

The energy transfer rate ($\kappa$) refers to the rate of energy transfer from one resonator to another. In the coupled mode description described below it is the coupling constant between the resonators.

It is to be understood that $Q_\kappa=\omega/2\kappa$.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Various embodiments may include any of the above features, alone or in combination. Other features, objects, and advantages of the disclosure will be apparent from the following detailed description.

Other features, objects, and advantages of the disclosure will be apparent from the following detailed description.

DETAILED DESCRIPTION

Figure 1:
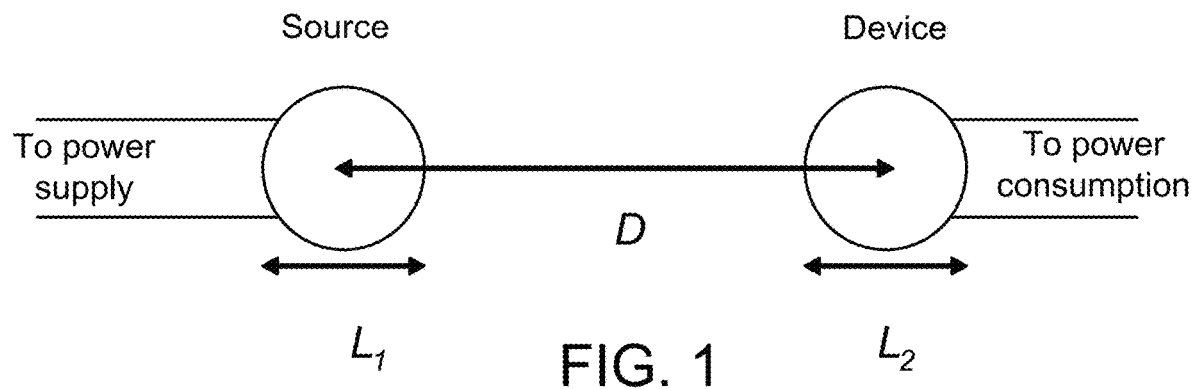
FIG. 1 shows a schematic of a wireless energy transfer scheme.

FIG. 1 shows a schematic that generally describes one embodiment of the invention, in which energy is transferred wirelessly between two resonant objects.

Referring to FIG. 1, energy is transferred, over a distance D, between a resonant source object having a characteristic size $L_1$ and a resonant device object of characteristic size $L_2$. Both objects are resonant objects. The source object is connected to a power supply (not shown), and the device object is connected to a power consuming device (e.g. a load resistor, not shown). Energy is provided by the power supply to the source object, transferred wirelessly and non-radiatively from the source object to the device object, and consumed by the power consuming device. The wireless non-radiative energy transfer is performed using the field (e.g. the electromagnetic field or acoustic field) of the system of two resonant objects. For simplicity, in the following we will assume that field is the electromagnetic field.

It is to be understood that while two resonant objects are shown in the embodiment of FIG. 1, and in many of the examples below, other embodiments may feature 3 or more resonant objects. For example, in some embodiments a single source object can transfer energy to multiple device objects. Similarly, in some embodiments multiple sources can transfer energy to one or more device objects. For example, as explained at in the paragraph bridging pages 4-5 of U.S. Provisional Application No. 60/698,442 to which the present application claims benefit and which is incorporated by reference above, for certain applications having uneven power transfer to the device object as the distance between the device and the source changes, multiple sources can be strategically placed to alleviate the problem, and/or the peak amplitude of the source can be dynamically adjusted. Furthermore, in some embodiments energy may be transferred from a first device to a second, and then from the second device to the third, and so forth.

Initially, we present a theoretical framework for understanding non-radiative wireless energy transfer. Note however that it is to be understood that the scope of the invention is not bound by theory.

Coupled Mode Theory

An appropriate analytical framework for modeling the resonant energy-exchange between two resonant objects 1 and 2 is that of "coupled-mode theory" (CMT). The field of the system of two resonant objects 1 and 2 is approximated by $F(r,t) \approx a_1(t)F_1(r)+a_2(t)F_2(r)$, where $F_{1,2}(r)$ are the eigenmodes of 1 and 2 alone, normalized to unity energy, and the field amplitudes $a_{1,2}(t)$ are defined so that $|a_{1,2}(t)|^2$ is equal to the energy stored inside the objects 1 and 2 respectively. Then, the field amplitudes can be shown to satisfy, to lowest order:

$$\frac{da_1}{dt} = -i(\omega_1 - i\Gamma_1)a_1 + i\kappa a_2, \qquad (1)$$

$$\frac{da_2}{dt} = -i(\omega_2 - i\Gamma_2)a_2 + i\kappa a_1$$

where $\omega_{1,2}$ are the individual angular eigenfrequencies of the eigenmodes, $\Gamma_{1,2}$ are the resonance widths due to the objects' intrinsic (absorption, radiation etc.) losses, and $\kappa$ is the coupling coefficient. Eqs. (1) show that at exact resonance ($\omega_1=\omega_2$ and $\Gamma_1=\Gamma_2$), the eigenmodes of the combined system are split by $2\kappa$; the energy exchange between the two objects takes place in time~$\pi/2\kappa$ and is nearly perfect, apart for losses, which are minimal when the coupling rate is much faster than all loss rates ($\kappa \gg \Gamma_{1,2}$). The coupling to loss ratio $\kappa/\sqrt{\Gamma_1\Gamma_2}$ serves as a figure-of-merit in evaluating a system used for wireless energy-transfer, along with the distance over which this ratio can be achieved. The regime $\kappa/\sqrt{\Gamma_1\Gamma_2} \gg 1$ is called "strong-coupling" regime.

In some embodiments, the energy-transfer application preferably uses resonant modes of high $Q=\omega/2\Gamma$, corresponding to low (i.e. slow) intrinsic-loss rates $\Gamma$ This condition may be satisfied where the coupling is implemented using, not the lossy radiative far-field, but the evanescent (non-lossy) stationary near-field.

To implement an energy-transfer scheme, usually finite objects, namely ones that are topologically surrounded everywhere by air, are more appropriate. Unfortunately, objects of finite extent cannot support electromagnetic states that are exponentially decaying in all directions in air, since, from Maxwell's Equations in free space: $\vec{k}^2 = \omega^2/c^2$ where $\vec{k}$ is the wave vector, $\omega$ the angular frequency, and c the speed of light.

Because of this, one can show that they cannot support states of infinite Q. However, very long-lived (so-called "high-Q") states can be found, whose tails display the needed exponential or exponential-like decay away from the resonant object over long enough distances before they turn oscillatory (radiative). The limiting surface, where this change in the field behavior happens, is called the "radiation caustic", and, for the wireless energy-transfer scheme to be based on the near field rather than the far/radiation field, the distance between the coupled objects must be such that one lies within the radiation caustic of the other.

Furthermore, in some embodiments, small $Q_\kappa = \omega/2\kappa$ corresponding to strong (i.e. fast) coupling rate $\kappa$ is preferred over distances larger than the characteristic sizes of the objects. Therefore, since the extent of the near-field into the area surrounding a finite-sized resonant object is set typically by the wavelength, in some embodiments, this mid-range non-radiative coupling can be achieved using resonant objects of subwavelength size, and thus significantly longer evanescent field-tails. As will be seen in examples later on, such subwavelength resonances can often be accompanied with a high Q, so this will typically be the appropriate choice for the possibly-mobile resonant device-object. Note, though, that in some embodiments, the resonant source-object will be immobile and thus less restricted in its allowed geometry and size, which can be therefore chosen large enough that the near-field extent is not limited by the wavelength. Objects of nearly infinite extent, such as dielectric waveguides, can support guided modes whose evanescent tails are decaying exponentially in the direction away from the object, slowly if tuned close to cutoff, and can have nearly infinite Q.

In the following, we describe several examples of systems suitable for energy transfer of the type described above. We will demonstrate how to compute the CMT parameters $\omega_{1,2}$, $Q_{1,2}$ and $Q_\kappa$ described above and how to choose these parameters for particular embodiments in order to produce a desirable figure-of-merit $\kappa/\sqrt{\Gamma_1\Gamma_2} = \sqrt{Q_1 Q_2}/Q_\kappa$. In particular, this figure of merit is typically maximized when $\omega_{1,2}$ are tuned to a particular angular frequency $\tilde{\omega}$, thus, if $\tilde{\Gamma}$ is half the angular-frequency width for which $\sqrt{Q_1 Q_2}/Q_\kappa$ is above half its maximum value at $\tilde{\omega}$, the angular eigenfrequencies $\omega_{1,2}$ should typically be tuned to be close to $\tilde{\omega}$ to within the width $\tilde{\Gamma}$.

In addition, as described below, $Q_{1,2}$ can sometimes be limited not from intrinsic loss mechanisms but from external perturbations. In those cases, producing a desirable figure-of-merit translates to reducing $Q_\kappa$ (i.e. increasing the coupling). Accordingly we will demonstrate how, for particular embodiments, to reduce $Q_\kappa$.

Self-Resonant Conducting Coils

Figure 2:
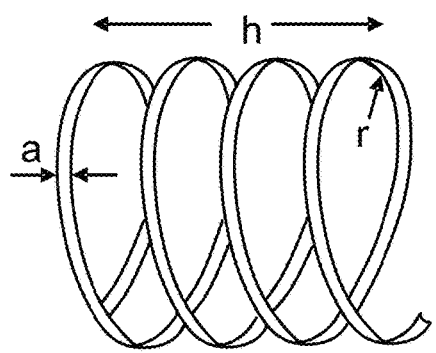
FIG. 2 shows an example of a self-resonant conducting-wire coil.

In some embodiments, one or more of the resonant objects are self-resonant conducting coils. Referring to FIG. 2, a conducting wire of length l and cross-sectional radius a is wound into a helical coil of radius r and height h (namely with $N=\sqrt{l^2-h^2}/2\pi r$ number of turns), surrounded by air. As described below, the wire has distributed inductance and distributed capacitance, and therefore it supports a resonant mode of angular frequency $\omega$. The nature of the resonance lies in the periodic exchange of energy from the electric field within the capacitance of the coil, due to the charge distribution $\rho(x)$ across it, to the magnetic field in free space, due to the current distribution $j(x)$ in the wire. In particular, the charge conservation equation $\nabla \cdot j = i\omega\rho$ implies that: (i) this periodic exchange is accompanied by a $\pi/2$ phase-shift between the current and the charge density profiles, namely the energy U contained in the coil is at certain points in time completely due to the current and at other points in time completely due to the charge, and (ii) if $\rho_l(x)$ and $I(x)$ are respectively the linear charge and current densities in the wire, where x runs along the wire, $q_o = \frac{1}{2}\int dx |\rho_l(x)|$ is the maximum amount of positive charge accumulated in one side of the coil (where an equal amount of negative charge always also accumulates in the other side to make the system neutral) and $I_o = \max\{|I(x)|\}$ is the maximum positive value of the linear current distribution, then $I_o = \omega q_o$. Then, one can define an effective total inductance L and an effective total capacitance C of the coil through the amount of energy U inside its resonant mode:

$$U \equiv \frac{1}{2}I_o^2 L \Rightarrow L = \frac{\mu_0}{4\pi I_o^2}\int\int dx dx' \frac{j(x)\cdot j(x')}{|x-x'|}, \quad (2)$$

$$U \equiv \frac{1}{2}q_o^2 \frac{1}{C} \Rightarrow \frac{1}{C} = \frac{1}{4\pi\varepsilon_o q_o^2}\int\int dx dx' \frac{\rho(x)\cdot\rho(x')}{|x-x'|} \quad (3)$$

where $\mu_o$ and $\varepsilon_o$ are the magnetic permeability and electric permittivity of free space. With these definitions, the resonant angular frequency and the effective impedance are given by the common formulas $\omega = 1/\sqrt{LC}$ and $Z = \sqrt{L/C}$ respectively.

Losses in this resonant system consist of ohmic (material absorption) loss inside the wire and radiative loss into free space. One can again define a total absorption resistance $R_{abs}$ from the amount of power absorbed inside the wire and a total radiation resistance $R_{rad}$ from the amount of power radiated due to electric- and magnetic-dipole radiation:

$$P_{abs} \equiv \frac{1}{2}I_o^2 R_{abs} \Rightarrow R_{abs} \approx \zeta_c \frac{l}{2\pi a}\cdot\frac{I_{rms}^2}{I_o^2} \quad (4)$$

$$P_{rad} \equiv \frac{1}{2}I_o^2 R_{rad} \Rightarrow R_{rad} \approx \frac{\zeta_o}{6\pi}\left[\left(\frac{\omega|p|}{c}\right)^2 + \left(\frac{\omega\sqrt{|m|}}{c}\right)^4\right], \quad (5)$$

where $c = 1/\sqrt{\mu_o\varepsilon_o}$ and $\xi_o = \sqrt{\mu_o/\varepsilon_o}$ are the light velocity and light impedance in free space, the impedance $\zeta_c$ is $\zeta_c = 1/\sigma\delta = \sqrt{\mu_o\omega/2\sigma}$ with $\sigma$ the conductivity of the conductor and $\delta$ the skin depth at the frequency $\omega$, $$I_{rms}^2 = \frac{1}{l}\int dx |I(x)|^2,$$

$p=\int dx\, r\, \rho_l(x)$ is the electric-dipole moment of the coil and $m=\frac{1}{2}\int dx\, r\times j(x)$ is the magnetic-dipole moment of the coil. For the radiation resistance formula Eq. (5), the assumption of operation in the quasi-static regime (h, r«λ=2πc/ω) has been used, which is the desired regime of a subwavelength resonance. With these definitions, the absorption and radiation quality factors of the resonance are given by $Q^{abs}=Z/R_{abs}$ and $Q^{rad}=Z/R_{rad}$ respectively.

From Eq. (2)-(5) it follows that to determine the resonance parameters one simply needs to know the current distribution j in the resonant coil. Solving Maxwell's equations to rigorously find the current distribution of the resonant electromagnetic eigenmode of a conducting-wire coil is more involved than, for example, of a standard LC circuit, and we can find no exact solutions in the literature for coils of finite length, making an exact solution difficult. One could in principle write down an elaborate transmission-line-like model, and solve it by brute force. We instead present a model that is (as described below) in good agreement (~5%) with experiment. Observing that the finite extent of the conductor forming each coil imposes the boundary condition that the current has to be zero at the ends of the coil, since no current can leave the wire, we assume that the resonant mode of each coil is well approximated by a sinusoidal current profile along the length of the conducting wire. We shall be interested in the lowest mode, so if we denote by x the coordinate along the conductor, such that it runs from −l/2 to +l/2, then the current amplitude profile would have the form $I(x)=I_o \cos(\pi x/l)$, where we have assumed that the current does not vary significantly along the wire circumference for a particular x, a valid assumption provided a«r. It immediately follows from the continuity equation for charge that the linear charge density profile should be of the form $\rho_l(x)=\rho_o \sin(\pi x/l)$, and thus $q_o=\int_0^{l/2} dx\, \rho_o \sin(\pi x/l) = \rho_o l/\pi$. Using these sinusoidal profiles we find the so-called "self-inductance" $L_s$ and "self-capacitance" $C_s$ of the coil by computing numerically the integrals Eq. (2) and (3); the associated frequency and effective impedance are $\omega_s$ and $Z_s$ respectively. The "self-resistances" $R_s$ are given analytically by Eq. (4) and (5) using $$I_{rms}^2 = \frac{1}{l}\int_{-l/2}^{l/2} dx |I_o \cos(\pi x/l)|^2 = \left(\frac{1}{2}I\right)_o^2,$$

$$|p| = q_o \sqrt{\left(\frac{2}{\pi}h\right)^2 + \left(\frac{4N\cos(\pi N)}{(4N^2-1)\pi}r\right)^2} \text{ and}$$

$$|m| = I_o \sqrt{\left(\frac{2}{\pi}N\pi r^2\right)^2 + \left(\frac{\cos(\pi N)(12N^2-1)-\sin(\pi N)\pi N(4N^2-1)}{(16N^4-8N^2+1)\pi}hr\right)^2},$$

and therefore the associated $Q_s$ factors may be calculated.

The results for two particular embodiments of resonant coils with subwavelength modes of $\lambda_s/r \geq 70$ (i.e. those highly suitable for near-field coupling and well within the quasi-static limit) are presented in Table 1. Numerical results are shown for the wavelength and absorption, radiation and total loss rates, for the two different cases of subwavelength-coil resonant modes. Note that, for conducting material, copper (σ=5.998·10^−7 S/m) was used. It can be seen that expected quality factors at microwave frequencies are $Q_s^{abs} \geq 1000$ and $Q_s^{rad} \geq 5000$.

TABLE 1

| single coil | $\lambda_s/r$ | f (MHz) | $Q_s^{rad}$ | $Q_s^{abs}$ | $Q_s = \omega_s/2\Gamma_s$ |
| --- | --- | --- | --- | --- | --- |
| r = 30 cm, h = 20 cm, a = 1 cm, N = 4 | 74.7 | 13.39 | 4164 | 8170 | 2758 |
| r = 10 cm, h = 3 cm, a = 2 mm, N = 6 | 140 | 21.38 | 43919 | 3968 | 3639 |

Figure 3:
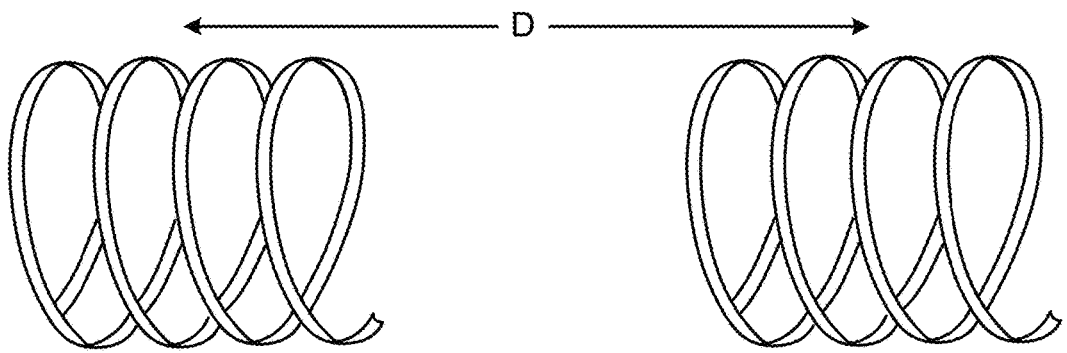
FIG. 3 shows a wireless energy transfer scheme featuring two self-resonant conducting-wire coils

Referring to FIG. 3, in some embodiments, energy is transferred between two self-resonant conducting-wire coils. The electric and magnetic fields are used to couple the different resonant conducting-wire coils at a distance D between their centers. Usually, the electric coupling highly dominates over the magnetic coupling in the system under consideration for coils with h»2r and, oppositely, the magnetic coupling highly dominates over the electric coupling for coils with h«2r. Defining the charge and current distributions of two coils 1,2 respectively as $\rho_{1,2}(x)$ and $j_{1,2}(x)$, total charges and peak currents respectively as $q_{1,2}$ and $I_{1,2}$, and capacitances and inductances respectively as $C_{1,2}$ and $L_{1,2}$, which are the analogs of $\rho(x)$, $j(x)$, $q_o$, $I_o$, C and L for the single-coil case and are therefore well defined, we can define their mutual capacitance and inductance through the total energy:

$$U \equiv U_1 + U_2 + \frac{1}{2}(q_1 * q_2 + q_2 * q_1)/M_C + \frac{1}{2}(q_1^* q_2 + q_2^* q_1)M_L \Rightarrow \quad (6)$$

$$1/M_C = \frac{1}{4\pi\varepsilon_o q_1 q_2}\int\int dx dx' \frac{\rho_1(x)\cdot\rho_2(x')}{|x-x'|},$$

$$M_L = \frac{\mu_o}{4\pi I_1 I_2}\int\int dx dx' \frac{j_1(x)\cdot j_2(x')}{|x-x'|}u,$$

where $U_1=\frac{1}{2}q_1^2/C_1=\frac{1}{2}I_1^2 L_1$, $U_2=\frac{1}{2}q_2^2/C_2=\frac{1}{2}I_2^2 L_2$ and the retardation factor of u=exp(iω|x−x'|/c) inside the integral can been ignored in the quasi-static regime D«λ of interest, where each coil is within the near field of the other. With this definition, the coupling coefficient is given by $\kappa=\omega\sqrt{C_1 C_2}/2M_C + \omega M_L/2\sqrt{L_1 L_2} \Leftrightarrow Q_\kappa^{-1}=(M_C/\sqrt{C_1 C_2})^{-1}+(\sqrt{L_1 L_2}/M_L)^{-1}$.

Therefore, to calculate the coupling rate between two self-resonant coils, again the current profiles are needed and, by using again the assumed sinusoidal current profiles, we compute numerically from Eq. (6) the mutual capacitance $M_{C,s}$ and inductance $M_{L,s}$ between two self-resonant coils at a distance D between their centers, and thus $Q_{\kappa,s}$ is also determined.

TABLE 2

| pair of coils | D/r | Q = ω/2Γ | $Q_\kappa$ = ω/2κ | κ/Γ |
| --- | --- | --- | --- | --- |
| r = 30 cm, h = 20 cm, | 3 | 2758 | 38.9 | 70.9 |
| a = 1 cm, N = 4 | 5 | 2758 | 139.4 | 19.8 |
| λ/r ≈ 75 | 7 | 2758 | 333.0 | 8.3 |
| $Q_s^{abs}$ ≈ 8170, $Q_s^{rad}$ ≈ 4164 | 10 | 2758 | 818.9 | 3.4 |
| r = 10 cm, h = 3 cm, | 3 | 3639 | 61.4 | 59.3 |
| a = 2 mm, N = 6 | 5 | 3639 | 232.5 | 15.7 |
| λ/r ≈ 140 | 7 | 3639 | 587.5 | 6.2 |
| $Q_s^{abs}$ ≈ 3968, $Q_s^{rad}$ ≈ 43919 | 10 | 3639 | 1580 | 2.3 |

Referring to Table 2, relevant parameters are shown for exemplary embodiments featuring pairs or identical self resonant coils. Numerical results are presented for the average wavelength and loss rates of the two normal modes (individual values not shown), and also the coupling rate and figure-of-merit as a function of the coupling distance D, for the two cases of modes presented in Table1. It can be seen that for medium distances D/r=10–3 the expected coupling-to-loss ratios are in the range κ/Γ~2–70.

Capacitively-Loaded Conducting Loops or Coils

Figure 4:
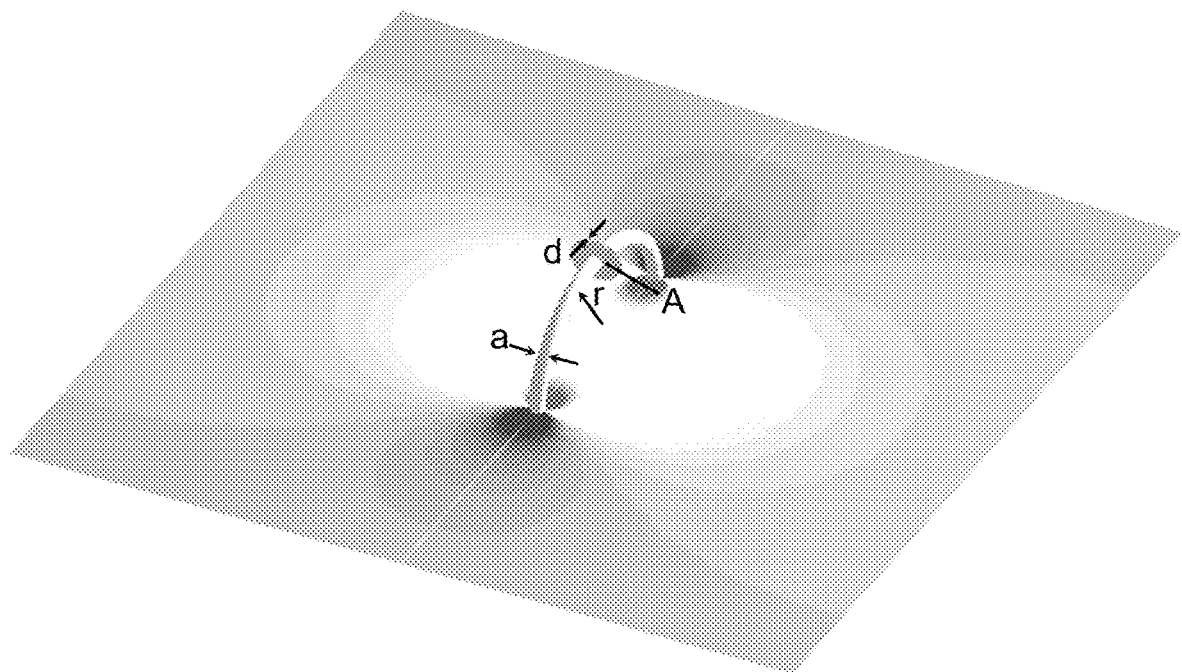
FIG. 4 shows an example of a capacitively loaded conducting-wire coil, and illustrates the surrounding field.

In some embodiments, one or more of the resonant objects are capacitively-loaded conducting loops or coils. Referring to FIG. 4 a helical coil with N turns of conducting wire, as described above, is connected to a pair of conducting parallel plates of area A spaced by distance d via a dielectric material of relative permittivity E, and everything is surrounded by air (as shown, N=1 and h=0). The plates have a capacitance $C_p = \varepsilon_o \varepsilon A/d$, which is added to the distributed capacitance of the coil and thus modifies its resonance. Note however, that the presence of the loading capacitor modifies significantly the current distribution inside the wire and therefore the total effective inductance L and total effective capacitance C of the coil are different respectively from $L_s$ and $C_s$, which are calculated for a self-resonant coil of the same geometry using a sinusoidal current profile. Since some charge is accumulated at the plates of the external loading capacitor, the charge distribution p inside the wire is reduced, so $C < C_s$, and thus, from the charge conservation equation, the current distribution j flattens out, so $L > L_s$. The resonant frequency for this system is $\omega = 1/\sqrt{L(C+C_p)} < \omega_s = 1/\sqrt{L_s C_s}$, and $I(x) \to I_o \cos(\pi x/l) \Rightarrow C \to C_s \Rightarrow \omega \to \omega_s$, as $C_p \to 0$.

In general, the desired CMT parameters can be found for this system, but again a very complicated solution of Maxwell's Equations is required. Instead, we will analyze only a special case, where a reasonable guess for the current distribution can be made. When $C_p \gg C_s > C$, then $\omega \approx 1/\sqrt{LC_p} \ll \omega_s$ and $Z \approx \sqrt{L/C_p} \ll Z_s$, while all the charge is on the plates of the loading capacitor and thus the current distribution is constant along the wire. This allows us now to compute numerically L from Eq. (2). In the case h=0 and N integer, the integral in Eq. (2) can actually be computed analytically, giving the formula $L = \mu_o r[\ln(8r/a) - 2]N^2$. Explicit analytical formulas are again available for R from Eq. (4) and (5), since $I_{rms} = I_o$, $|p| \approx 0$ and $|m| = I_o N\pi r^2$ (namely only the magnetic-dipole term is contributing to radiation), so we can determine also $Q^{abs} = \omega L/R_{abs}$ and $Q^{rad} = \omega L/R_{rad}$. At the end of the calculations, the validity of the assumption of constant current profile is confirmed by checking that indeed the condition $C_p \gg C_s \Leftrightarrow \omega \ll \omega_s$ is satisfied. To satisfy this condition, one could use a large external capacitance, however, this would usually shift the operational frequency lower than the optimal frequency, which we will determine shortly; instead, in typical embodiments, one often prefers coils with very small self-capacitance $C_s$ to begin with, which usually holds, for the types of coils under consideration, when N=1, so that the self-capacitance comes from the charge distribution across the single turn, which is almost always very small, or when N>1 and h≫2Na, so that the dominant self-capacitance comes from the charge distribution across adjacent turns, which is small if the separation between adjacent turns is large.

The external loading capacitance $C_p$ provides the freedom to tune the resonant frequency (for example by tuning A or d). Then, for the particular simple case h=0, for which we have analytical formulas, the total $Q = \omega L/(R_{abs} + R_{rad})$ becomes highest at the optimal frequency $$\tilde{\omega} = \left[\frac{c^4}{\pi}\sqrt{\frac{\varepsilon_o}{2\sigma}} \cdot \frac{1}{aNr^3}\right]^{2/7}, \quad (7)$$

reaching the value $$\tilde{Q} = \frac{6}{7\pi}\left(2\pi^2\eta_o \frac{\sigma a^2 N^2}{r}\right)^{3/7} \cdot \left[\ln\left(\frac{8r}{a}\right) - 2\right]. \quad (8)$$

At lower frequencies it is dominated by ohmic loss and at higher frequencies by radiation. Note, however, that the formulas above are accurate as long as $\tilde{\omega} \ll \omega_s$ and, as explained above, this holds almost always when N=1, and is usually less accurate when N>1, since h=0 usually implies a large self-capacitance. A coil with large h can be used, if the self-capacitance needs to be reduced compared to the external capacitance, but then the formulas for L and $\tilde{\omega}$, $\tilde{Q}$ are again less accurate. Similar qualitative behavior is expected, but a more complicated theoretical model is needed for making quantitative predictions in that case.

The results of the above analysis for two embodiments of subwavelength modes of λ/r≥70 (namely highly suitable for near-field coupling and well within the quasi-static limit) of coils with N=1 and h=0 at the optimal frequency Eq. (7) are presented in Table 3. To confirm the validity of constant-current assumption and the resulting analytical formulas, mode-solving calculations were also performed using another completely independent method: computational 3D finite-element frequency-domain (FEFD) simulations (which solve Maxwell's Equations in frequency domain exactly apart for spatial discretization) were conducted, in which the boundaries of the conductor were modeled using a complex impedance $\zeta_c = \sqrt{\mu_o \omega/2\sigma}$ boundary condition, valid as long as $\zeta_c/\zeta_o \ll 1$ ($<10^{-5}$ for copper in the microwave). Table 3 shows Numerical FEFD (and in parentheses analytical) results for the wavelength and absorption, radiation and total loss rates, for two different cases of subwavelength-loop resonant modes. Note that for conducting material copper ($\sigma = 5.998 \cdot 10^7$ S/m) was used. (The specific parameters of the plot in FIG. 4 are highlighted with bold in the table.) The two methods (analytical and computational) are in very good agreement and show that, in some embodiments, the optimal frequency is in the low-MHz microwave range and the expected quality factors are $Q^{abs} \geq 1000$ and $Q^{rad} \geq 10000$.

TABLE 3

| single coil | λ/r | f (MHz) | $Q^{rad}$ | $Q^{abs}$ | Q = ω/2Γ |
|---|---|---|---|---|---|
| r = 30 cm, a = 2 cm<br>ε = 10, A = 138 cm2,<br>d = 4 mm | 111.4 (112.4) | 8.976 (8.897) | 29546 (30512) | 4886 (5117) | 4193 (4381) |
| r = 10 cm, a = 2 mm<br>ε = 10, A = 3.14 cm²,<br>d = 1 mm | 69.7 (70.4) | 43.04 (42.61) | 10702 (10727) | 1545 (1604) | 1350 (1395) |

Figure 5:
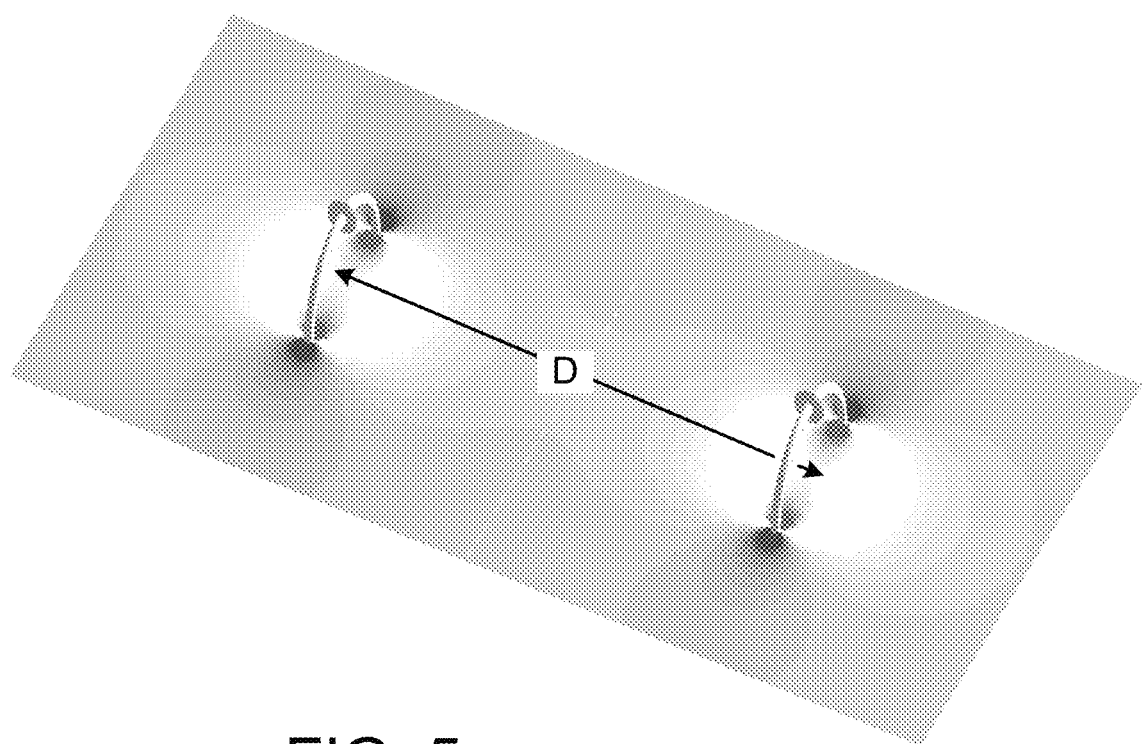
FIG. 5 shows a wireless energy transfer scheme featuring two capacitively loaded conducting-wire coils, and illustrates the surrounding field.

Referring to FIG. 5, in some embodiments, energy is transferred between two capacitively-loaded coils. For the rate of energy transfer between two capacitively-loaded coils 1 and 2 at distance D between their centers, the mutual inductance ML can be evaluated numerically from Eq. (6) by using constant current distributions in the case $\omega \ll \omega_s$. In the case h=0, the coupling is only magnetic and again we have an analytical formula, which, in the quasi-static limit $r \ll D \ll \lambda$ and for the relative orientation shown in FIG. 4, is $M_L \approx \pi \mu_o/2 \cdot (r_1 r_2)^2 N_1 N_2/D^3$, which means that $Q_\kappa \propto (D/\sqrt{r_1 r_2})^3$ is independent of the frequency $\omega$ and the number of turns $N_1$, $N_2$. Consequently, the resultant coupling figure-of-merit of interest is $$\frac{\kappa}{\sqrt{\Gamma_1 \Gamma_2}} = \qquad (9)$$

$$\frac{\sqrt{Q_1 Q_2}}{Q_\kappa} \approx \left(\frac{\sqrt{r_1 r_2}}{D}\right)^3 \cdot \frac{\pi^2 \eta_o \frac{\sqrt{r_1 r_2}}{\lambda} \cdot N_1 N_2}{\prod_{j=1,2}\left(\sqrt{\frac{\pi \eta_o}{\lambda \sigma}} \cdot \frac{r_j}{a_j} N_j + \frac{8}{3}\pi^5 \eta_o \left(\frac{r_j}{\lambda}\right)^4 N_j^2\right)^{1/2}},$$

which again is more accurate for $N_1=N_2=1$.

From Eq. (9) it can be seen that the optimal frequency $\omega$, where the figure-of-merit is maximized to the value $\overline{(\sqrt{Q_1 Q_2}/Q_\kappa)}$, is that where $\sqrt{Q_1 Q_2}$ is maximized, since $Q_\kappa$ does not depend on frequency (at least for the distances $D \ll \lambda$ of interest for which the quasi-static approximation is still valid). Therefore, the optimal frequency is independent of the distance D between the two coils and lies between the two frequencies where the single-coil $Q_1$ and $Q_2$ peak. For same coils, it is given by Eq. (7) and then the figure-of-merit Eq. (9) becomes $$\left(\frac{\tilde{\kappa}}{\Gamma}\right) = \frac{\tilde{Q}}{Q_\kappa} \approx \left(\frac{r}{D}\right)^3 \cdot \frac{3}{7}\left(2\pi^2 \eta_o \frac{\sigma a^2 N^2}{r}\right)^{3/7}. \qquad (10)$$

Typically, one should tune the capacitively-loaded conducting loops or coils, so that their angular eigenfrequencies are close to $\tilde{\omega}$ within $\tilde{\Gamma}$, which is half the angular frequency width for which $\sqrt{Q_1 Q_2}/Q_\kappa > \overline{(\sqrt{Q_1 Q_2}/Q_\kappa)}/2$.

Referring to Table 4, numerical FEFD and, in parentheses, analytical results based on the above are shown for two systems each composed of a matched pair of the loaded coils described in Table 3. The average wavelength and loss rates are shown along with the coupling rate and coupling to loss ratio figure-of-merit $\kappa/\Gamma$ as a function of the coupling distance D, for the two cases. Note that the average numerical $\Gamma^{rad}$ shown are again slightly different from the single-loop value of FIG. 3, analytical results for $\Gamma^{rad}$ are not shown but the single-loop value is used. (The specific parameters corresponding to the plot in FIG. 5 are highlighted with bold in the table.) Again we chose N=1 to make the constant-current assumption a good one and computed $M_L$ numerically from Eq. (6). Indeed the accuracy can be confirmed by their agreement with the computational FEFD mode-solver simulations, which give i through the frequency splitting (=2κ) of the two normal modes of the combined system. The results show that for medium distances D/r=10–3 the expected coupling-to-loss ratios are in the range κ/Γ~0.5–50.

TABLE 4

| pair of coils | D/r | $Q^{rad}$ | $Q = \omega/2\Gamma$ | $Q_\kappa = \omega/2\kappa$ | $\kappa/\Gamma$ |
|---|---|---|---|---|---|
| r = 30 cm, a = | 3 | 30779 | 4216 | 62.6 (63.7) | 67.4 (68.7) |
| 2 cm ϵ = 10, | 5 | 29577 | 4194 | 235 (248) | 17.8 (17.6) |
| A = 138 cm2, | 7 | 29128 | 4185 | 589 (646) | 7.1 (6.8) |
| d = 4 mm | 10 | 28833 | 4177 | 1539 (1828) | 2.7 (2.4) |
| λ/r ≈ 112 | | | | | |
| $Q^{abs}$ ≈ 4886 | | | | | |
| r = 10 cm, a = | 3 | 10955 | 1355 | 85.4 (91.3) | 15.9 (15.3) |
| 2 mm ϵ = 10, | 5 | 10740 | 1351 | 313 (356) | 4.32 (3.92) |
| A = 3.14 cm², | 7 | 10759 | 1351 | 754 (925) | 1.79 (1.51) |
| d = 1 mm | 10 | 10756 | 1351 | 1895 (2617) | 0.71 (0.53) |
| λ/r ≈ 70 | | | | | |
| $Q^{abs}$ ≈ 1546 | | | | | |

Optimization of $\sqrt{Q_1 Q_2}/Q_\kappa$

In some embodiments, the results above can be used to increase or optimize the performance of a wireless energy transfer system which employs capacitively-loaded coils. For example, the scaling of Eq. (10) with the different system parameters one sees that to maximize the system figure-of-merit κ/Γ one can, for example:

Decrease the resistivity of the conducting material. This can be achieved, for example, by using good conductors (such as copper or silver) and/or lowering the temperature. At very low temperatures one could use also superconducting materials to achieve extremely good performance.

Increase the wire radius a. In typical embodiments, this action is limited by physical size considerations. The purpose of this action is mainly to reduce the resistive losses in the wire by increasing the cross-sectional area through which the electric current is flowing, so one could alternatively use also a Litz wire or a ribbon instead of a circular wire.

For fixed desired distance D of energy transfer, increase the radius of the loop r. In typical embodiments, this action is limited by physical size considerations.

For fixed desired distance vs. loop-size ratio D/r, decrease the radius of the loop r. In typical embodiments, this action is limited by physical size considerations.

Increase the number of turns N. (Even though Eq. (10) is expected to be less accurate for N>1, qualitatively it still provides a good indication that we expect an improvement in the coupling-to-loss ratio with increased N.) In typical embodiments, this action is limited by physical size and possible voltage considerations, as will be discussed in following sections.

Adjust the alignment and orientation between the two coils. The figure-of-merit is optimized when both cylindrical coils have exactly the same axis of cylindrical symmetry (namely they are "facing" each other). In some embodiments, particular mutual coil angles and orientations that lead to zero mutual inductance (such as the orientation where the axes of the two coils are perpendicular) should be avoided.

Finally, note that the height of the coil h is another available design parameter, which has an impact to the performance similar to that of its radius r, and thus the design rules are similar.

The above analysis technique can be used to design systems with desired parameters. For example, as listed below, the above described techniques can be used to determine the cross sectional radius a of the wire which one should use when designing as system two same single-turn loops with a given radius in order to achieve a specific performance in terms of κ/Γ at a given D/r between them, when the material is copper (σ=5.998·10⁷S/m):

$D/r=5$, $\kappa/\Gamma \geq 10$, $r=30$ cm $\Rightarrow a \geq 9$ mm $D/r=5$, $\kappa/\Gamma \geq 10$, $r=5$ cm $\Rightarrow a \geq 3.7$ mm $D/r=5$, $\kappa/\Gamma \geq 20$, $r=30$ cm $\Rightarrow a \geq 20$ mm $D/r=5$, $\kappa/\Gamma \geq 20$, $r=5$ cm $\Rightarrow a \geq 8.3$ mm $D/r=10$, $\kappa/\Gamma \geq 1$, $r=30$ cm $\Rightarrow a \geq 7$ mm $D/r=10$, $\kappa/\Gamma \geq 1$, $r=5$ cm $\Rightarrow a \geq 2.8$ mm $D/r=10$, $\kappa/\Gamma \geq 3$, $r=30$ cm $\Rightarrow a \geq 25$ mm $D/r=10$, $\kappa/\Gamma \geq 3$, $r=5$ cm $\Rightarrow a \geq 10$ mm Similar analysis can be done for the case of two dissimilar loops. For example, in some embodiments, the device under consideration is very specific (e.g. a laptop or a cell phone), so the dimensions of the device object ($r_d$, $h_d$, $a_d$, $N_d$) are very restricted. However, in some such embodiments, the restrictions on the source object ($r_s$, $h_s$, $a_s$, $N_s$) are much less, since the source can, for example, be placed under the floor or on the ceiling. In such cases, the desired distance is often well defined, based on the application (e.g. D~1 m for charging a laptop on a table wirelessly from the floor). Listed below are examples (simplified to the case $N_s=N_d=1$ and $h_s=h_d=0$) of how one can vary the dimensions of the source object to achieve the desired system performance in terms of $\kappa/\sqrt{\Gamma_s \Gamma_d}$, when the material is again copper (σ=5.998·10⁷S/m):

$D=1.5$ m, $\kappa/\sqrt{\Gamma_s \Gamma_d} \geq 15$, $r_d=30$ cm, $a_d=6$ mm $\Rightarrow r_s=1.158$ m, $a_s \geq 5$ mm $D=1.5$ m, $\kappa/\sqrt{\Gamma_s \Gamma_d} \geq 30$, $r_d=30$ cm, $a_d=6$ mm $\Rightarrow r_s=1.15$ m, $a_s \geq 33$ mm $D=1.5$ m, $\kappa/\sqrt{\Gamma_s \Gamma_d} \geq 1$, $r_d=5$ cm, $a_d=4$ mm $\Rightarrow r_s=1.119$ m, $a_s \geq 7$ mm $D=1.5$ m, $\kappa/\sqrt{\Gamma_s \Gamma_d} \geq 2$, $r_d=5$ cm, $a_d=4$ mm $\Rightarrow r_s=1.119$ m, $a_s \geq 52$ mm $D=2$ m, $\kappa/\sqrt{\Gamma_s \Gamma_d} \geq 10$, $r_d=30$ cm, $a_d=6$ mm $\Rightarrow r_s=1.518$ m, $a_s \geq 7$ mm $D=2$ m, $\kappa/\sqrt{\Gamma_s \Gamma_d} \geq 20$, $r_d=30$ cm, $a_d=6$ mm $\Rightarrow r_s=1.514$ m, $a_s \geq 50$ mm $D=2$ m, $\kappa/\sqrt{\Gamma_s \Gamma_d} \geq 0.5$, $r_d=5$ cm, $a_d=4$ mm $\Rightarrow r_s=1.491$ m, $a_s \geq 5$ mm $D=2$ m, $\kappa/\sqrt{\Gamma_s \Gamma_d} \geq 1$, $r_d=5$ cm, $a_d=4$ mm $\Rightarrow r_s=1.491$ m, $a_s \geq 36$ mm Optimization of $Q_\kappa$ As will be described below, in some embodiments the quality factor Q of the resonant objects is limited from external perturbations and thus varying the coil parameters cannot lead to improvement in Q. In such cases, one may opt to increase the coupling to loss ratio figure-of-merit by decreasing $Q_\kappa$ (i.e. increasing the coupling). The coupling does not depend on the frequency and the number of turns. Therefore, the remaining degrees of freedom are:

Increase the wire radii $a_1$ and $a_2$. In typical embodiments, this action is limited by physical size considerations.

For fixed desired distance D of energy transfer, increase the radii of the coils $r_1$ and $r_2$. In typical embodiments, this action is limited by physical size considerations.

For fixed desired distance vs. coil-sizes ratio $D/r_1 r_2$, only the weak (logarithmic) dependence of the inductance remains, which suggests that one should decrease the radii of the coils $r_1$ and $r_2$. In typical embodiments, this action is limited by physical size considerations.

Adjust the alignment and orientation between the two coils. In typical embodiments, the coupling is optimized when both cylindrical coils have exactly the same axis of cylindrical symmetry (namely they are "facing" each other). Particular mutual coil angles and orientations that lead to zero mutual inductance (such as the orientation where the axes of the two coils are perpendicular) should obviously be avoided.

Finally, note that the heights of the coils $h_1$ and $h_2$ are other available design parameters, which have an impact to the coupling similar to that of their radii $r_1$ and $r_2$, and thus the design rules are similar.

Further practical considerations apart from efficiency, e.g. physical size limitations, will be discussed in detail below.

It is also important to appreciate the difference between the above described resonant-coupling inductive scheme and the well-known non-resonant inductive scheme for energy transfer. Using CMT it is easy to show that, keeping the geometry and the energy stored at the source fixed, the resonant inductive mechanism allows for $\sim Q^2$ ($\sim 10^6$) times more power delivered for work at the device than the traditional non-resonant mechanism. This is why only close-range contact-less medium-power (W) transfer is possible with the latter, while with resonance either close-range but large-power ($\sim$kW) transfer is allowed or, as currently proposed, if one also ensures operation in the strongly-coupled regime, medium-range and medium-power transfer is possible. Capacitively-loaded conducting loops are currently used as resonant antennas (for example in cell phones), but those operate in the far-field regime with $D/r \gg 1$, $r/\lambda \sim 1$, and the radiation Q's are intentionally designed to be small to make the antenna efficient, so they are not appropriate for energy transfer.

Inductively-Loaded Conducting Rods

A straight conducting rod of length 2 h and cross-sectional radius a has distributed capacitance and distributed inductance, and therefore it supports a resonant mode of angular frequency ω. Using the same procedure as in the case of self-resonant coils, one can define an effective total inductance L and an effective total capacitance C of the rod through formulas (2) and (3). With these definitions, the resonant angular frequency and the effective impedance are given again by the common formulas $\omega=1/\sqrt{LC}$ and $Z=\sqrt{L/C}$ respectively. To calculate the total inductance and capacitance, one can assume again a sinusoidal current profile along the length of the conducting wire. When interested in the lowest mode, if we denote by x the coordinate along the conductor, such that it runs from −h to +h, then the current amplitude profile would have the form $I(x)=I_o \cos(\pi x/2h)$, since it has to be zero at the open ends of the rod. This is the well-known half-wavelength electric dipole resonant mode.

In some embodiments, one or more of the resonant objects are inductively-loaded conducting rods. A straight conducting rod of length 2h and cross-sectional radius a, as in the previous paragraph, is cut into two equal pieces of length h, which are connected via a coil wrapped around a magnetic material of relative permeability μ, and everything is surrounded by air. The coil has an inductance $L_C$, which is added to the distributed inductance of the rod and thus modifies its resonance. Note however, that the presence of the center-loading inductor modifies significantly the current distribution inside the wire and therefore the total effective inductance L and total effective capacitance C of the rod are different respectively from $L_s$ and $C_s$, which are calculated for a self-resonant rod of the same total length using a sinusoidal current profile, as in the previous paragraph. Since some current is running inside the coil of the external loading inductor, the current distribution j inside the rod is reduced, so $L<L_s$, and thus, from the charge conservation equation, the linear charge distribution $\rho_l$ flattens out towards the center (being positive in one side of the rod and negative in the other side of the rod, changing abruptly through the inductor), so $C>C_s$. The resonant frequency for this system is $\omega=1/\sqrt{(L\pm L_c)C}<\omega_s=1/\sqrt{L_s C_s}$, and $I(x)\rightarrow I_o \cos(\pi x/2h)\Rightarrow L\rightarrow L_s \Rightarrow \omega \rightarrow \omega_s$, as $L_c \rightarrow 0$.

In general, the desired CMT parameters can be found for this system, but again a very complicated solution of Maxwell's Equations is required. Instead, we will analyze only a special case, where a reasonable guess for the current distribution can be made. When $L_c \gg L_s > L$, then $\omega \approx 1/L_c C \ll \omega_s$ and $Z \approx \sqrt{L_c/C} \gg Z_s$, while the current distribution is triangular along the rod (with maximum at the center-loading inductor and zero at the ends) and thus the charge distribution is positive constant on one half of the rod and equally negative constant on the other side of the rod. This allows us now to compute numerically C from Eq. (3). In this case, the integral in Eq. (3) can actually be computed analytically, giving the formula $1/C=1/(\pi\varepsilon_o h)[\ln(h/a)-1]$. Explicit analytical formulas are again available for R from Eq. (4) and (5), since $I_{rms}=I_o$, $|p|=q_o h$ and $|m|=0$ (namely only the electric-dipole term is contributing to radiation), so we can determine also $Q^{abs}=1/\omega C R_{abs}$ and $Q^{rad}=1/\omega C R_{rad}$. At the end of the calculations, the validity of the assumption of triangular current profile is confirmed by checking that indeed the condition $L_c \gg L_s \Leftrightarrow \omega \gg \omega_s$ is satisfied. This condition is relatively easily satisfied, since typically a conducting rod has very small self-inductance $L_s$ to begin with.

Another important loss factor in this case is the resistive loss inside the coil of the external loading inductor $L_c$ and it depends on the particular design of the inductor. In some embodiments, the inductor is made of a Brooks coil, which is the coil geometry which, for fixed wire length, demonstrates the highest inductance and thus quality factor. The Brooks coil geometry has $N_{Bc}$ turns of conducting wire of cross-sectional radius $a_{Bc}$ wrapped around a cylindrically symmetric coil former, which forms a coil with a square cross-section of side $r_{Bc}$, where the inner side of the square is also at radius $r_{Bc}$ (and thus the outer side of the square is at radius $2r_{Bc}$), therefore $N_{Bc} \approx (r_{Bc}/2a_{Bc})^2$. The inductance of the coil is then $L_c = 2.0285 \mu_o r_{Bc} N_{Bc}^2 \approx 2.0285 \mu_o r_{Bc}^5/8a_{Bc}^4$ and its resistance $$R_c \approx \frac{1}{\sigma} \frac{l_{Bc}}{\pi a_{Bc}^2} \sqrt{1+\frac{\mu\omega\sigma}{2}\left(\frac{a_B}{2}\right)^2},$$

where the total wire length is $l_{Bc} \approx 2\pi(3r_{Bc}/2)N_{Bc} \approx 3\pi r_{Bc}^3/4a_{Bc}^2$ and we have used an approximate square-root law for the transition of the resistance from the dc to the ac limit as the skin depth varies with frequency.

The external loading inductance $L_c$ provides the freedom to tune the resonant frequency. (For example, for a Brooks coil with a fixed size $r_{Bc}$, the resonant frequency can be reduced by increasing the number of turns $N_{Bc}$ by decreasing the wire cross-sectional radius $a_{Bc}$. Then the desired resonant angular frequency $\omega=1/\sqrt{L_c C}$ is achieved for $a_{Bc} \approx (2.0285\mu_o r_{Bc}^5 \omega^2 C)^{1/4}$ and the resulting coil quality factor is $Q_c \approx 0.169\mu_o \sigma r_{Bc}^2 \omega/\sqrt{1+\omega^2 \mu_o \sigma \sqrt{2.0285\mu_o(r_{Bc}/4)^5 C}}$). Then, for the particular simple case $L_c \gg L_s$, for which we have analytical formulas, the total $Q=1/\omega C(R_c+R_{abs}+R_{rad})$ becomes highest at some optimal frequency $\tilde\omega$, reaching the value $\tilde Q$, both determined by the loading-inductor specific design. (For example, for the Brooks-coil procedure described above, at the optimal frequency $\tilde Q \approx Q_c \approx 0.8 (\mu_o \sigma^2 r_{Bc}^3/C)^{1/4}$.) At lower frequencies it is dominated by ohmic loss inside the inductor coil and at higher frequencies by radiation. Note, again, that the above formulas are accurate as long as $\tilde\omega \ll \omega_s$ and, as explained above, this is easy to design for by using a large inductance.

The results of the above analysis for two embodiments, using Brooks coils, of subwavelength modes of $\lambda/h \geq 200$ (namely highly suitable for near-field coupling and well within the quasi-static limit) at the optimal frequency $\tilde\omega$ are presented in Table 5. Table 5 shows in parentheses (for similarity to previous tables) analytical results for the wavelength and absorption, radiation and total loss rates, for two different cases of subwavelength-loop resonant modes. Note that for conducting material copper ($\sigma=5.998 \cdot 10^7$ S/m) was used. The results show that, in some embodiments, the optimal frequency is in the low-MHz microwave range and the expected quality factors are $Q^{abs} \geq 1000$ and $Q^{rad} \geq 100000$.

TABLE 5

| single rod | λ/h | f (MHz) | $Q^{rad}$ | $Q^{abs}$ | Q = ω/2Γ |
|---|---|---|---|---|---|
| h = 30 cm, a = 2 cm<br>μ = 1, $r_{Bc}$ = 2 cm,<br>$a_{Bc}$ = 0.88 mm,<br>$N_{Bc}$ = 129 | (403.8) | (2.477) | (2.72 * $10^6$) | (7400) | (7380) |
| h = 10 cm, a = 2 mm<br>μ = 1, $r_{Bc}$ = 5 mm,<br>$a_{Bc}$ = 0.25 mm, | (214.2) | (14.010) | (6.92 * $10^5$) | (3908) | (3886) |

In some embodiments, energy is transferred between two inductively-loaded rods. For the rate of energy transfer between two inductively-loaded rods 1 and 2 at distance D between their centers, the mutual capacitance Mc can be evaluated numerically from Eq. (6) by using triangular current distributions in the case $\omega \ll \omega_s$. In this case, the coupling is only electric and again we have an analytical formula, which, in the quasi-static limit $t \ll D \ll \lambda$ and for the relative orientation such that the two rods are aligned on the same axis, is $1/M_C \approx 1/2\pi\varepsilon_o \cdot (h_1 h_2)^2/D^3$, which means that $Q_\kappa \propto (D/\sqrt{h_1 h_2})$ is independent of the frequency $\omega$. Consequently, one can get the resultant coupling figure-of-merit of interest $$t\frac{\kappa}{\sqrt{\Gamma_1 \Gamma_2}} = \frac{\sqrt{Q_1 Q_2}}{Q_\kappa}.$$

It can be seen that the optimal frequency $\tilde\omega$, where the figure-of-merit is maximized to the value $(\sqrt{Q_1 Q_2}/Q_\kappa)$, is that where $\sqrt{Q_1 Q_2}$ is maximized, since $Q_\kappa$ does not depend on frequency (at least for the distances $D \ll \lambda$ of interest for which the quasi-static approximation is still valid). Therefore, the optimal frequency is independent of the distance D between the two rods and lies between the two frequencies where the single-rod $Q_1$ and $Q_2$ peak. Typically, one should tune the inductively-loaded conducting rods, so that their angular eigenfrequencies are close to 6 within $\tilde{\Gamma}$, which is half the angular frequency width for which $Q_1Q_2/Q_\kappa > (\sqrt{Q_1Q_2}/Q_\kappa)/2$ Referring to Table 6, in parentheses (for similarity to previous tables) analytical results based on the above are shown for two systems each composed of a matched pair of the loaded rods described in Table 5. The average wavelength and loss rates are shown along with the coupling rate and coupling to loss ratio figure-of-merit $\kappa/\Gamma$ as a function of the coupling distance D, for the two cases. Note that for $\Gamma^{rad}$ the single-rod value is used. Again we chose $L_c \gg L_s$ to make the triangular-current assumption a good one and computed $M_c$ numerically from Eq. (6). The results show that for medium distances D/h=10–3 the expected coupling-to-loss ratios are in the range $\kappa/\Gamma$~0.5–100.

TABLE 6

| pair of rods | D/h | $Q_\kappa = \omega/2\kappa$ | $\kappa/\Gamma$ |
|---|---|---|---|
| h = 30 cm, a = 2 cm | 3 | (70.3) | (105.0) |
| $\mu = 1$, $r_{Bc} = 2$ cm, | 5 | (389) | (19.0) |
| $a_{Bc} = 0.88$ mm, $N_{Bc} = 129$ | 7 | (1115) | (6.62) |
| $\lambda/h \approx 404$ | 10 | (3321) | (2.22) |
| Q ≈ 7380 | | | |
| h = 10 cm, a = 2 mm | 3 | (120) | (32.4) |
| $\mu = 1$, $r_{Bc} = 5$ mm, | 5 | (664) | (5.85) |
| $a_{Bc} = 0.25$ mm, $N_{Bc} = 103$ | 7 | (1900) | (2.05) |
| $\lambda/h \approx 214$ | 10 | (5656) | (0.69) |
| Q ≈ 3886 | | | |

Dielectric Disks

Figure 6:
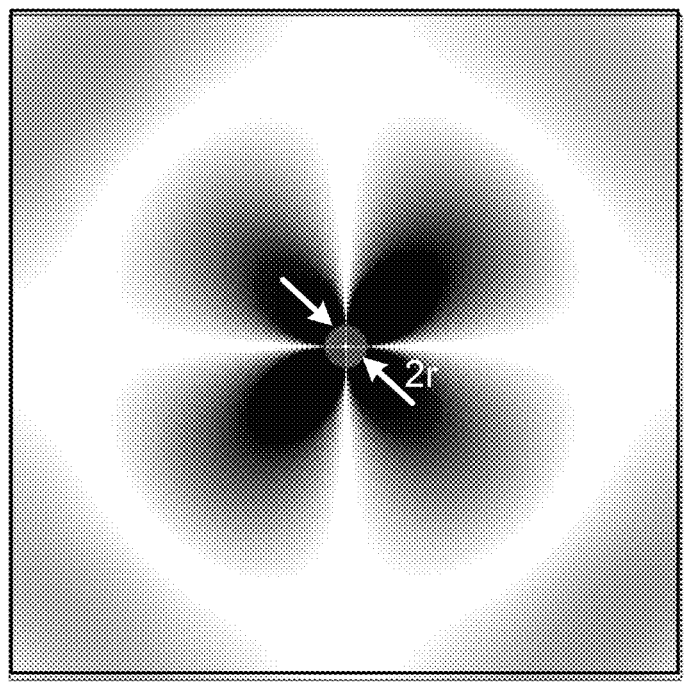
FIG. 6 shows an example of a resonant dielectric disk, and illustrates the surrounding field.

In some embodiments, one or more of the resonant objects are dielectric objects, such as disks. Consider a two dimensional dielectric disk object, as shown in FIG. 6, of radius r and relative permittivity E surrounded by air that supports high-Q "whispering-gallery" resonant modes. The loss mechanisms for the energy stored inside such a resonant system are radiation into free space and absorption inside the disk material. High-$Q_{rad}$ and long-tailed subwavelength resonances can be achieved when the dielectric permittivity ε is large and the azimuthal field variations are slow (namely of small principal number m). Material absorption is related to the material loss tangent: $Q_{abs} \sim Re\{\varepsilon\}/Im\{\varepsilon\}$. Mode-solving calculations for this type of disk resonances were performed using two independent methods: numerically, 2D finite-difference frequency-domain (FDFD) simulations (which solve Maxwell's Equations in frequency domain exactly apart for spatial discretization) were conducted with a resolution of 30 pts/r; analytically, standard separation of variables (SV) in polar coordinates was used.

TABLE 7

| single disk | $\lambda/r$ | $Q^{abs}$ | $Q^{rad}$ | Q |
|---|---|---|---|---|
| $Re\{\varepsilon\} = 147.7$, m = 2 | 20.01 (20.00) | 10103 (10075) | 1988 (1992) | 1661 (1663) |
| $Re\{\varepsilon\} = 65.6$, m = 3 | 9.952 (9.950) | 10098 (10087) | 9078 (9168) | 4780 (4802) |

The results for two TE-polarized dielectric-disk subwavelength modes of $\lambda/r \geq 10$ are presented in Table 7. Table 7 shows numerical FDFD (and in parentheses analytical SV) results for the wavelength and absorption, radiation and total loss rates, for two different cases of subwavelength-disk resonant modes. Note that disk-material loss-tangent $Im\{\varepsilon\}/Re\{\varepsilon\}=10^{-4}$ was used. (The specific parameters corresponding to the plot in FIG. 6. are highlighted with bold in the table.) The two methods have excellent agreement and imply that for a properly designed resonant low-loss-dielectric object values of $Q_{rad} \geq 2000$ and $Q_{abs} \sim 10000$ are achievable. Note that for the 3D case the computational complexity would be immensely increased, while the physics would not be significantly different. For example, a spherical object of ε=147.7 has a whispering gallery mode with m=2, Qrad=13962, and $\lambda/r=17$.

The required values of ε, shown in Table 7, might at first seem unrealistically large. However, not only are there in the microwave regime (appropriate for approximately meter-range coupling applications) many materials that have both reasonably high enough dielectric constants and low losses (e.g. Titania, Barium tetratitanate, Lithium tantalite etc.), but also E could signify instead the effective index of other known subwavelength surface-wave systems, such as surface modes on surfaces of metallic materials or plasmonic (metal-like, negative-ε) materials or metallo-dielectric photonic crystals or plasmono-dielectric photonic crystals.

Figure 7:
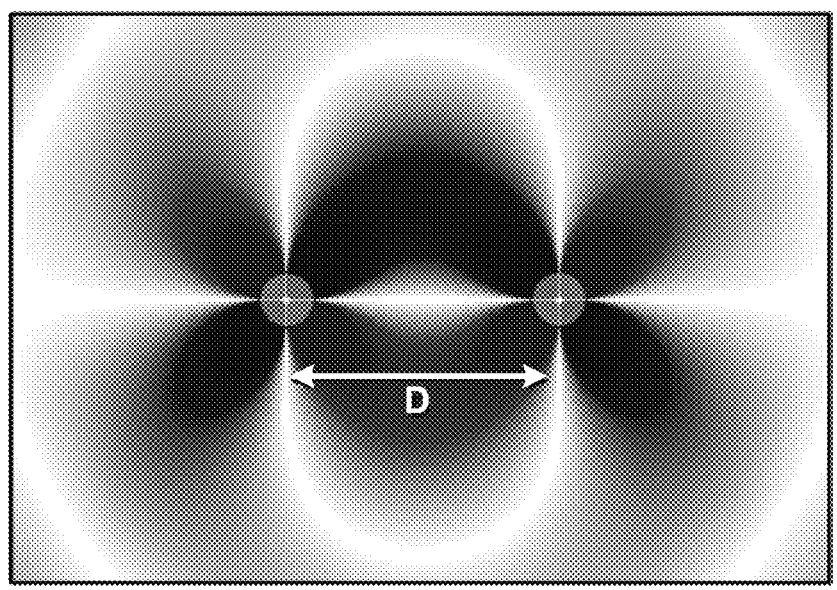
FIG. 7 shows a wireless energy transfer scheme featuring two resonant dielectric disks, and illustrates the surrounding field.

To calculate now the achievable rate of energy transfer between two disks 1 and 2, as shown in FIG. 7 we place them at distance D between their centers. Numerically, the FDFD mode-solver simulations give ic through the frequency splitting (=2κ) of the normal modes of the combined system, which are even and odd superpositions of the initial single-disk modes; analytically, using the expressions for the separation-of-variables eigenfields $E_{1,2}(r)$ CMT gives κ through $\kappa = \omega_1/2 \cdot \int d^3 r \varepsilon_2(r) E^*_2(r) E_1(r) / \int d^3 r \varepsilon(r) |E_1(r)|^2$ where $\varepsilon_j(r)$ and $\varepsilon(r)$ are the dielectric functions that describe only the disk j (minus the constant $\varepsilon_o$ background) and the whole space respectively. Then, for medium distances D/r=10–3 and for non-radiative coupling such that $D<2r_C$, where $r_C$ $\approx m\lambda/2\pi$ is the radius of the radiation caustic, the two methods agree very well, and we finally find, as shown in Table 8, coupling-to-loss ratios in the range $\kappa/\Gamma$ ~1-50. Thus, for the analyzed embodiments, the achieved figure-of-merit values are large enough to be useful for typical applications, as discussed below.

TABLE 8

| two disks | D/r | $Q^{rad}$ | $Q = \omega/2\Gamma$ | $\omega/2\kappa$ | $\kappa/\Gamma$ |
|---|---|---|---|---|---|
| $Re\{\varepsilon\} = 147.7$, m = 2 | 3 | 2478 | 1989 | 46.9 (47.5) | 42.4 (35.0) |
| $\lambda/r \approx 20$ | 5 | 2411 | 1946 | 298.0 (298.0) | 6.5 (5.6) |
| $Q^{abs} \approx 10093$ | 7 | 2196 | 1804 | 769.7 (770.2) | 2.3 (2.2) |
| | 10 | 2017 | 1681 | 1714 (1601) | 0.98 (1.04) |
| $Re\{\varepsilon\} = 65.6$, m = 3 | 3 | 7972 | 4455 | 144 (140) | 30.9 (34.3) |
| $\lambda/r \approx 10$ | 5 | 9240 | 4824 | 2242 (2083) | 2.2 (2.3) |
| $Q^{abs} \approx 10096$ | 7 | 9187 | 4810 | 7485 (7417) | 0.64 (0.65) |

Note that even though particular embodiments are presented and analyzed above as examples of systems that use resonant electromagnetic coupling for wireless energy transfer, those of self-resonant conducting coils, capacitively-loaded resonant conducting coils and resonant dielectric disks, any system that supports an electromagnetic mode with its electromagnetic energy extending much further than its size can be used for transferring energy. For example, there can be many abstract geometries with distributed capacitances and inductances that support the desired kind of resonances. In any one of these geometries, one can choose certain parameters to increase and/or optimize $\sqrt{Q_1 Q_2}/Q_\kappa$ or, if the Q's are limited by external factors, to increase and/or optimize for $Q_\kappa$.

System Sensitivity to Extraneous Objects

In general, the overall performance of particular embodiment of the resonance-based wireless energy-transfer scheme depends strongly on the robustness of the resonant objects' resonances. Therefore, it is desirable to analyze the resonant objects' sensitivity to the near presence of random non-resonant extraneous objects. One appropriate analytical model is that of "perturbation theory" (PT), which suggests that in the presence of an extraneous object e the field amplitude $a_1(t)$ inside the resonant object 1 satisfies, to first order:

$$\frac{da_1}{dt} = -i(\omega_1 - i\Gamma_1)a_1 + i(\kappa_{11-e} + i\Gamma_{1-e})a_1 \quad (11)$$

where again $\omega_1$ is the frequency and $\Gamma_1$ the intrinsic (absorption, radiation etc.) loss rate, while is the frequency shift induced onto 1 due to the presence of e and $\Gamma_{1-e}$ is the extrinsic due to e (absorption inside e, scattering from e etc.) loss rate. The first-order PT model is valid only for small perturbations. Nevertheless, the parameters $\kappa_{11-e}$, $\Gamma_{1-e}$ are well defined, even outside that regime, if $a_1$ is taken to be the amplitude of the exact perturbed mode. Note also that interference effects between the radiation field of the initial resonant-object mode and the field scattered off the extraneous object can for strong scattering (e.g. off metallic objects) result in total radiation-$\Gamma_{1-e}$'s that are smaller than the initial radiation-$\Gamma_1$ (namely $\Gamma_{1-e}$ is negative).

Figure 8A:
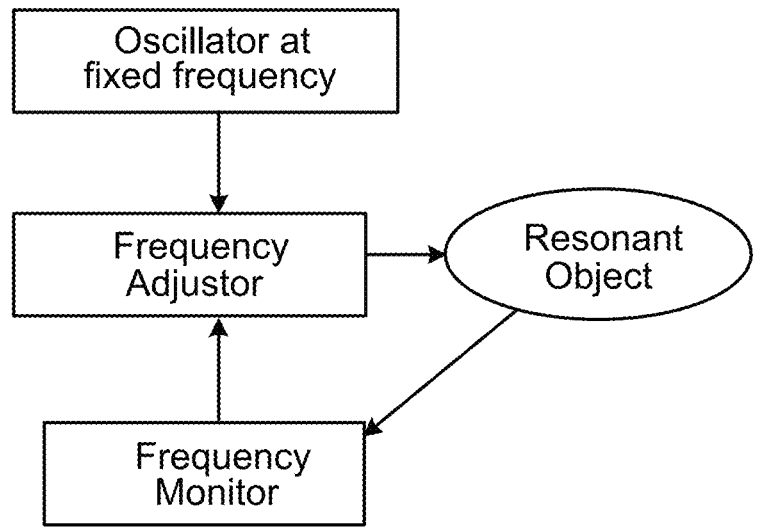
FIGS. 8*a* and 8*b* show schematics for frequency control mechanisms.

The frequency shift is a problem that can be "fixed" by applying to one or more resonant objects a feedback mechanism that corrects its frequency. For example, referring to FIG. 8a, in some embodiments each resonant object is provided with an oscillator at fixed frequency and a monitor which determines the frequency of the object. Both the oscillator and the monitor are coupled to a frequency adjuster which can adjust the frequency of the resonant object by, for example, adjusting the geometric properties of the object (e.g. the height of a self-resonant coil, the capacitor plate spacing of a capacitively-loaded loop or coil, the dimensions of the inductor of an inductively-loaded rod, the shape of a dielectric disc, etc.) or changing the position of a non-resonant object in the vicinity of the resonant object. The frequency adjuster determines the difference between the fixed frequency and the object frequency and acts to bring the object frequency into alignment with the fixed frequency. This technique assures that all resonant objects operate at the same fixed frequency, even in the presence of extraneous objects.

Figure 8B:
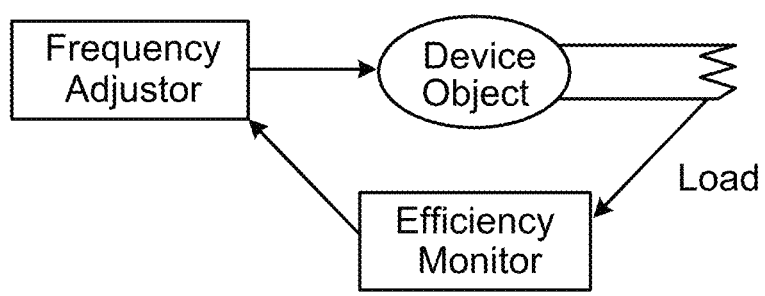

As another example, referring to FIG. 8b, in some embodiments, during energy transfer from a source object to a device object, the device object provides energy to a load, and an efficiency monitor measures the efficiency of the transfer. A frequency adjuster coupled to the load and the efficiency monitor acts to adjust the frequency of the object to maximize the transfer efficiency.

In various embodiments, other frequency adjusting schemes may be used which rely on information exchange between the resonant objects. For example, the frequency of a source object can be monitored and transmitted to a device object, which is in turn synched to this frequency using frequency adjusters as described above. In other embodiments the frequency of a single clock may be transmitted to multiple devices, and each device then synched to that frequency.

Unlike the frequency shift, the extrinsic loss can be detrimental to the functionality of the energy-transfer scheme, because it is difficult to remedy, so the total loss rate $\Gamma_{1[e]} = \Gamma_1 + \Gamma_{1-e}$ (and the corresponding figure-of-merit $\kappa_{[e]}/\sqrt{\Gamma_{1[e]}\Gamma_{z[e]}}$, where $\kappa_{[e]}$ the perturbed coupling rate) should be quantified. In embodiments using primarily magnetic resonances, the influence of extraneous objects on the resonances is nearly absent. The reason is that, in the quasi-static regime of operation ($r \ll \lambda$) that we are considering, the near field in the air region surrounding the resonator is predominantly magnetic (e.g. for coils with $h \ll 2r$ most of the electric field is localized within the self-capacitance of the coil or the externally loading capacitor), therefore extraneous non-conducting objects e that could interact with this field and act as a perturbation to the resonance are those having significant magnetic properties (magnetic permeability $\text{Re}\{\mu\} > 1$ or magnetic loss $\text{Im}\{\mu\} > 0$). Since almost all everyday non-conducting materials are non-magnetic but just dielectric, they respond to magnetic fields in the same way as free space, and thus will not disturb the resonance of the resonator. Extraneous conducting materials can however lead to some extrinsic losses due to the eddy currents induced on their surface.

As noted above, an extremely important implication of this fact relates to safety considerations for human beings. Humans are also non-magnetic and can sustain strong magnetic fields without undergoing any risk. A typical example, where magnetic fields $B \sim 1T$ are safely used on humans, is the Magnetic Resonance Imaging (MRI) technique for medical testing. In contrast, the magnetic near-field required in typical embodiments in order to provide a few Watts of power to devices is only $B \sim 10^{-4}T$, which is actually comparable to the magnitude of the Earth's magnetic field. Since, as explained above, a strong electric near-field is also not present and the radiation produced from this non-radiative scheme is minimal, it is reasonable to expect that our proposed energy-transfer method should be safe for living organisms.

One can, for example, estimate the degree to which the resonant system of a capacitively-loaded conducting-wire coil has mostly magnetic energy stored in the space surrounding it. If one ignores the fringing electric field from the capacitor, the electric and magnetic energy densities in the space surrounding the coil come just from the electric and magnetic field produced by the current in the wire; note that in the far field, these two energy densities must be equal, as is always the case for radiative fields. By using the results for the fields produced by a subwavelength ($r \ll \lambda$) current loop (magnetic dipole) with $h=0$, we can calculate the ratio of electric to magnetic energy densities, as a function of distance $D_p$ from the center of the loop (in the limit $r \ll D_p$) and the angle $\theta$ with respect to the loop axis:

$$\frac{u_e(x)}{u_m(x)} = \frac{\varepsilon_o|E(x)|^2}{\mu_o|H(x)|^2} = \frac{\left(1 + \frac{1}{x^2}\right)\sin^2\theta}{\left(\frac{1}{x^2} + \frac{1}{x^4}\right)4\cos^2\theta + \left(1 - \frac{1}{x^2} + \frac{1}{x^4}\right)\sin^2\theta}; \quad (12)$$

$$x = 2\pi\frac{D_p}{\lambda} \Rightarrow \frac{\oiint_{S_p} u_e(x)dS}{\oiint_{S_p} u_m(x)dS} = \frac{1 + \frac{1}{x^2}}{1 + \frac{1}{x^2} + \frac{3}{x^4}};$$

$$x = 2\pi \frac{D_p}{\lambda},$$

where the second line is the ratio of averages over all angles by integrating the electric and magnetic energy densities over the surface of a sphere of radius $D_p$. From Eq. (12) it is obvious that indeed for all angles in the near field ($x \ll 1$) the magnetic energy density is dominant, while in the far field ($x \gg 1$) they are equal as they should be. Also, the preferred positioning of the loop is such that objects which may interfere with its resonance lie close to its axis ($\theta=0$), where there is no electric field. For example, using the systems described in Table 4, we can estimate from Eq. (12) that for the loop of r=30 cm at a distance $D_p$=10r=3m the ratio of average electric to average magnetic energy density would be ~12% and at $D_p$=3r=90 cm it would be ~1%, and for the loop of r=10 cm at a distance $D_p$=10r=1 m the ratio would be ~33% and at D=3r=30 cm it would be ~2.5%. At closer distances this ratio is even smaller and thus the energy is predominantly magnetic in the near field, while in the radiative far field, where they are necessarily of the same order (ratio→1), both are very small, because the fields have significantly decayed, as capacitively-loaded coil systems are designed to radiate very little. Therefore, this is the criterion that qualifies this class of resonant system as a magnetic resonant system.

To provide an estimate of the effect of extraneous objects on the resonance of a capacitively-loaded loop including the capacitor fringing electric field, we use the perturbation theory formula, stated earlier, $\Gamma_{1-e}^{abs}=\omega_1/4 \cdot \int d^3r \, \text{Im}\{\varepsilon_e(r)\}|E_1(r)|^2/U$ with the computational FEFD results for the field of an example like the one shown in the plot of FIG. 5 and with a rectangular object of dimensions 30 cm×30 cm×1.5m and permittivity ε=49+16i (consistent with human muscles) residing between the loops and almost standing on top of one capacitor (~3 cm away from it) and find $Q_{c-h}^{abs} \sim 10^5$ and for ~10 cm away $Q_{c-h}^{abs} \sim 5 \cdot 10^5$. Thus, for ordinary distances (~1m) and placements (not immediately on top of the capacitor) or for most ordinary extraneous objects e of much smaller loss-tangent, we conclude that it is indeed fair to say that $Q_{c-e}^{abs} \to \infty$. The only perturbation that is expected to affect these resonances is a close proximity of large metallic structures.

Self-resonant coils are more sensitive than capacitively-loaded coils, since for the former the electric field extends over a much larger region in space (the entire coil) rather than for the latter (just inside the capacitor). On the other hand, self-resonant coils are simple to make and can withstand much larger voltages than most lumped capacitors.

In general, different embodiments of resonant systems have different degree of sensitivity to external perturbations, and the resonant system of choice depends on the particular application at hand, and how important matters of sensitivity or safety are for that application. For example, for a medical implantable device (such as a wirelessly powered artificial heart) the electric field extent must be minimized to the highest degree possible to protect the tissue surrounding the device. In such cases where sensitivity to external objects or safety is important, one should design the resonant systems so that the ratio of electric to magnetic energy density $u_e/u_m$ is reduced or minimized at most of the desired (according to the application) points in the surrounding space.

Figures 9A, 9B:
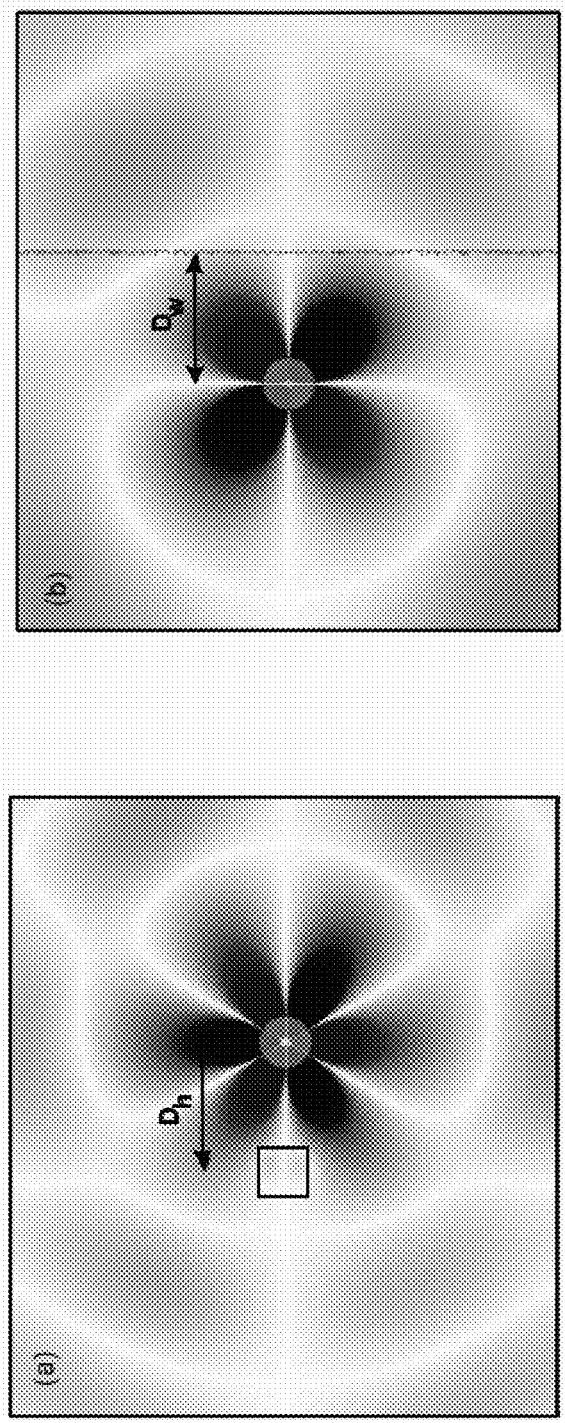
FIGS. 9*a* through 9*c* illustrate a wireless energy transfer scheme in the presence of various extraneous objects.
Figure 9C:
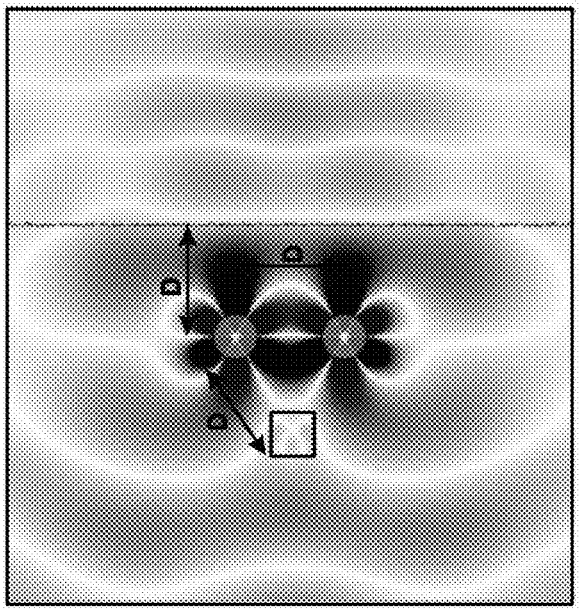

In embodiments using resonances that are not primarily magnetic, the influence of extraneous objects may be of concern. For example, for dielectric disks, small, low-index, low-material-loss or far-away stray objects will induce small scattering and absorption. In such cases of small perturbations these extrinsic loss mechanisms can be quantified using respectively the analytical first-order perturbation theory formulas $$\Gamma_{1-e}^{rad}=\omega_1 \int d^3r \, \text{Re}\{\varepsilon_e(r)\}|E_1(r)|^2/U$$

and $$\Gamma_{1-e}^{abs}=\omega_1/4 \cdot \int d^3r \, \text{Im}\{\varepsilon_e(r)\}|E_1(r)|^2/U$$

where $U=\frac{1}{2}\int d^3r \varepsilon(r)|E_1(r)|^2$ is the total resonant electromagnetic energy of the unperturbed mode. As one can see, both of these losses depend on the square of the resonant electric field tails $E_1$ at the site of the extraneous object. In contrast, the coupling rate from object 1 to another resonant object 2 is, as stated earlier, $$\kappa=\omega_1/2 \cdot \int d^3r \varepsilon_2(r)E^*_2(r)E_1(r)/\int d^3r \varepsilon(r)|E_1(r)|^2$$

and depends linearly on the field tails $E_1$ of 1 inside 2. This difference in scaling gives us confidence that, for, for example, exponentially small field tails, coupling to other resonant objects should be much faster than all extrinsic loss rates ($\kappa \gg \Gamma_{1-e}$), at least for small perturbations, and thus the energy-transfer scheme is expected to be sturdy for this class of resonant dielectric disks. However, we also want to examine certain possible situations where extraneous objects cause perturbations too strong to analyze using the above first-order perturbation theory approach. For example, we place a dielectric disk c close to another off-resonance object of large Re{ε}, Im{ε} and of same size but different shape (such as a human being h), as shown in FIG. 9a, and a roughened surface of large extent but of small Re{ε}, Im{ε} (such as a wall w), as shown in FIG. 9b. For distances $D_{h/w}/r=10^{-3}$ between the disk-center and the "human"-center or "wall", the numerical FDFD simulation results presented in FIGS. 9a and 9b suggest that, the disk resonance seems to be fairly robust, since it is not detrimentally disturbed by the presence of extraneous objects, with the exception of the very close proximity of high-loss objects. To examine the influence of large perturbations on an entire energy-transfer system we consider two resonant disks in the close presence of both a "human" and a "wall". Comparing Table 8 to the table in FIG. 9c, the numerical FDFD simulations show that the system performance deteriorates from $\kappa/\Gamma_c \sim 1$–50 to $\kappa[hw]/\Gamma_{c[hw]} \square 0.5$–10 i.e. only by acceptably small amounts.

Inductively-loaded conducting rods may also be more sensitive than capacitively-loaded coils, since they rely on the electric field to achieve the coupling.

System Efficiency

In general, another important factor for any energy transfer scheme is the transfer efficiency. Consider again the combined system of a resonant source s and device d in the presence of a set of extraneous objects e. The efficiency of this resonance-based energy-transfer scheme may be determined, when energy is being drained from the device at rate $\Gamma_{work}$ for use into operational work. The coupled-mode-theory equation for the device field-amplitude is $$\frac{da_d}{dt} = -i(\omega - i\Gamma_{d[e]})a_d + i\kappa_{[e]}a_s - \Gamma_{work}a_d, \quad (13)$$

where $\Gamma_{d[e]}$, $\Gamma_{=d[e]}^{rad}+\Gamma_{d[e]}^{abs}=\Gamma_{d[e]}^{rad}+(\Gamma_d^{abs}+\Gamma_{d-e}^{abs})$ is the net perturbed-device loss rate, and similarly we define $\Gamma_{s[e]}$ for the perturbed-source. Different temporal schemes can be used to extract power from the device (e.g. steady-state continuous-wave drainage, instantaneous drainage at periodic times and so on) and their efficiencies exhibit different dependence on the combined system parameters. For simplicity, we assume steady state, such that the field amplitude inside the source is maintained constant, namely $a_s(t)=A_s e^{-i\omega t}$, so then the field amplitude inside the device is $a_d(t)=A_d e^{-i\omega t}$ with $A_d/A_s = i\kappa_{(e)}/(\Gamma_{d[e]}+\Gamma_{work})$. The various time-averaged powers of interest are then: the useful extracted power is $P_{work}=2\Gamma_{work}|A_d|^2$, the radiated (including scattered) power is $P_{rad}=2\Gamma_{s(e)}^{rad}|A_s|^2+2\Gamma_{d(e)}^{rad}|A_d|^2$ the power absorbed at the source/device is $P_{s/d}=2\Gamma_{s/d}^{abs}|A_{s/d}|^2$, and at the extraneous objects $P_e=2\Gamma_{s-e}^{abs}|A_s|^2+2\Gamma_{d-e}^{abs}|A_d|^2$. From energy conservation, the total time-averaged power entering the system is $P_{total}=P_{work}+P_{rad}+P_s+P_d+P_e$. Note that the reactive powers, which are usually present in a system and circulate stored energy around it, cancel at resonance (which can be proven for example in electromagnetism from Poynting's Theorem) and do not influence the power-balance calculations. The working efficiency is then:

$$\eta_{work} \equiv \frac{P_{work}}{P_{total}} = \frac{1}{1+\frac{\Gamma_{d[e]}}{\Gamma_{work}}\left[1+\frac{1}{fom_{[e]}^2}\left(1+\frac{\Gamma_{work}}{\Gamma_{d[e]}}\right)^2\right]}, \quad (14)$$

where $fom_{[e]}=\kappa_{[e]}/\sqrt{\Gamma_{s(e)}\Gamma_{d(e)}}$ is the distance-dependent figure-of-merit of the perturbed resonant energy-exchange system. To derive Eq. (14), we have assumed that the rate $\Gamma_{supply}$, at which the power supply is feeding energy to the resonant source, is $\Gamma_{supply}=\Gamma_{s[e]}+\kappa^2/(\Gamma_{d[e]}+\Gamma_{work})$ such that there are zero reflections of the fed power $P_{total}$ back into the power supply.

[Example: Capacitively-Loaded Conducting Loops]

Figure 10:
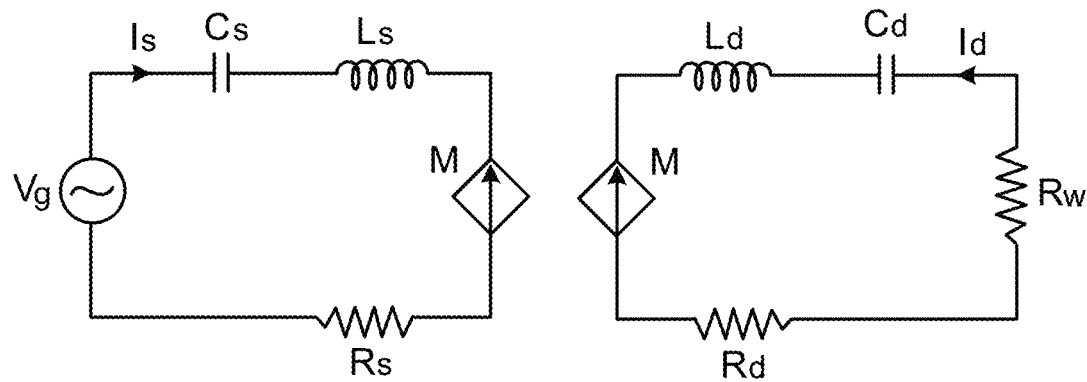
FIG. 10 illustrates a circuit model for wireless energy transfer.

Referring to FIG. 10, to rederive and express this formula (14) in terms of the parameters which are more directly accessible from particular resonant objects, e.g. the capacitively-loaded conducting loops, one can consider the following circuit-model of the system, where the inductances $L_s$, $L_d$ represent the source and device loops respectively, $R_s$, $R_d$ their respective losses, and $C_d$, $C_d$ are the required corresponding capacitances to achieve for both resonance at frequency $\omega$. A voltage generator $V_g$ is considered to be connected to the source and a work (load) resistance $R_w$ to the device. The mutual inductance is denoted by M.

Then from the source circuit at resonance ($\omega L_s=1/\omega C_s$):

$$V_g=I_s R_s-j\omega M I_d \Rightarrow \tfrac{1}{2}V_g^* I_s=\tfrac{1}{2}|I_s|^2 R_s+\tfrac{1}{2}j\omega M I^*_s I_s,$$

and from the device circuit at resonance ($\omega L_d=1/\omega C_d$):

$$0=I_d(R_d+R_w)-j\omega M I_s \Rightarrow j\omega M I_s=I_d(R_d+R_w)$$

So by substituting the second to the first:

$$\tfrac{1}{2}V_g^* I_s=\tfrac{1}{2}|I_s|^2 R_s+\tfrac{1}{2}|I_d|^2(R_d+R_w).$$

Now we take the real part (time-averaged powers) to find efficiency:

$$P_g \equiv \operatorname{Re}\left\{\tfrac{1}{2}V_g^* I_s\right\} = P_s + P_d + P_w \Rightarrow \eta_{work} \equiv \frac{P_w}{P_{tot}} = \frac{R_w}{\left|\frac{I_s}{I_d}\right|^2 R_s + R_d + R_w}.$$

Namely, $$\eta_{work} = \frac{R_w}{\frac{(R_d+R_w)^2}{(\omega M)^2}R_s + R_d + R_w},$$

which with $\Gamma_{work}=R_w/2L_d$, $\Gamma_d=R_d/2L_d$, $\Gamma_s=R_s/2L_s$, and $\kappa=\omega M/2\sqrt{L_s L_d}$, becomes the general Eq. (14). [End of Example]

Figure 11:
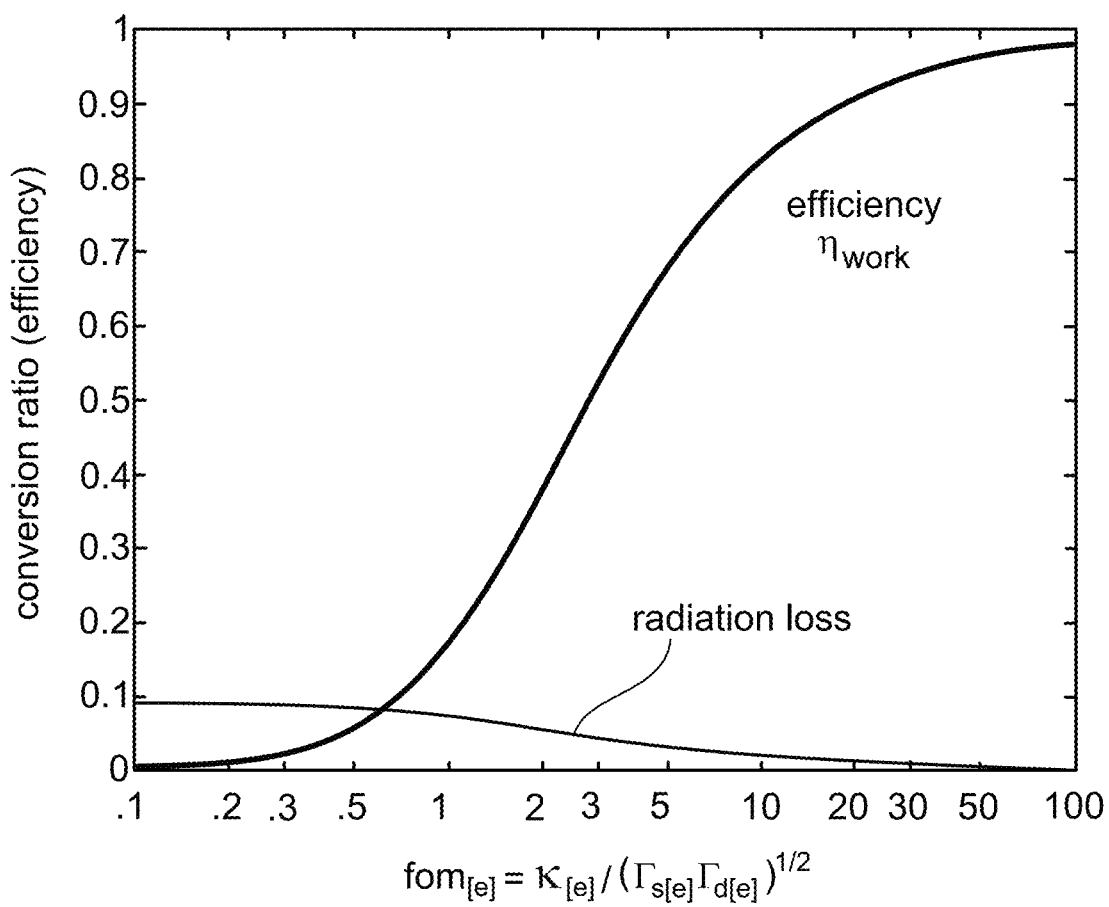
FIG. 11 illustrates the efficiency of a wireless energy transfer scheme.

From Eq. (14) one can find that the efficiency is optimized in terms of the chosen work-drainage rate, when this is chosen to be $\Gamma_{work}/\Gamma_{d[e]}=\Gamma_{supply}/\Gamma_{s[e]}=\sqrt{1+fom_{[e]}^2}1$. Then, $\eta_{work}$ is a function of the $fom_{[e]}$ parameter only as shown in FIG. 11 with a solid black line. One can see that the efficiency of the system is $\eta > 17\%$ for $fom_{[e]} > 1$, large enough for practical applications. Thus, the efficiency can be further increased towards 100% by optimizing $fom_{[e]}$ as described above. The ratio of conversion into radiation loss depends also on the other system parameters, and is plotted in FIG. 11 for the conducting loops with values for their parameters within the ranges determined earlier.

For example, consider the capacitively-loaded coil embodiments described in Table 4, with coupling distance $D/r=7$, a "human" extraneous object at distance $D_h$ from the source, and that $P_{work}=10$ W must be delivered to the load. Then, we have (based on FIG. 11) $Q_{s[h]}^{rad}=Q_{d[h]}^{rad}\sim 10^4$, $Q_s^{abs}=Q_d^{abs}\sim 10^3$, $Q_\kappa\sim 500$, and $Q_{d-h}^{abs}\to\infty$, $Q_{s-h}^{abs}\sim 10^5$ at $D_h\sim 3$ cm and $Q_{s-h}^{abs}\sim 5\cdot 10^5$ at $D_h\sim 10$ cm. Therefore $fom_{[h]}\sim 2$, so we find $\eta\approx 38\%$, $P_{rad}\approx 1.5$ W, $P_s\approx 11$ W, $P_d\approx 4$ W, and most importantly $\eta_h\approx 0.4\%$, $P_h=0.1$ W at $D_h\sim 3$ cm and $\eta_h\approx 0.1\%$, $P_h=0.02$ W at $D_h\sim 10$ cm Overall System Performance In many cases, the dimensions of the resonant objects will be set by the particular application at hand. For example, when this application is powering a laptop or a cell-phone, the device resonant object cannot have dimensions larger that those of the laptop or cell-phone respectively. In particular, for a system of two loops of specified dimensions, in terms of loop radii $r_{s,d}$ and wire radii $a_{s,d}$ the independent parameters left to adjust for the system optimization are: the number of turns $N_{s,d}$, the frequency $f$, the work-extraction rate (load resistance) $\Gamma_{work}$ and the power-supply feeding rate $\Gamma_{supply}$.

In general, in various embodiments, the primary dependent variable that one wants to increase or optimize is the overall efficiency $\eta$. However, other important variables need to be taken into consideration upon system design. For example, in embodiments featuring capacitively-loaded coils, the design may be constrained by, for example, the currents flowing inside the wires $I_{s,d}$ and the voltages across the capacitors $V_{s,d}$. These limitations can be important because for ~Watt power applications the values for these parameters can be too large for the wires or the capacitors respectively to handle. Furthermore, the total loaded $Q_{tot}=\omega L_d/(R_d+R_w)$ of the device is a quantity that should be preferably small, because to match the source and device resonant frequencies to within their Q's, when those are very large, can be challenging experimentally and more sensitive to slight variations. Lastly, the radiated powers $P_{rad,s,d}$ should be minimized for safety concerns, even though, in general, for a magnetic, non-radiative scheme they are already typically small.

In the following, we examine then the effects of each one of the independent variables on the dependent ones. We define a new variable wp to express the work-drainage rate for some particular value of $fom_{[e]}$ through $\Gamma_{work}/\Gamma_{d[e]}=\sqrt{1+wp\cdot fom_{[e]}^2}$. Then, in some embodiments, values which impact the choice of this rate are: $\Gamma_{work}/\Gamma_{d[e]}=1 \Leftrightarrow wp=0$ to minimize the required energy stored in the source (and therefore $I_s$ and $V_s$), $\Gamma_{work}/\Gamma_{d[e]}=\sqrt{1+fom_{[e]}^2}>1 \Leftrightarrow wp=1$ to increase the efficiency, as seen earlier, or $\Gamma_{work}/\Gamma_{d[e]} \gg 1 \Leftrightarrow wp \gg 1$ to decrease the required energy stored in the device (and therefore $I_d$ and $V_d$) and to decrease or minimize $Q_{tot}=\omega L_d/(R_d+R_w)=\omega/[2(\Gamma_d+\Gamma_{work})]$. Similar is the impact of the choice of the power supply feeding rate $\Gamma_{supply}$, with the roles of the source and the device reversed.

Increasing $N_s$ and $N_d$ increases $\kappa/\sqrt{\Gamma_s\Gamma_d}$ and thus efficiency significantly, as seen before, and also decreases the currents $I_s$ and $I_d$, because the inductance of the loops increases, and thus the energy $U_{s,d}=\frac{1}{2}L_{s,d}|I_{s,d}|^2$ required for given output power $P_{work}$ can be achieved with smaller currents. However, increasing $N_d$ increases $Q_{tot}$, $P_{rad,d}$ and the voltage across the device capacitance $V_d$, which unfortunately ends up being, in typical embodiments one of the greatest limiting factors of the system. To explain this, note that it is the electric field that really induces breakdown of the capacitor material (e.g. 3 kV/mm for air) and not the voltage, and that for the desired (close to the optimal) operational frequency, the increased inductance $L_d$ implies reduced required capacitance $C_d$, which could be achieved in principle, for a capacitively-loaded device coil by increasing the spacing of the device capacitor plates $d_d$ and for a self-resonant coil by increasing through $h_d$ the spacing of adjacent turns, resulting in an electric field ($\approx V_d/d_d$ for the former case) that actually decreases with $N_d$; however, one cannot in reality increase $d_d$ or $h_d$ too much, because then the undesired capacitance fringing electric fields would become very large and/or the size of the coil might become too large; and, in any case, for certain applications extremely high voltages are not desired. A similar increasing behavior is observed for the source $p_{rad,s}$ and $V_s$ upon increasing $N_s$. As a conclusion, the number of turns $N_s$ and $N_d$ have to be chosen the largest possible (for efficiency) that allow for reasonable voltages, fringing electric fields and physical sizes.

With respect to frequency, again, there is an optimal one for efficiency, and $Q_{tot}$ is approximately maximum, close to that optimal frequency. For lower frequencies the currents get worse (larger) but the voltages and radiated powers get better (smaller). Usually, one should pick either the optimal frequency or somewhat lower.

Figure 12:
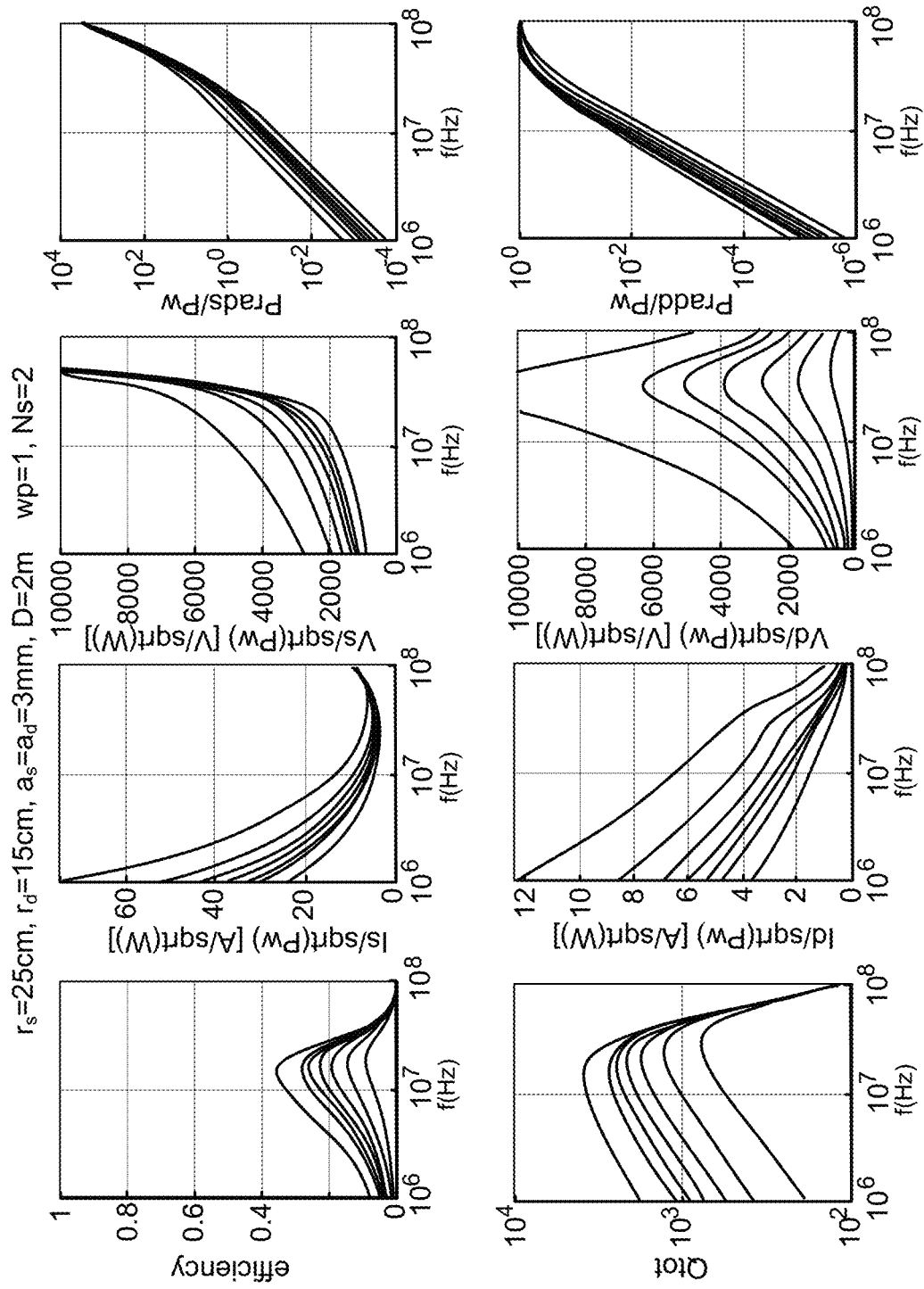
FIG. 12 illustrates parametric dependences of a wireless energy transfer scheme.
Figure 13:
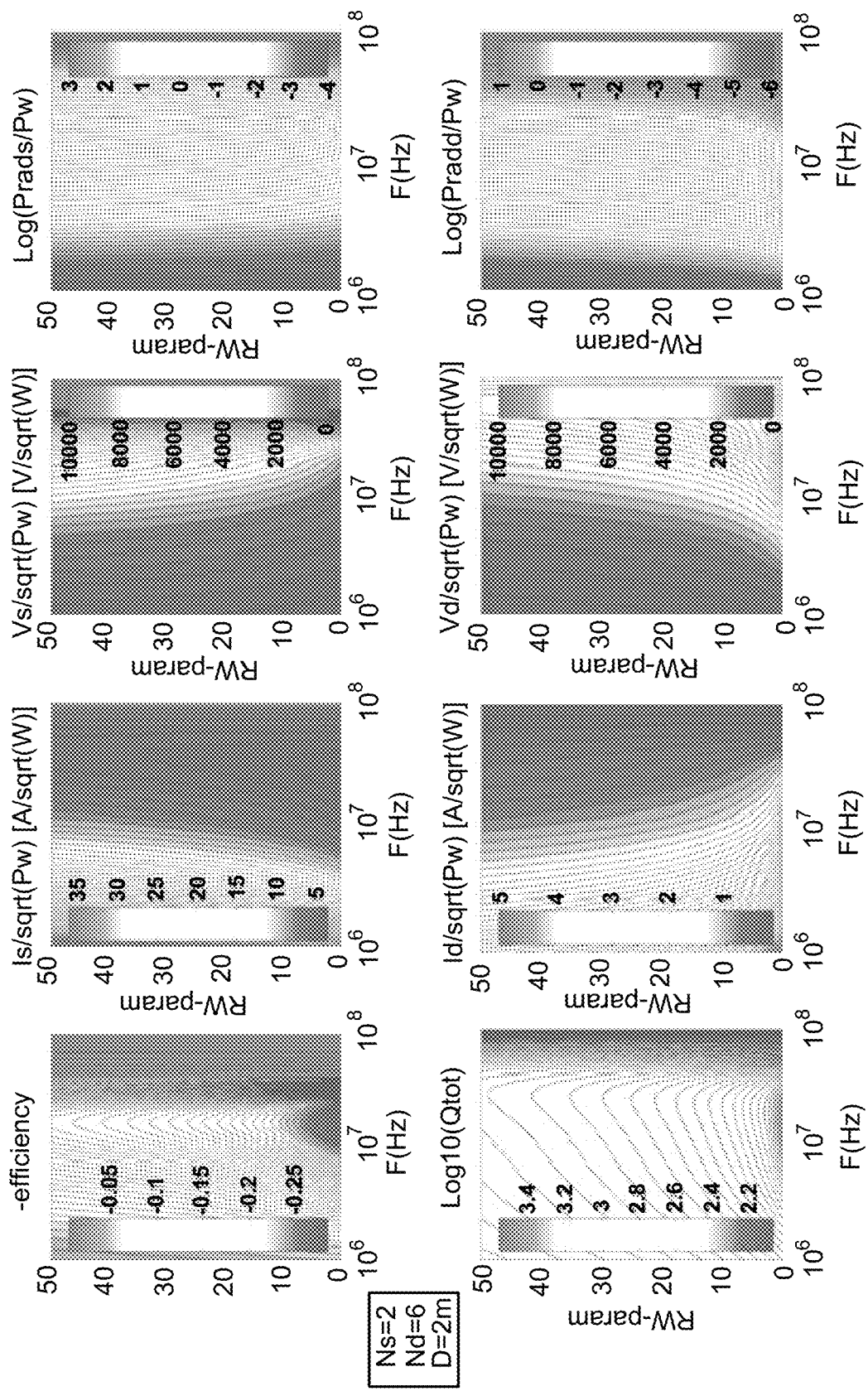
FIG. 13 plots the parametric dependences of a wireless energy transfer scheme.

One way to decide on an operating regime for the system is based on a graphical method. In FIG. 12, for two loops of $r_s=25$ cm, $r_d=15$ cm, $h_s=h_d=0$, $a_s=a_d=3$ mm and distance D=2m between them, we plot all the above dependent variables (currents, voltages and radiated powers normalized to 1 Watt of output power) in terms of frequency and $N_d$, given some choice for wp and $N_s$. The Figure depicts all of the dependencies explained above. We can also make a contour plot of the dependent variables as functions of both frequency and wp but for both $N_s$ and $N_d$ fixed. The results are shown in FIG. 13 for the same loop dimensions and distance. For example, a reasonable choice of parameters for the system of two loops with the dimensions given above are: $N_s=2$, $N_d=6$, f=10 MHz and wp=10, which gives the following performance characteristics: $\eta_{work}=20.6\%$, $Q_{tot}=1264$, $I_s=7.2$ A, $I_d=1.4$ A, $V_s=2.55$ kV, $V_d=2.30$ kV, $P_{rad,s}=0.15$ W, $P_{rad,d}=0.006$ W. Note that the results in FIGS. 12 and 13, and the just above calculated performance characteristics are made using the analytical formulas provided above, so they are expected to be less accurate for large values of $N_s$, $N_d$, still they give a good estimate of the scalings and the orders of magnitude.

Finally, one could additionally optimize for the source dimensions, since usually only the device dimensions are limited, as discussed earlier. Namely, one can add $r_s$ and a, in the set of independent variables and optimize with respect to these too for all the dependent variables of the problem (we saw how to do this only for efficiency earlier). Such an optimization would lead to improved results.

Experimental Results

Figure 14:
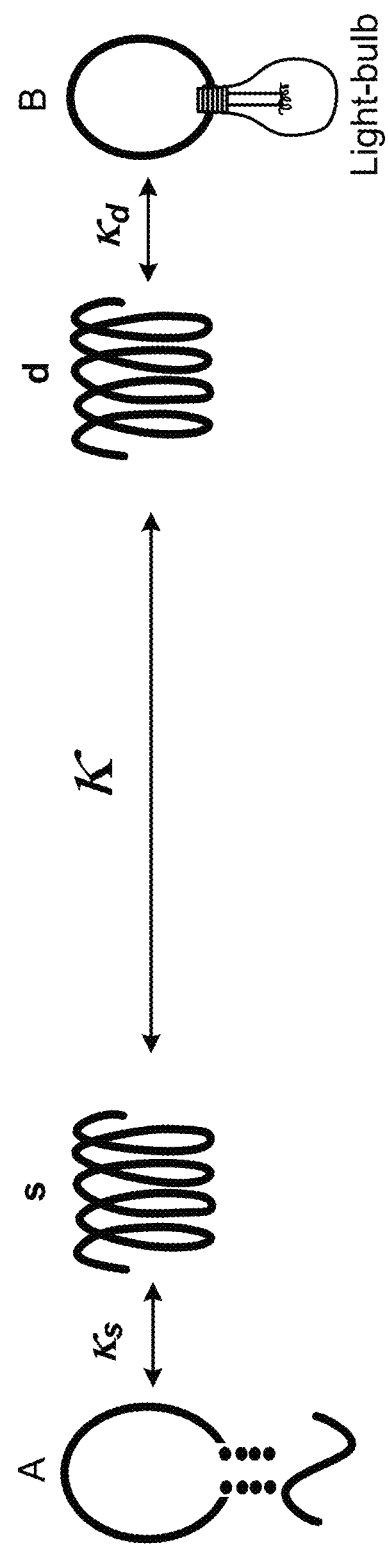
FIG. 14 is a schematic of an experimental system demonstrating wireless energy transfer.

An experimental realization of an embodiment of the above described scheme for wireless energy transfer consists of two self-resonant coils of the type described above, one of which (the source coil) is coupled inductively to an oscillating circuit, and the second (the device coil) is coupled inductively to a resistive load, as shown schematically in FIG. 14. Referring to FIG. 14, A is a single copper loop of radius 25 cm that is part of the driving circuit, which outputs a sine wave with frequency 9.9 MHz. s and d are respectively the source and device coils referred to in the text. B is a loop of wire attached to the load ("light-bulb"). The various $\kappa$'s represent direct couplings between the objects. The angle between coil d and the loop A is adjusted so that their direct coupling is zero, while coils s and d are aligned coaxially. The direct coupling between B and A and between B and s is negligible.

The parameters for the two identical helical coils built for the experimental validation of the power transfer scheme were h=20 cm, a=3 mm, r=30 cm, N=5.25. Both coils are made of copper. Due to imperfections in the construction, the spacing between loops of the helix is not uniform, and we have encapsulated the uncertainty about their uniformity by attributing a 10% (2 cm) uncertainty to h. The expected resonant frequency given these dimensions is $f_o=10.56\pm0.3$ MHz, which is about 5% off from the measured resonance at around 9.90 MHz.

The theoretical Q for the loops is estimated to be ~2500 (assuming perfect copper of resistivity $\rho=1/\sigma=1.7\times10^{-8}$ $\Omega$m) but the measured value is 950±50. We believe the discrepancy is mostly due to the effect of the layer of poorly conducting copper oxide on the surface of the copper wire, to which the current is confined by the short skin depth (~20 μm) at this frequency. We have therefore used the experimentally observed Q (and $\Gamma_1=\Gamma_2=\Gamma=\omega/(2Q)$ derived from it) in all subsequent computations.

Figure 15:
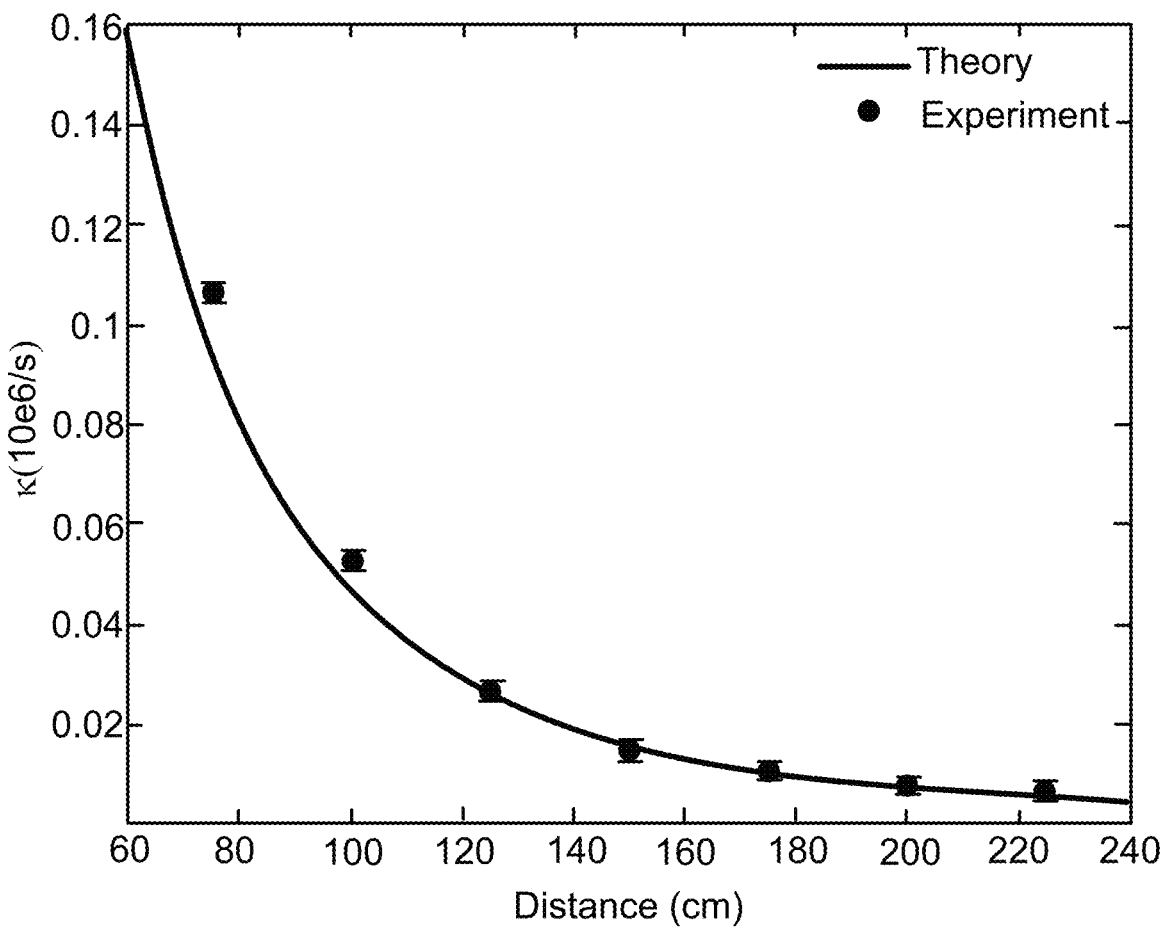
FIGS. 15-17. Plot experiment results for the system shown schematically in FIG. 14.

The coupling coefficient $\kappa$ can be found experimentally by placing the two self-resonant coils (fine-tuned, by slightly adjusting h, to the same resonant frequency when isolated) a distance D apart and measuring the splitting in the frequencies of the two resonant modes in the transmission spectrum. According to coupled-mode theory, the splitting in the transmission spectrum should be $\Delta\omega=2\sqrt{\kappa^2-\Gamma^2}$. The comparison between experimental and theoretical results as a function of distance when the two the coils are aligned coaxially is shown in FIG. 15.

Figure 16:
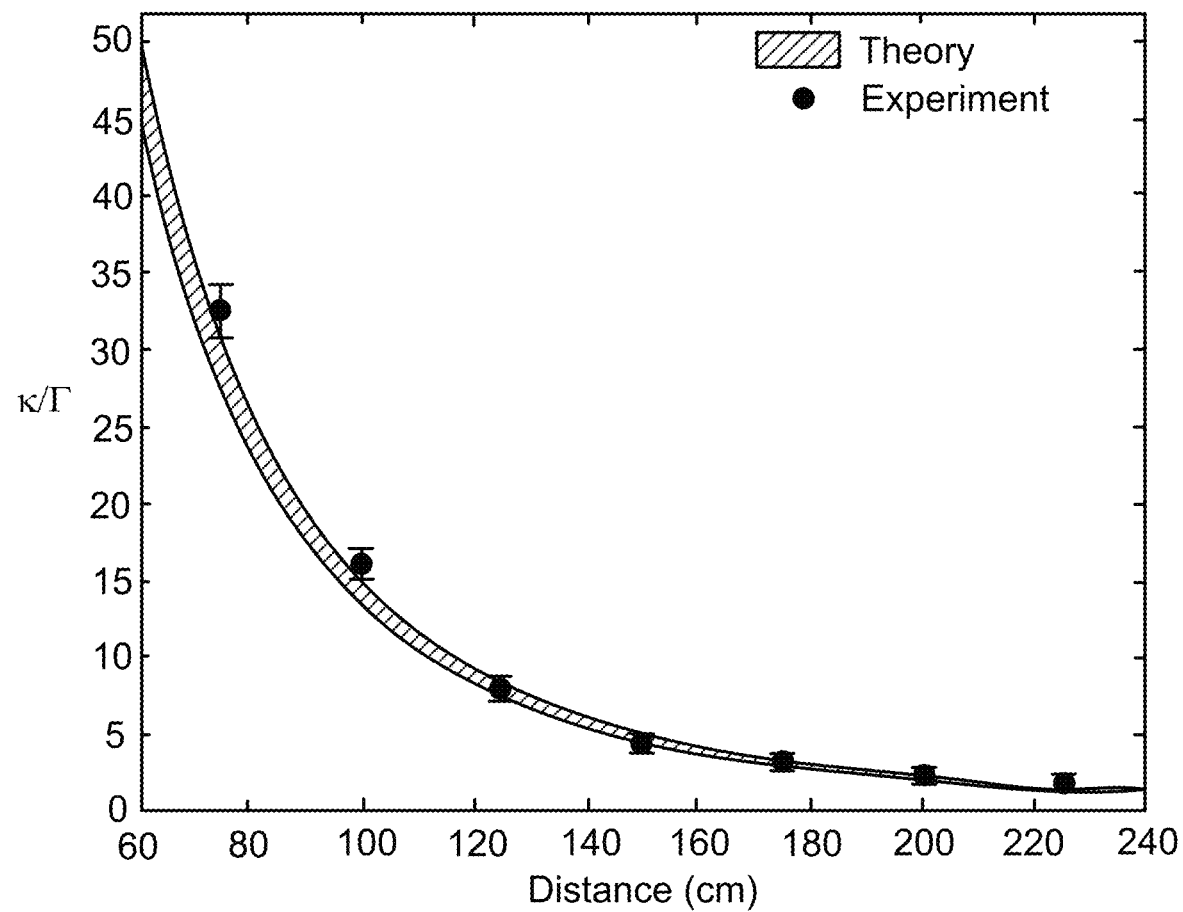

FIG. 16 shows a comparison of experimental and theoretical values for the parameter $\kappa/\Gamma$ as a function of the separation between the two coils. The theory values are obtained by using the theoretically obtained $\kappa$ and the experimentally measured $\Gamma$. The shaded area represents the spread in the theoretical $\kappa/\Gamma$ due to the ~5% uncertainty in Q.

Figure 17:
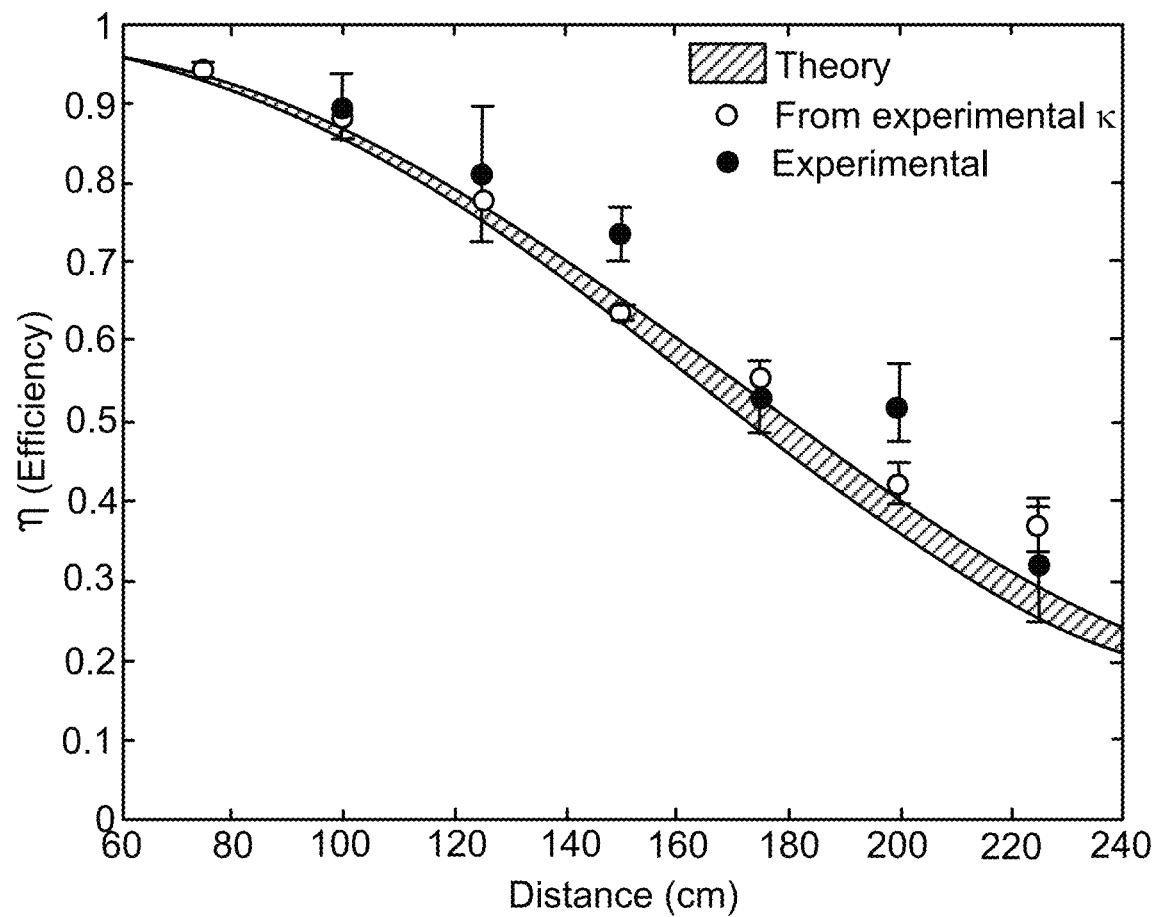

As noted above, the maximum theoretical efficiency depends only on the parameter $\kappa/\sqrt{\Gamma_1\Gamma_2}=\kappa/\Gamma$, plotted as a function of distance in FIG. 17. The coupling to loss ratio κ/Γ is greater than 1 even for D=2.4 m (eight times the radius of the coils), thus the system is in the strongly-coupled regime throughout the entire range of distances probed.

The power supply circuit was a standard Colpitts oscillator coupled inductively to the source coil by means of a single loop of copper wire 25 cm in radius (see FIG. 14). The load consisted of a previously calibrated light-bulb, and was attached to its own loop of insulated wire, which was in turn placed in proximity of the device coil and inductively coupled to it. Thus, by varying the distance between the light-bulb and the device coil, the parameter $\Gamma_{work}/\Gamma$ was adjusted so that it matched its optimal value, given theoretically by $\sqrt{1+\kappa^2/(\Gamma_1\Gamma_2)}$. Because of its inductive nature, the loop connected to the light-bulb added a small reactive component to $\Gamma_{work}$ which was compensated for by slightly retuning the coil. The work extracted was determined by adjusting the power going into the Colpitts oscillator until the light-bulb at the load was at its full nominal brightness.

In order to isolate the efficiency of the transfer taking place specifically between the source coil and the load, we measured the current at the mid-point of each of the self-resonant coils with a current-probe (which was not found to lower the Q of the coils noticeably.) This gave a measurement of the current parameters $I_1$ and $I_2$ defined above. The power dissipated in each coil was then computed from $P_{1,2}=\Gamma L|I_{1,2}|^2$, and the efficiency was directly obtained from $\eta=P_{wo}/(P_1+P_2\pm P_{work})$. To ensure that the experimental setup was well described by a two-object coupled-mode theory model, we positioned the device coil such that its direct coupling to the copper loop attached to the Colpitts oscillator was zero. The experimental results are shown in FIG. 17, along with the theoretical prediction for maximum efficiency, given by Eq. (14).

Using this embodiment, we were able to transfer significant amounts of power using this setup, fully lighting up a 60 W light-bulb from distances more than 2m away, for example. As an additional test, we also measured the total power going into the driving circuit. The efficiency of the wireless transfer itself was hard to estimate in this way, however, as the efficiency of the Colpitts oscillator itself is not precisely known, although it is expected to be far from 100%. Nevertheless, this gave an overly conservative lower bound on the efficiency. When transferring 60 W to the load over a distance of 2m, for example, the power flowing into the driving circuit was 400 W. This yields an overall wall-to-load efficiency of ~15%, which is reasonable given the expected ~40% efficiency for the wireless power transfer at that distance and the low efficiency of the driving circuit.

From the theoretical treatment above, we see that in typical embodiments it is important that the coils be on resonance for the power transfer to be practical. We found experimentally that the power transmitted to the load dropped sharply as one of the coils was detuned from resonance. For a fractional detuning $\Delta f/f_0$ of a few times the inverse loaded Q, the induced current in the device coil was indistinguishable from noise.

The power transfer was not found to be visibly affected as humans and various everyday objects, such as metallic and wooden furniture, as well as electronic devices large and small, were placed between the two coils, even when they drastically obstructed the line of sight between source and device. External objects were found to have an effect only when they were closer than 10 cm from either one of the coils. While some materials (such as aluminum foil, styrofoam and humans) mostly just shifted the resonant frequency, which could in principle be easily corrected with a feedback circuit of the type described earlier, others (cardboard, wood, and PVC) lowered Q when placed closer than a few centimeters from the coil, thereby lowering the efficiency of the transfer.

We believe that this method of power transfer should be safe for humans. When transferring 60 W (more than enough to power a laptop computer) across 2m, we estimated that the magnitude of the magnetic field generated is much weaker than the Earth's magnetic field for all distances except for less than about 1 cm away from the wires in the coil, an indication of the safety of the scheme even after long-term use. The power radiated for these parameters was ~5 W, which is roughly an order of magnitude higher than cell phones but could be drastically reduced, as discussed below.

Although the two coils are currently of identical dimensions, it is possible to make the device coil small enough to fit into portable devices without decreasing the efficiency. One could, for instance, maintain the product of the characteristic sizes of the source and device coils constant.

These experiments demonstrated experimentally a system for power transfer over medium range distances, and found that the experimental results match theory well in multiple independent and mutually consistent tests.

We believe that the efficiency of the scheme and the distances covered could be appreciably improved by silver-plating the coils, which should increase their Q, or by working with more elaborate geometries for the resonant objects. Nevertheless, the performance characteristics of the system presented here are already at levels where they could be useful in practical applications.

Applications

In conclusion, we have described several embodiments of a resonance-based scheme for wireless non-radiative energy transfer. Although our consideration has been for a static geometry (namely κ and $\Gamma_e$ were independent of time), all the results can be applied directly for the dynamic geometries of mobile objects, since the energy-transfer time $\kappa^{-1}$ (~1 µs–1 ms for microwave applications) is much shorter than any timescale associated with motions of macroscopic objects. Analyses of very simple implementation geometries provide encouraging performance characteristics and further improvement is expected with serious design optimization. Thus the proposed mechanism is promising for many modern applications.

For example, in the macroscopic world, this scheme could potentially be used to deliver power to for example, robots and/or computers in a factory room, or electric buses on a highway. In some embodiments source-object could be an elongated "pipe" running above the highway, or along the ceiling.

Some embodiments of the wireless transfer scheme can provide energy to power or charge devices that are difficult or impossible to reach using wires or other techniques. For example some embodiments may provide power to implanted medical devices (e.g. artificial hearts, pacemakers, medicine delivery pumps, etc.) or buried underground sensors.

In the microscopic world, where much smaller wavelengths would be used and smaller powers are needed, one could use it to implement optical inter-connects for CMOS electronics, or to transfer energy to autonomous nano-objects (e.g. MEMS or nano-robots) without worrying much about the relative alignment between the sources and the devices. Furthermore, the range of applicability could be extended to acoustic systems, where the source and device are connected via a common condensed-matter object.

In some embodiments, the techniques described above can provide non-radiative wireless transfer of information using the localized near fields of resonant object. Such schemes provide increased security because no information is radiated into the far-field, and are well suited for mid-range communication of highly sensitive information.

A number of embodiments of the invention have been described. Nevertheless, it will be understood that various modifications may be made without departing from the spirit and scope of the invention.

What is claimed is:

1. A source assembly for use with a wireless power system including a device resonator and a load coupled to the device resonator to receive power from the device resonator, the device resonator having a resonant frequency $\omega_2$, an intrinsic loss rate $\Gamma_2$, and an intrinsic quality factor $Q_2=\omega_2/(2\Gamma_2)>100$, the source assembly comprising:
    a source resonator having a resonant frequency $\omega_1$, an intrinsic loss rate $\Gamma_1$, and an intrinsic quality factor $Q_1=\omega_1/(2\Gamma_1)>100$; and
    a current probe configured to measure a current in the source resonator,
    wherein the source resonator and the device resonator are configured to resonantly and wirelessly couple electromagnetic power from the source resonator to the device resonator over a range of distances D between the source resonator and the device resonator using non-radiative electromagnetic induction having a coupling coefficient K.

2. The source assembly of claim 1, further comprising a power supply coupled to the source resonator to provide power to the source resonator.

3. The source assembly of claim 1, wherein the intrinsic loss rates satisfy $\kappa/\sqrt{\Gamma_1\Gamma_2}>2$ over the range of distances D between the source resonator and the device resonator.

4. The source assembly of claim 1, further comprising a monitor configured to measure an efficiency of power coupled to the load from the source resonator using information from the current measurement.

5. The source assembly of claim 4, further comprising a frequency adjuster configured to adjust a frequency of the wireless energy transfer based on the measurement by the monitor.

6. The source assembly of claim 5, wherein the frequency adjuster is configured to adjust the resonant frequency of the source resonator.

7. The source assembly of claim 4, wherein the resonators wirelessly exchange information based on the measurement by the monitor.

8. The source assembly of claim 1, wherein $f_1=\omega_1/(2\pi)$ and $f_1$ is between 1 MHz and 10 MHz.

9. The source assembly of claim 1, wherein $Q_1>200$.

10. The source assembly of claim 9, wherein $f_1=\omega_1/(2\pi)$ and $f_1$ is between 10 KHz and 1 MHz.

11. A device assembly for use with a wireless power system including a source resonator and a power supply coupled to the source resonator to provide power to the source resonator, the source resonator having a resonant frequency $\omega_1$, an intrinsic loss rate $\Gamma_1$, and an intrinsic quality factor $Q_1=\omega_1/(2\Gamma_1)>100$, the device assembly comprising:
    a device resonator having a resonant frequency $\omega_2$, an intrinsic loss rate $\Gamma_2$, and an intrinsic quality factor $Q_2=\omega_2/(2\Gamma_2)>100$; and
    a current probe configured to measure a current in the device resonator,
    wherein the source resonator and the device resonator are configured to resonantly and wirelessly couple electromagnetic power from the source resonator to the device resonator over a range of distances D between the source resonator and the device resonator using non-radiative electromagnetic induction having a coupling coefficient $\kappa$.

12. The device assembly of claim 11, further comprising a load coupled to the device resonator to receive power from the device resonator.

13. The device assembly of claim 11, wherein the intrinsic loss rates satisfy $\kappa/\sqrt{\Gamma_1\Gamma_2}>2$ over the range of distances D between the source resonator and the device resonator.

14. The device assembly of claim 11, further comprising a monitor configured to measure an efficiency of power coupled to the load from the source resonator using information from the current measurement.

15. The device assembly of claim 14, further comprising a frequency adjuster configured to adjust a frequency of the wireless energy transfer based on the measurement by the monitor.

16. The device assembly of claim 15, wherein the frequency adjuster is configured to adjust the resonant frequency of the device resonator.

17. The device assembly of claim 14, wherein the resonators wirelessly exchange information based on the measurement by the monitor.

18. The device assembly of claim 11, wherein $f_2=\omega_2/(2\pi)$ and $f_2$ is between 1 MHz and 10 MHz.

19. The device assembly of claim 11, wherein $Q_2>200$.

20. The device assembly of claim 19, wherein $f_2=\omega_2/(2\pi)$ and $f_2$ is between 10 KHz and 1 MHz.

21. A vehicle configured for use with a wireless power system including a source resonator and a power supply coupled to the source resonator to provide power to the source resonator, the source resonator having a resonant frequency $\omega_1$, an intrinsic loss rate $\Gamma_1$, and an intrinsic quality factor $Q_1=\omega_1/(2\Gamma_1)>100$, the vehicle comprising:
    a device resonator having a resonant frequency $\omega_2$, an intrinsic loss rate $\Gamma_2$, and an intrinsic quality factor $Q_2=\omega_2/(2\Gamma_2)>100$;
    a load coupled to the device resonator to receive power from the device resonator; and
    a current probe configured to measure a current in the device resonator,
    wherein the source resonator and the device resonator are configured to resonantly and wirelessly couple electromagnetic power from the source resonator to the device resonator over a range of distances D between the source resonator and the device resonator using non-radiative electromagnetic induction having a coupling coefficient $\kappa$.

22. The vehicle of claim 21, further comprising a monitor configured to measure an efficiency of power coupled to the load from the source resonator using information from the current measurement.

23. The vehicle of claim 22, further comprising a frequency adjuster configured to adjust a frequency of the wireless energy transfer based on the measurement by the monitor.

24. The vehicle of claim 23, wherein the frequency adjuster is configured to adjust the resonant frequency of the device resonator.

25. The vehicle of claim 22, wherein the resonators wirelessly exchange information based on the measurement by the monitor.

26. The vehicle of claim 21, wherein $Q_1 > 200$ and $Q_2 > 200$, wherein the load is configured to provide power to a vehicle, wherein the intrinsic loss rates satisfy $\kappa/\sqrt{\Gamma_1 \Gamma_2} > 5$ over the range of distances D, and wherein the power provided to the load from the device resonator is greater than about 10 Watt.

27. The vehicle of claim 26, wherein $f_1 = \omega_1/(2\pi)$ and $f_2 = \omega_2/(2\pi)$, and $f_1$ and $f_6$ are between 10 kHz and 1 MHz.

* * * * *

UNITED STATES PATENT AND TRADEMARK OFFICE
CERTIFICATE OF CORRECTION

PATENT NO. : 11,685,270 B2
APPLICATION NO. : 17/009041
DATED : June 27, 2023
INVENTOR(S) : Aristeidis Karalis et al.

It is certified that error appears in the above-identified patent and that said Letters Patent is hereby corrected as shown below:

In the Claims

Column 39
Line 32, in Claim 1, delete "K." and insert -- κ. --

Column 41
Line 11, in Claim 27, delete "$f_6$" and insert -- $f_2$, --

Signed and Sealed this
Fifteenth Day of August, 2023

Katherine Kelly Vidal
*Director of the United States Patent and Trademark Office*